United States Patent
Shi et al.

(10) Patent No.: US 10,680,773 B2
(45) Date of Patent: Jun. 9, 2020

(54) METHOD AND APPARATUS FOR TRANSMITTING PILOT SIGNAL

(71) Applicant: Huawei Technologies Co., Ltd., Shenzhen (CN)

(72) Inventors: Hongzhe Shi, Shanghai (CN); Jin Liu, Shenzhen (CN); Dageng Chen, Shanghai (CN); Xiaoyan Bi, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/053,185

(22) Filed: Aug. 2, 2018

(65) Prior Publication Data

US 2018/0367274 A1 Dec. 20, 2018

Related U.S. Application Data

(63) Continuation of application No. PCT/CN2016/107440, filed on Nov. 28, 2016.

(30) Foreign Application Priority Data

Feb. 3, 2016 (CN) .......................... 2016 1 0069267

(51) Int. Cl.
 *H04L 5/00* (2006.01)
 *H04L 1/16* (2006.01)
(52) U.S. Cl.
 CPC .......... *H04L 5/0048* (2013.01); *H04L 1/1614* (2013.01); *H04L 5/00* (2013.01); *H04L 5/0023* (2013.01); *H04L 5/0053* (2013.01)
(58) Field of Classification Search
 CPC .................................................... H04L 5/0048
 See application file for complete search history.

(56) References Cited

U.S. PATENT DOCUMENTS

| 2013/0003694 A1* | 1/2013 | Choi | ..................... H04W 48/08 370/330 |
| 2017/0078006 A1 | 3/2017 | Liu et al. | |

FOREIGN PATENT DOCUMENTS

| CN | 101702638 A | 5/2010 |
| CN | 101707511 A | 5/2010 |

(Continued)

OTHER PUBLICATIONS

"Consideration on Downlink Signalling for DMRS port indication with different MU dimensions," 3GPP TSG RAN WG1 Meeting #61bis,Dresden, Germany, R1-103593, 3rd Generation Partnership Project, Valbonne, France (Jun. 28-Jul. 2, 2010).

(Continued)

*Primary Examiner* — John D Blanton
(74) *Attorney, Agent, or Firm* — Leydig, Voit & Mayer, Ltd.

(57) ABSTRACT

This application discloses a method and an apparatus for transmitting a pilot signal, so that more flexible resource configuration can be achieved, thereby improving resource usage. The method includes: determining, by a transmit end device based on prestored N pilot patterns, a target time-frequency resource for transmitting a pilot signal, where the target time-frequency resource corresponds to a total quantity of layers of a to-be-transmitted data stream, the N pilot patterns are different from each other, and N is a natural number greater than or equal to 1; and sending, by the transmit end device, indication information to a receive end device, where the indication information is used to instruct the receive end device to transmit the pilot signal to the transmit end device based on the target time-frequency resource.

9 Claims, 28 Drawing Sheets

| Antenna port number | Index number | Quantity of layers |
|---|---|---|
| #0 to #3 | 1 | 4 |
| #4 to #11 | 2 | 8 |
| #12 to #23 | 3 | 12 |
| #24 to #39 | 4 | 16 |
| #40 to #59 | 5 | 20 |
| #60 to #83 | 6 | 24 |

(56) References Cited

FOREIGN PATENT DOCUMENTS

| CN | 101795189 A | 8/2010 |
| CN | 104702387 A | 6/2015 |
| EP | 2216926 B1 | 8/2011 |
| EP | 2536231 A1 | 12/2012 |
| WO | 2015069180 A1 | 5/2015 |
| WO | 2015188355 A1 | 12/2015 |

OTHER PUBLICATIONS

"Summary of signalling details for additional DMRS ports", 3GPP TSG RAN WG1 Meeting #83, Anaheim, USA, R1-157124, 3rd Generation Partnership Project, Valbonne, France (Nov. 15-22, 2015).

* cited by examiner

| Antenna port number | Index number | Quantity of layers |
|---|---|---|
| #0 to #3 | 1 | 4 |
| #4 to #11 | 2 | 8 |
| #12 to #23 | 3 | 12 |
| #24 to #39 | 4 | 16 |
| #40 to #59 | 5 | 20 |
| #60 to #83 | 6 | 24 |

| Antenna port number | Index number | Quantity of layers |
|---|---|---|
| #0 to #3 | 1 | 4 |
| #0 to #7 | 2 | 8 |
| #0 to #11 | 3 | 12 |
| #0 to #15 | 4 | 16 |

METHOD AND APPARATUS FOR TRANSMITTING PILOT SIGNAL

CROSS-REFERENCE TO RELATED APPLICATION

This application is a continuation of International Application No. PCT/CN2016/107440, filed on Nov. 28, 2016, which claims priority to Chinese Patent Application No. 201610069267.5, filed on Feb. 3, 2016, The disclosures of the aforementioned applications are hereby incorporated by reference in their entireties.

TECHNICAL FIELD

Embodiments of this application relate to the communications field, and more specifically, to a method and an apparatus for transmitting a pilot signal.

BACKGROUND

A large-scale antenna array is one of key technologies for improving a throughput of a wireless communications system, and also provides a basis for spatial multiplexing of data streams on more layers.

In an existing Long Term Evolution (LTE) system, a multiple-antenna configuration already supports spatial multiplexing of data streams on up to eight layers. To support simultaneous transmission of data streams on up to eight layers, a maximum of eight antenna ports are configured for pilot signals such as demodulation reference signals (DMRS) in terms of structure. A DMRS of each antenna port is discretely distributed on a time-frequency resource of each resource block (RB) pair. In an existing LTE protocol, resource elements (RE) that are occupied by a DMRS on each RB pair are configured based on a maximum transport layer quantity (that is, 8), and overheads of the REs that are occupied by the DMRS on each RB pair account for 14.3%. Even if only one transport layer is used in actual data stream transmission, a pilot resource that is pre-configured based on the maximum transport layer quantity still needs to be reserved for a time-frequency resource of each layer. Consequently, idle pilot resources are a great waste, resulting in extremely low resource usage.

With development of communications systems, a quantity of transport layers for a data stream certainly increases. If a time-frequency resource is still allocated to a pilot signal by using an existing method, overheads of REs that are occupied by the pilot signal on each RB pair increase as the maximum transport layer quantity increases. For example, when the maximum transport layer quantity is 8, overheads of REs that are occupied by a DMRS on each RB pair account for 14.3%; or when the maximum transport layer quantity is 16, overheads of REs that are occupied by a DMRS on each RB pair account for 28.6%. It may be learned that, when the maximum transport layer quantity is larger, more idle pilot resources are wasted.

Therefore, how to improve usage of idle pilot resources becomes a technical problem urgently to be resolved.

SUMMARY

This application provides a method and an apparatus for transmitting a pilot signal, to improve resource usage.

According to a first aspect, this application provides a method for transmitting a pilot signal. The method includes: determining, by a transmit end device based on prestored N pilot patterns, a target time-frequency resource for transmitting a pilot signal, where the target time-frequency resource corresponds to a total quantity of layers of a to-be-transmitted data stream, N is a natural number greater than or equal to 1, and the N pilot patterns are different from each other when N is greater than 1; and sending, by the transmit end device, indication information to a receive end device, where the indication information is used to instruct the receive end device to receive the pilot signal from the transmit end device based on the target time-frequency resource.

Therefore, the transmit end device determines, based on one or more prestored pilot patterns, a time-frequency resource corresponding to the quantity of layers of the to-be-transmitted data stream, so that a pilot resource for transmitting the pilot signal can vary with a quantity of actual layers for transmitting the data stream. In this way, an idle pilot resource configured based on the prior art in a pilot pattern is released to transmit data, so that more flexible resource configuration is achieved, thereby improving resource usage.

With reference to the first aspect, in a first possible implementation of the first aspect, the transmit end device may determine a target pilot pattern corresponding to the total quantity of layers of the to-be-transmitted data stream in the prestored N pilot patterns. The target pilot pattern is used to indicate the target time-frequency resource for transmitting the pilot signal, N is determined based on a maximum transport layer quantity L supported by the transmit end device, and L is a natural number greater than or equal to 1.

Further, the transmit end device prestores a one-to-one mapping relationship between N layer quantity groups and the N pilot patterns. A layer quantity included in an $i^{th}$ layer quantity group in the N layer quantity groups is a natural number greater than $(i-1) \times \lceil L/N \rceil$ and less than or equal to $i \times \lceil L/N \rceil$, $i \in [1, N]$, and $N = \lceil L/C \rceil$, where $\lceil \ \rceil$ represents roundup, C is a code length of an orthogonal cover code used between transport layers, a value of C is $2^n$, and n is a natural number greater than or equal to 1. The transmit end device determines a corresponding layer quantity group based on the total quantity of layers of the to-be-transmitted data stream, and the transmit end device determines the target pilot pattern corresponding to the layer quantity group in the preset N pilot patterns based on the one-to-one mapping relationship between the N layer quantity groups and the N pilot patterns.

With reference to the foregoing possible implementation of the first aspect, in a second possible implementation of the first aspect, the transmit end device sends the indication information to the receive end device, where the indication information is specifically used to indicate an antenna port number for transmitting the pilot signal, and the antenna port number is determined by the transmit end device based on the total quantity of layers of the to-be-transmitted data stream, so that the receive end device determines the target pilot pattern corresponding to the antenna port number, so as to determine the target time-frequency resource based on the target pilot pattern, and receive the pilot signal from the transmit end device based on the target time-frequency resource. The transmit end device and the receive end device prestore a one-to-one mapping relationship between the N pilot patterns and N antenna port number groups, any antenna port number in an $i^{th}$ port number group is used to uniquely indicate an $i^{th}$ pilot pattern, and $i \in [1, N]$.

The indication information of the antenna port number may be sent to the receive end device, to indicate a space domain resource for sending the pilot signal, so that the target pilot pattern is indicated by using the antenna port number, and a time-frequency resource for sending the pilot signal may be determined. In this way, resources for sending the pilot signal are determined in three dimensions: space domain, time domain, and frequency domain.

Further, the transmit end device determines that a quantity $M_1$ of bits that carry the antenna port number for transmitting the pilot signal is: $M_1 = \lceil \log_2(\Sigma_{i=1}^{N} i \times \lceil L/N \rceil) \rceil$, where $\lceil \ \rceil$ represents roundup. The transmit end device sends the indication information by using the $M_1$ bits, where the indication information is used to indicate the antenna port number for transmitting the pilot signal.

Optimization processing is performed on the antenna port number, so that the optimized antenna port number can implicitly indicate an index number of the target pilot pattern, so as to determine the target pilot pattern. The indication information requires very low signaling overheads, and an idle pilot resource can be released to transmit data, thereby implementing resource multiplexing, and improving resource usage and data transmission efficiency.

With reference to the foregoing possible implementation of the first aspect, in a third possible implementation of the first aspect, the transmit end device sends the indication information to the receive end device, where the indication information is specifically used to indicate an index number of the target pilot pattern, and the index number of the target pilot pattern is determined by the transmit end device based on the total quantity of layers of the to-be-transmitted data stream, so that the receive end device determines the target pilot pattern corresponding to the index number of the target pilot pattern, so as to determine the target time-frequency resource based on the target pilot pattern, and receive the pilot signal from the transmit end device based on the target time-frequency resource. The transmit end device and the receive end device prestore a one-to-one mapping relationship between the N pilot patterns and index numbers of the N pilot patterns.

The indication information of the index number of the target pilot pattern may be sent to the receive end device, to indicate the target pilot pattern for sending the pilot signal, so as to determine a time-frequency resource for sending the pilot signal. In addition, the indication information of the antenna port number may further be sent to the receive end device, to indicate a space domain resource for sending the pilot signal. In this way, resources for sending the pilot signal are determined in three dimensions: space domain, time domain, and frequency domain.

Further, the transmit end device determines that a quantity $M_2$ of bits that carry the index number of the target pilot pattern is: $M_2 = \lceil \log_2 N \rceil$, where $\lceil \ \rceil$ represents roundup. The transmit end device sends the indication information by using the $M_2$ bits, where the indication information is used to indicate the index number of the target pilot pattern.

The indication information of the index number of the target pilot pattern may be directly sent to the receive end device, to directly determine the target pilot pattern. The indication information requires very low signaling overheads, and an idle pilot resource can be released to transmit data, thereby implementing resource multiplexing, and improving resource usage and data transmission efficiency.

With reference to the foregoing possible implementation of the first aspect, in a fourth possible implementation of the first aspect, the N pilot patterns include a first pilot pattern, and the first pilot pattern is used to indicate, when the total quantity of layers of the to-be-transmitted data stream is a maximum transport layer quantity L supported by the transmit end device, pre-configured d×L resource elements REs for transmitting L pilot signals, where d is a density of a pilot signal that corresponds to each transport layer and that is on each resource block RB pair, d is a natural number greater than or equal to 1, L is a natural number greater than or equal to 1, $L = n_F \times n_T$, $n_F$ is a quantity of REs that are used by the L pilot signals on each RB pair in a frequency domain resource direction, $n_T$ is a quantity of REs that are used by the L pilot signals on each RB pair in a time domain resource direction, the indication information includes an indication bitmap, and the target time-frequency resource includes a target RE. The transmit end device determines, based on the prestored first pilot pattern, the target RE for transmitting the pilot signal, where the target RE corresponds to the total quantity of layers of the to-be-transmitted data stream. The transmit end device determines, based on a prestored first mapping relationship diagram, corresponding bits of the target RE for transmitting the pilot signal that are in the indication bitmap, where the first mapping relationship diagram is used to indicate a correspondence between the d×L REs in the first pilot pattern and the bits in the indication bitmap. The transmit end device sends the indication bitmap to the receive end device, where the indication bitmap is used to instruct the receive end device to receive the pilot signal from the transmit end device based on the target RE, and the receive end device prestores the first mapping relationship diagram.

The correspondence between the d×L resource elements REs for transmitting the L pilot signals and the bits in the indication bitmap is determined based on a prestored first mapping relationship diagram, so that a location of the target RE in the first pilot pattern is indicated by using the indication bitmap after the target RE for transmitting the pilot signal is determined, so as to determine the target time-frequency resource. In addition, the receive end device and the transmit end device only need to prestore a same first mapping relationship diagram, thereby reducing resource occupation.

With reference to the foregoing possible implementation of the first aspect, in a fifth possible implementation of the first aspect, the indication bitmap includes a one-dimensional indication bitmap. The transmit end device determines the one-dimensional indication bitmap, where the one-dimensional indication bitmap is used to indicate a resource corresponding to the target RE in a first dimensional direction, and the first dimensional direction is the frequency domain resource direction or the time domain resource direction. The transmit end device determines, based on a quantity of target REs that are used by the L pilot signals on each RB pair in the first dimensional direction, that a quantity of bits used to indicate the target REs is $M_3 = L/n_F$ or $M_3 = L/n_T$. The transmit end device sends the one-dimensional indication bitmap by using the $M_3$ bits.

The target RE is indicated by using the one-dimensional indication bitmap, so that the transmit end device can select a specific to-be-released resource based on a current data transmission status and based on a quantity of resources that can be released, and a resource that can be released may be explicitly indicated by using bits in the indication bitmap without being limited to a fixed pilot pattern. Therefore, more flexible and convenient time-frequency resource configuration is achieved.

With reference to the foregoing possible implementation of the first aspect, in a sixth possible implementation of the first aspect, the indication bitmap includes a two-dimensional indication bitmap. The transmit end device determines the two-dimensional indication bitmap. The two-dimensional indication bitmap is used to indicate resources corresponding to the target RE in a first dimensional direction and a second dimensional direction. The first dimensional direction is the frequency domain resource direction and the second dimensional direction is the time domain resource direction, or the first dimensional direction is the time domain resource direction and the second dimensional direction is the frequency domain resource direction. The transmit end device determines, based on a quantity of target REs that are used by the L pilot signals on each RB pair in the first dimensional direction and a quantity of target REs that are used by the L pilot signals on each RB pair in the second dimensional direction, that a quantity of bits used to indicate the target REs is $M_4=L/n_F+L/n_T$. The transmit end device sends the two-dimensional indication bitmap by using the $M_4$ bits.

The target RE is indicated by using the two-dimensional indication bitmap, so that the transmit end device can select a specific to-be-released resource based on a current data transmission status and based on a quantity of resources that can be released, and a resource that can be released may be explicitly indicated by using bits in the indication bitmap without being limited to a fixed pilot pattern. Therefore, more flexible and convenient time-frequency resource configuration is achieved. In addition, signaling overheads required by the two-dimensional indication bitmap are higher than signaling overheads required by the one-dimensional indication bitmap, but the two-dimensional indication bitmap may be used in combination with one or more other two-dimensional indication bitmaps to indicate an idle pilot resource, so that densities of the pilot signal in a time domain direction and a frequency domain direction are flexibly switched, and resources used by the pilot signal in terms of time domain resources and frequency domain resources are adjustable. Therefore, resource configuration flexibility is further improved.

According to a second aspect, this application provides a method for transmitting a pilot signal. The method includes: receiving, by a receive end device, indication information sent by a transmit end device; determining, by the receive end device based on the indication information, a target time-frequency resource for transmitting a pilot signal, where the target time-frequency resource is determined by the transmit end device based on prestored N pilot patterns, the target time-frequency resource corresponds to a total quantity of layers of a to-be-transmitted data stream, N is a natural number greater than or equal to 1, and the N pilot patterns are different from each other when N is greater than 1; and receiving, by the receive end device, the pilot signal from the transmit end device based on the target time-frequency resource.

Therefore, the transmit end device determines, based on one or more prestored pilot patterns, a time-frequency resource corresponding to the quantity of layers of the to-be-transmitted data stream, so that a pilot resource for transmitting the pilot signal can vary with a quantity of actual layers for transmitting the data stream. In this way, an idle pilot resource configured based on the prior art in a pilot pattern is released to transmit data, so that more flexible resource configuration is achieved, thereby improving resource usage.

With reference to the second aspect, in a first possible implementation of the second aspect, the indication information is specifically used to indicate an antenna port number for transmitting the pilot signal. The receive end device determines a target pilot pattern based on the antenna port number, where the transmit end device and the receive end device prestore a one-to-one mapping relationship between the N pilot patterns and N antenna port number groups, any antenna port number in an $i^{th}$ port number group is used to uniquely indicate an pilot pattern, and i∈[1, N]. The receive end device determines the target time-frequency resource based on the target pilot pattern.

A space domain resource for sending the pilot signal is determined based on the antenna port number, and a time-frequency resource for sending the pilot signal is determined based on the target pilot pattern indicated by the antenna port number. In this way, resources for sending the pilot signal are determined in three dimensions: space domain, time domain, and frequency domain. The target pilot pattern is indicated by using the antenna port number, so that an idle resource can be released to transmit data, thereby implementing resource multiplexing, and improving resource usage and data transmission efficiency.

With reference to the foregoing possible implementation of the second aspect, in a second possible implementation of the second aspect, the indication information is specifically used to indicate an index number of a target pilot pattern. The receive end device determines the target pilot pattern based on the index number of the target pilot pattern, where the transmit end device and the receive end device prestore a one-to-one mapping relationship between the N pilot patterns and index numbers of the N pilot patterns. The receive end device determines the target time-frequency resource based on the target pilot pattern.

The target pilot pattern is indicated by using the index number of the target pilot pattern, so that an idle resource can be released to transmit data, thereby implementing resource multiplexing, and improving resource usage and data transmission efficiency.

With reference to the foregoing possible implementation of the second aspect, in a third possible implementation of the second aspect, the N pilot patterns include a first pilot pattern, and the first pilot pattern is used to indicate, when the total quantity of layers of the to-be-transmitted data stream is a maximum transport layer quantity L supported by the transmit end device, pre-configured d×L resource elements REs for transmitting L pilot signals, where d is a density of a pilot signal that corresponds to each transport layer and that is on each resource block RB pair, d is a natural number greater than or equal to 1, L is a natural number greater than or equal to 1, $L=n_F \times n_T$, $n_F$ is a quantity of REs that are used by the L pilot signals on each RB pair in a frequency domain resource direction, $n_T$ is a quantity of REs that are used by the L pilot signals on each RB pair in a time domain resource direction, the indication information includes an indication bitmap, and the target time-frequency resource includes a target RE. The receive end device determines, based on the indication bitmap and a prestored first mapping relationship diagram, the target RE for transmitting the pilot signal, where the first mapping relationship diagram is used to indicate a correspondence between the d×L REs in the first pilot pattern and bits in the indication bitmap, and the transmit end device prestores the first mapping relationship diagram.

The correspondence between the d×L resource elements REs for transmitting the L pilot signals and the bits in the indication bitmap is determined based on a prestored first mapping relationship diagram, so that a location of the target RE in the first pilot pattern is indicated by using the indication bitmap after the target RE for transmitting the pilot signal is determined, so as to determine the target time-frequency resource. In addition, the receive end device and the transmit end device only need to prestore a same first mapping relationship diagram, thereby reducing resource occupation.

Further, the indication bitmap includes a one-dimensional indication bitmap and a two-dimensional indication bitmap, the one-dimensional indication bitmap is used to indicate a resource corresponding to the target RE in a first dimensional direction, and the two-dimensional indication bitmap is used to indicate resources corresponding to the target RE in the first dimensional direction and a second dimensional direction. The first dimensional direction is the frequency domain resource direction and the second dimensional direction is the time domain resource direction, or the first dimensional direction is the time domain resource direction and the second dimensional direction is the frequency domain resource direction.

The target RE is indicated by using the one-dimensional indication bitmap and the two-dimensional indication bitmap, so that the transmit end device can select a specific to-be-released resource based on a current data transmission status and based on a quantity of resources that can be released, and a resource that can be released may be explicitly indicated by using bits in the indication bitmap without being limited to a fixed pilot pattern. Therefore, more flexible and convenient time-frequency resource configuration is achieved. Further, the two-dimensional indication bitmap may be used in combination with one or more other two-dimensional indication bitmaps to indicate an idle pilot resource, so that densities of the pilot signal in a time domain direction and a frequency domain direction are flexibly switched, and resources used by the pilot signal in terms of time domain resources and frequency domain resources are adjustable. Therefore, resource configuration flexibility is further improved.

According to a third aspect, this application provides an apparatus for transmitting a pilot signal, configured to perform the method in any one of the first aspect or the possible implementations of the first aspect. Specifically, the apparatus includes modules configured to perform the method in any one of the first aspect or the possible implementations of the first aspect.

According to a fourth aspect, this application provides an apparatus for transmitting a pilot signal, configured to perform the method in any one of the second aspect or the possible implementations of the second aspect. Specifically, the apparatus includes modules configured to perform the method in any one of the second aspect or the possible implementations of the second aspect.

According to a fifth aspect, this application provides a device for transmitting a pilot signal. The device includes: a transceiver, a memory, a processor, and a bus system. The transceiver, the memory, and the processor are connected by using the bus system. The memory is configured to store an instruction. The processor is configured to execute the instruction stored in the memory, to control the transceiver to send and receive a signal, and when the processor executes the instruction stored in the memory, the execution makes the processor perform the method in any one of the first aspect or the possible implementations of the first aspect.

According to a sixth aspect, this application provides a device for transmitting a pilot signal. The device includes: a transceiver, a memory, a processor, and a bus system. The transceiver, the memory, and the processor are connected by using the bus system. The memory is configured to store an instruction. The processor is configured to execute the instruction stored in the memory, to control the transceiver to send and receive a signal, and when the processor executes the instruction stored in the memory, the execution makes the processor perform the method in any one of the first aspect or the possible implementations of the first aspect.

According to a seventh aspect, this application provides a computer readable medium, configured to store a computer program. The computer program includes an instruction for performing the method in any one of the first aspect or the possible implementations of the first aspect.

According to an eighth aspect, this application provides a computer readable medium, configured to store a computer program. The computer program includes an instruction for performing the method in any one of the second aspect or the possible implementations of the second aspect.

In some implementations, a transmit end device is a network device and a receive end device is user equipment; or a transmit end device is user equipment and a receive end device is a network device.

This application provides the method and the apparatus for transmitting a pilot signal, so that an idle pilot resource can be released to transmit data, thereby improving resource usage.

DESCRIPTION OF EMBODIMENTS

Figure 1:
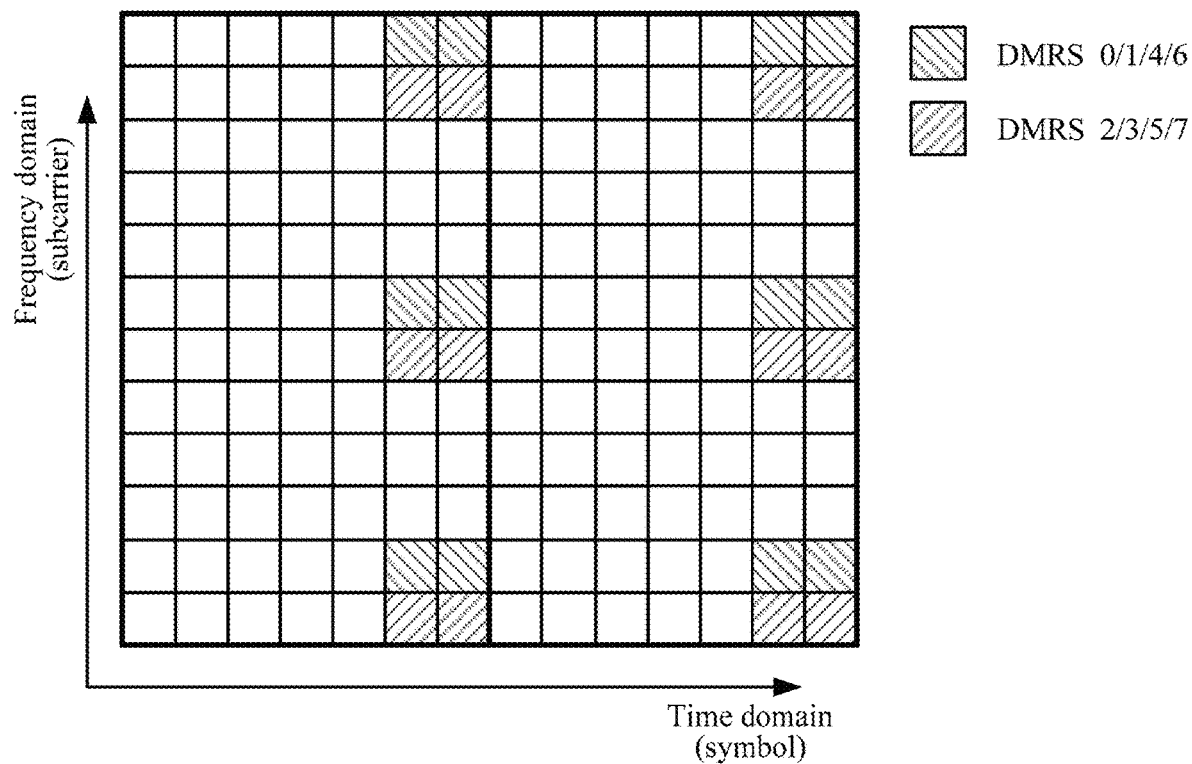
FIG. 1 is a schematic diagram of a configuration pattern of a time-frequency resource for transmitting a DMRS in the prior art.

The following clearly describes the technical solutions in the embodiments of this application with reference to the accompanying drawings in the embodiments of this application.

Terms such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and based on, for example, a signal having one or more data packets (for example, data from two components interacting with another component in a local system, a distributed system, and/or across a network such as the Internet interacting with other systems by using the signal).

In this application, the embodiments are described with reference to a terminal device. The terminal device may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, and a terminal device in a future 5G network.

In addition, in this application, the embodiments are described with reference to a network device. The network device may be a device such as a network side device for communicating with a mobile device. The network side device may be a base transceiver station (BTS) in a Global System for Mobile Communications (GSM) or Code Division Multiple Access (CDMA), or may be a NodeB (NB) in Wideband Code Division Multiple Access (WCDMA), or may be an eNB or evolved NodeB (eNodeB) in LTE, or a relay station or an access point, or an in-vehicle device, a wearable device, or a network side device in a future 5G network.

In addition, aspects or features of this application may be implemented as a method, an apparatus, or a product that uses standard programming and/or engineering technologies. The term "product" used in this application covers a computer program that can be accessed from any computer readable component, carrier or medium. For example, the computer readable medium may include, but is not limited to: a magnetic storage component (for example, a hard disk, a floppy disk, or a magnetic tape), an optical disc (for example, a compact disc (CD), a digital versatile disc (DVD), a smart card, and a flash memory component (for example, an erasable programmable read-only memory (EPROM), a card, a stick, or a key drive). In addition, various storage media described in this specification may indicate one or more devices and/or other machine readable media for storing information. The term "machine readable media" may include, but is not limited to, a radio channel, and various other media that can store, contain and/or carry an instruction and/or data.

It should be understood that, a multiple-input multiple-output (MIMO) technology means that a transmit end device and a receive end device respectively use a plurality of transmit antennas and a plurality of receive antennas, so that signals are sent or received by using the plurality of antennas of the transmit end device or the receive end device, thereby improving communication quality. The multiple-input multiple-output technology can fully use a space resource and implement transmission and reception by using multiple transmit antennas and multiple receive antennas, and can multiply a system channel capacity without an increase in spectrum resources and antenna transmit power.

Specifically, the transmit end device performs bit mapping processing on a plurality of layers of information bits that need to be sent to a terminal device, and maps a modulation signal to one or more transport layers, to generate one or more layers of data streams (this may also be referred to as layer mapping). The transmit end device then maps the one or more layers of data streams to antenna ports, and performs resource mapping on the antenna ports, to generate an orthogonal frequency division multiplexing (OFDM) symbol and transmit the orthogonal frequency division multiplexing symbol.

To support simultaneous transmission of data streams on a plurality of layers, the layers correspond to antenna ports, and each layer corresponds to at least one antenna port. It should be noted that, the antenna port described herein may be understood as a logical port used for transmission. The antenna ports are not in a one-to-one correspondence with physical antennas. An antenna port may be defined by a pilot signal (for example, a DMRS) used for the antenna. In other words, one DMRS corresponds to one antenna port.

A method for configuring a time-frequency resource for transmitting a DMRS in the prior art is described below in detail with reference to FIG. 1 by using an example in which a maximum transport layer quantity is 8.

FIG. 1 is a schematic diagram of a configuration pattern of a time-frequency resource for transmitting a DMRS in the prior art. As shown in FIG. 1, a communications system supports spatial multiplexing of data streams on a maximum of eight layers. To support simultaneous transmission of data streams on eight layers, a maximum of eight antenna ports are configured for DMRSs in terms of structure. For ease of description and differentiation, the eight antenna ports are denoted as #0 to #7, and each port number corresponds to one port. A DMRS of each antenna port is discretely distributed on a time-frequency resource of an RB pair. In this way, a channel estimator of a receiver may resist a time-varying property of a channel by means of temporal filtering, and overcome frequency selectivity of the channel by means of frequency domain filtering. DMRSs between the antenna ports are orthogonal to each other by means of frequency division multiplexing (Frequency Division Multiplexing, "FDM" for short) and code division multiplexing (Code Division Multiplexing, "CDM" for short). As shown in FIG. 1, the DMRSs corresponding to the eight antenna ports are grouped into two groups: DMRSs corresponding to #0, #1, #4, and #6 (which are denoted as DMRSs 0/1/4/6 for ease of description) and DMRSs corresponding to #2, #3, #5, and #7 (which are denoted as DMRSs 2/3/5/7 for ease of description). Frequency division multiplexing is used between the two groups, and within each group, orthogonal cover code (Orthogonal Cover Code, "OCC" for short) code division multiplexing is used between four antenna ports (that is, #0, #1, #4, and #6) corresponding to the DMRSs 0/1/4/6. On a transport layer corresponding to the port number #0, #1, #4, or #6, a time-frequency resource used by the DMRS 2/3/5/7 needs to be reserved to avoid interference of data to the DMRS. Likewise, on a transport layer corresponding to the port number #2, #3, #5, or #7, a time-frequency resource used by the DMRS 0/1/4/6 needs to be reserved to avoid interference of data to the DMRS.

In the prior art, regardless of a quantity of actual transport layers after link adaptation, or a quantity of actual transport layers after transparent switching between a single-user mode and a multi-user mode, the receive end device can only send and receive data based on indication information of the transmit end device on an antenna port indicated by the transmit end device, and does not know whether data is transmitted on other transport layers. Therefore, all time-frequency resources used by the eight antenna ports need to be reserved. It may be learned from FIG. 1 that, when a quantity of actual transport layers is any one of 1 to 8, an RE (or a pilot resource) that is used to transmit a DMRS accounts for $$\frac{12 \times 2 \times 2}{12 \times 14 \times 2} \times 100\% = 14.3\%$$

on each RB pair. Further, as the maximum transport layer quantity supported by the communications system increases, pilot signals also increase, and the occupation percentage of the RE that is used to transmit a DMRS and that is on each RB pair is higher.

Therefore, when the quantity of actually used transport layers is different from the maximum transport layer quantity supported by the communications system, a larger difference between the quantity of actually used layers and the maximum transport layer quantity indicates that there are more idle pilot resources, a greater waste is caused, and resource usage is lower.

This application provides a method for transmitting a pilot signal, so that a pilot resource can be determined based on a quantity of actual transport layers, and a pilot resource pre-configured based on a configuration method in the prior art and a maximum transport layer quantity is released to transmit data, thereby achieving more flexible resource configuration, and improving resource usage.

The following describes, in detail, a method for transmitting a pilot signal according to the embodiments of this application with reference to FIG. 2 to FIG. 14.

In addition, a "pilot signal" described below may be, for example, an orthogonal pilot signal. Descriptions of same or similar cases are omitted below to avoid repetition.

Figure 2:
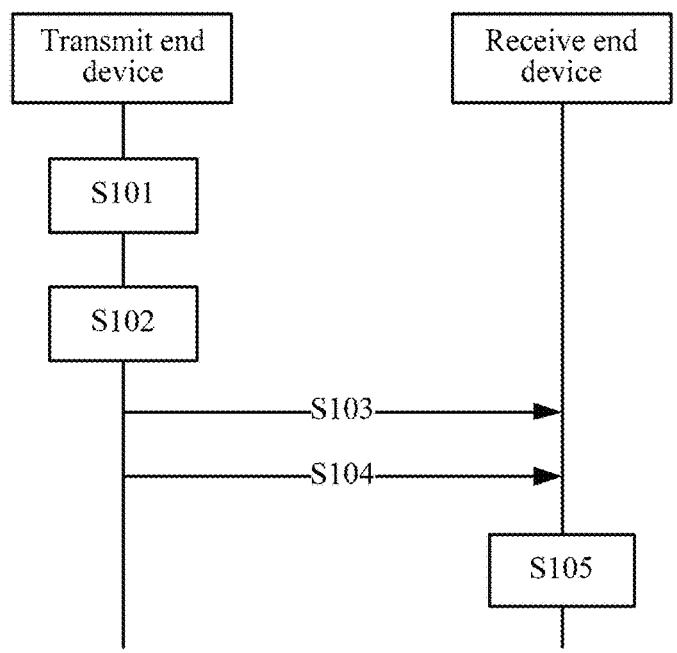
FIG. 2 is a schematic flowchart of a method for transmitting a pilot signal according to an embodiment of this application.

FIG. 2 is a schematic flowchart of a method 100 for transmitting a pilot signal according to an embodiment of this application. Specifically, in FIG. 2, the method 100 for transmitting a pilot signal according to this embodiment of this application is described from a perspective of interaction of devices.

Optionally, a transmit end device is a network device and a receive end device is a terminal device; or the transmit end device is a terminal device and the receive end device is a network device.

In all the embodiments of this application, the transmit end device may be a network device (for example, a network side device such as a base station) and the receive end device may be a terminal device (for example, user equipment). The method 100 is applicable to downlink transmission.

Alternatively, the transmit end device may be a terminal device (for example, user equipment) and the receive end device may be a network device (for example, a network side device such as a base station). The method 100 is applicable to uplink transmission.

As shown in FIG. 2, the method 100 includes the following steps.

S101. The transmit end device determines a total quantity of layers of a to-be-transmitted data stream.

Specifically, in a high-order multi-user multiple-input multiple-output (MU-MIMO) communications system, when a maximum transport layer quantity that can be supported by the system is larger, a rank adaptation range is larger. After link adaptation, when a quantity of actual layers for sending a data stream is less than the maximum transport layer quantity, or when a channel environment changes, or when switching is performed between a single-user (SU) MIMO mode and a MU-MIMO mode, a quantity of actually used transport layers changes, and the transmit end device needs to determine a total quantity of layers of a current to-be-transmitted data stream. A process in which the transmit end device determines the total quantity of layers of the to-be-transmitted data stream may be the same as that in the prior art. To avoid repetition, detailed descriptions thereof are omitted herein.

It should be noted that, the "layer quantity" described above is used to indicate a quantity of layers. Descriptions of same or similar cases are omitted below to avoid repetition.

S102. The transmit end device determines, based on prestored N pilot patterns, a target time-frequency resource for transmitting a pilot signal, where the target time-frequency resource corresponds to the total quantity of layers of the to-be-transmitted data stream.

Specifically, after determining the total quantity of layers of the to-be-transmitted data stream, the transmit end device may determine, in the preset N pilot patterns, a time-frequency resource (which is referred to as the target time-frequency resource for ease of differentiation and description) for transmitting the pilot signal. Alternatively, the transmit end device may determine, in the preset N pilot patterns, a pilot pattern (which is referred to as a target pilot pattern for ease of differentiation and description) corresponding to the total quantity of layers of the to-be-transmitted data stream, so as to determine the target time-frequency resource based on the target pilot pattern. N is a natural number greater than or equal to 1, and the N pilot patterns are different from each other when N is greater than 1.

S103. The transmit end device sends indication information to the receive end device, where the indication information is used to instruct the receive end device to receive the pilot signal from the transmit end device based on the target time-frequency resource.

Specifically, the transmit end device may send the indication information to the receive end device after determining the target time-frequency resource, to instruct the receive end device to receive the pilot signal based on the target time-frequency resource. It should be noted that, the transmit end device may further send, to the receive end device, indication information used to indicate an antenna port number, to instruct the receive end device to receive the pilot signal and data according to the antenna port number. That is, the transmit end device may send one or more pieces of indication information to the receive end device, and the one or more pieces of indication information are used to indicate resources in three dimensions: space domain, time domain, and frequency domain that are used during transmission between the receive end device and the transmit end device.

S104. The transmit end device sends the pilot signal to the receive end device based on the target time-frequency resource.

Specifically, the transmit end device may determine, based on the quantity of layers of the to-be-transmitted data stream, a sequence, the antenna port number, and the target time-frequency resource that are used to transmit the pilot signal, or determine space domain, time domain, and frequency domain resources that are used to transmit the pilot signal. The transmit end device sends, on the target time-frequency resource based on the antenna port number, the sequence corresponding to the pilot signal to the receive end device, for the receive end device to perform channel estimation.

S105. The receive end device receives the pilot signal from the transmit end device based on the indication information.

Specifically, after receiving the one or more pieces of indication information, the receive end device determines the space domain, time domain, and frequency domain resources that are used to transmit the pilot signal, receives, on the target time-frequency resource based on an indicated antenna port, the pilot signal sent by the transmit end device, and demodulates, through channel estimation, data transmitted from the transmit end device.

It should be noted that, in this embodiment of this application, a process in which a space domain resource for transmitting a pilot signal is configured is the same as a specific process in the prior art. To avoid repetition, detailed descriptions thereof are omitted herein.

Sequence numbers of the foregoing processes do not indicate an execution sequence. The execution sequence of the processes should be determined according to functions and internal logic of the processes, and should not be construed as any limitation on the implementation processes of the embodiments of this application. For example, S103 may be performed after S104, or S103 and S104 may be performed at the same time.

Therefore, according to the method for transmitting a pilot signal in this embodiment of this application, the transmit end device determines, based on the prestored pilot patterns, a time-frequency resource corresponding to the quantity of layers for transmitting the data stream, so that a pilot resource for transmitting the pilot signal can vary with a quantity of actual layers for transmitting the data stream. In this way, more resources are released to transmit data, so that more flexible resource configuration is achieved, thereby improving resource usage.

The foregoing describes, in detail with reference to FIG. 2 from the perspective of the interaction of devices, the method 100 for transmitting a pilot signal according to this embodiment of this application. The following describes, in detail with reference to FIG. 3 to FIG. 14, a specific process in which the transmit end device determines the target time-frequency resource and indicates the target time-frequency resource to the receive end device.

Specifically, in this embodiment of this application, the transmit end device may determine the target time-frequency resource based on the prestored N (N≥1) pilot patterns and indicate the target pilot pattern to the receive end device (a method 1), or may determine the target time-frequency resource based on a prestored pilot pattern (for example, a first pilot pattern) and indicate the target time-frequency resource to the receive end device (a method 2).

The following separately describes, in detail with reference to the method 1 and the method 2, the method for transmitting a pilot signal according to this embodiment of this application.

For ease of understanding and description, the method for transmitting a pilot signal according to this embodiment of this application is described in detail by using an example in which a network device (for example, a base station) is used as the transmit end device and user equipment is used as the receive end device.

It should be understood that, the base station and the user equipment that are provided herein are merely described by way of example, and should not be construed as any limitation on this application. This application should not be limited thereto either. For example, the transmit end device may be a macro base station or may be a small cell, or a pilot signal is sent by a macro base station and a small cell together. Specifically, the transmit end device may be a macro base station. The macro base station configures a resource for transmitting a pilot signal, and sends the pilot signal by using the resource. The transmit end device may alternatively be a small cell. The small cell configures a resource for transmitting a pilot signal, and sends the pilot signal by using the resource. The transmit end device may alternatively include a macro base station and a small cell. The macro base station configures a resource for the small cell. The small cell allocates a resource to each user equipment from the resource configured by the macro base station for the small cell, and the small cell sends a pilot signal by using the resource allocated to each user equipment. Any method in which a pilot resource is configured by the transmit end device to send a pilot signal to the receive end device falls within the protection scope of this application.

It should be noted that, the transmit end device described herein may be understood as a device for sending a pilot signal, and the receive end device may be understood as a device for receiving a pilot signal. The transmit end device may be configured to send and receive a data stream, and the receive end device may also be configured to receive and send a data stream. This is not specially limited in this application.

Method 1:

In an embodiment, the transmit end device determines a target pilot pattern corresponding to the total quantity of layers of the to-be-transmitted data stream in the prestored N pilot patterns. The target pilot pattern is used to indicate the target time-frequency resource for transmitting the pilot signal, N is determined based on a maximum transport layer quantity L supported by the transmit end device, and L is a natural number greater than or equal to 1.

Specifically, the base station (that is, an example of the network device) determines the N pilot patterns based on the maximum transport layer quantity L supported by the communications system. For example, L is 16, and there may be 16, 8, or 4 pilot patterns corresponding to the 16 transport layers. The N pilot patterns have a mapping relationship with quantities of actually used transport layers. The base station may determine, based on the mapping relationship, a pilot pattern corresponding to the total quantity of layers of the to-be-transmitted data stream, that is, the target pilot pattern, and further determine, based on the target pilot pattern, the target time-frequency resource for transmitting the pilot signal, for example, an RE.

It should be understood that, the values of N provided above are merely described by way of example, and N may be determined based on L. When the maximum transport layer quantity is relatively small, N may also have a relatively small value, and when the maximum transport layer quantity is relatively large, N should also have a relatively large value, to ensure that as many pilot resources as possible are released when the maximum transport layer quantity is relatively large but there are a relatively small quantity of actual transport layers.

Optionally, the transmit end device prestores a one-to-one mapping relationship between N layer quantity groups and the N pilot patterns. A layer quantity included in an $i^{th}$ layer quantity group in the N layer quantity groups is a natural number greater than $(i-1)\times\lceil L/N \rceil$ and less than or equal to $i\times\lceil L/N \rceil$, $i\in[1, N]$, and $N=\lceil L/C \rceil$, where $\lceil\ \rceil$ represents roundup, C is a code length of an orthogonal cover code used between transport layers, a value of C is $2^n$, and n is a natural number greater than or equal to 1.

In this embodiment of this application, for ease of description, the one-to-one mapping relationship between the N layer quantity groups and the N pilot patterns is denoted as a first mapping relationship. It should be noted that, the first mapping relationship may be understood as a mapping relationship between the N pilot patterns and the quantities of actually used transport layers. The first mapping relationship includes, but is not limited to, the one-to-one mapping relationship between the N layer quantity groups and the N pilot patterns, or may be a one-to-one mapping relationship between the N pilot patterns and other parameters, for example, antenna port numbers, that are determined based on the quantity of layers of the to-be-transmitted data stream. Specific content included in the first mapping relationship is not specially limited in this application, and any method that can be used to indicate a mapping relationship between a quantity of transport layers and pilot patterns falls within the protection scope of this application.

Specifically, the base station may group L transport layers into N groups (which are referred to as layer quantity groups below for ease of description), and each layer quantity group corresponds to one pilot pattern. After determining the quantity of layers of the to-be-transmitted data stream, the base station may determine the target pilot pattern based on the first mapping relationship, so as to determine the target time-frequency resource.

In this embodiment of this application, each layer quantity group includes a plurality of layer quantities. Specifically, a layer quantity included in the $i^{th}$ layer quantity group is a natural number greater than $(i-1)\times\lceil L/N \rceil$ and less than or equal to $i\times \lceil L/N \rceil$, where $i\in[1, N]$.

For example, when the maximum transport layer quantity L supported by the communications system is 16, the base station may group the 16 transport layers into four groups, and every four adjacent layers are grouped as one group. In this case, the value of N is 4. Specifically, the quantity being 1 to 4 of actually used transport layers corresponds to a first pilot pattern, the quantity being 5 to 8 of actually used transport layers corresponds to a second pilot pattern, the quantity being 9 to 12 of actually used transport layers corresponds to a third pilot pattern, and the quantity being 13 to 16 of actually used transport layers corresponds to a fourth pilot pattern. Using an example in which i=2, a layer quantity included in a second layer quantity group is a value greater than 4 and less than or equal to 8, that is, the layer quantity included in the second layer quantity group is a value being 5 to 8.

Further, the N pilot patterns are different from each other. That is, when the quantity of actually used transport layers is relatively small, there are also a relatively small quantity of pilot signals and there are also few REs (which are referred to as target REs for ease of differentiation and description) in a corresponding pilot pattern for transmitting pilot signals (for example, DMRSs). For example, when the quantity of actually used transport layers is 1 to 4, four pilot signals need to correspond to the quantity of transport layers (or antenna ports). In this case, a proportion of resources that are occupied by target REs (that is, 12 REs) in the corresponding first pilot pattern on each RB pair is relatively low, and is only 7.14%.

In this embodiment of this application, N may be determined based on the maximum transport layer quantity L and the code length C of the orthogonal cover code OCC used between the transport layers, for example, $C=2^n$ (n is a natural number greater than or equal to 1). Specifically, $N=\lceil L/C \rceil$, where $\lceil\ \rceil$ represents roundup.

For example, when the maximum transport layer quantity L supported by the communications system is 16, and the code length C of the OCC used between the transport layers is 4, $N=\lceil 16/4 \rceil=4$. That is, four pilot patterns are configured for the 16 transport layers. Specifically, the quantity being 1 to 4 of actually used transport layers corresponds to the first pilot pattern, the quantity being 5 to 8 of actually used transport layers corresponds to the second pilot pattern, the quantity being 9 to 12 of actually used transport layers corresponds to the third pilot pattern, and the quantity being 13 to 16 of actually used transport layers corresponds to the fourth pilot pattern.

It should be noted that, the grouping method provided above for the maximum transport layer quantity is merely described by way of example, and should not be construed as any limitation on this application. For example, the base station may alternatively configure one pilot pattern for each quantity of actually used transport layers, or four or eight layers are grouped as one group in terms of the maximum transport layer quantity and this separately corresponds to four or two pilot patterns. When more groups are obtained through grouping or more pilot patterns are configured by the base station based on the maximum transport layer quantity, the configuration is more flexible, but a larger storage volume is occupied by the corresponding pilot patterns. Therefore, the base station can achieve flexible configuration based on the maximum transport layer quantity L and achieve flexible configuration based on an actual status of the system, to release as many idle pilot resources as possible.

It should be noted that, the N pilot patterns configured by the base station and a grouping rule may be agreed on in advance by the base station and the user equipment, and the mapping relationship (for example, the first mapping relationship) between the N pilot patterns and the quantities of actually used transport layers is prestored in the base station and the user equipment. Alternatively, the base station may configure the mapping relationship based on a network use status of the system in different time periods before transmitting the pilot signal to the user equipment, and then notify the user equipment of the mapping relationship. This is not specially limited in this application.

Then, the transmit end device sends the indication information to the receive end device. The indication information is used to instruct the receive end device to receive the pilot signal from the transmit end device based on the target time-frequency resource.

Specifically, the base station sends the indication information to the user equipment, to indicate the target time-frequency resource to the user equipment. The user equipment may receive the pilot signal and data from the base station based on the target time-frequency resource. Specific content of the indication information sent by the base station to the user equipment may be information for indicating the target pilot pattern. For example, the target pilot pattern may be indicated by using an antenna port number corresponding to the pilot pattern (a method 1a), or the target pilot pattern may be indicated by using an index number of the pilot pattern (a method 1b).

It should be noted that, the base station may send the indication information to the user equipment by using user-dedicated dynamic signaling, or may send the indication information to the user equipment by broadcasting public dynamic signaling. This is not specially limited in this application.

For ease of description, a specific process of indicating the target time-frequency resource by using the method 1 is described in detail below with reference to FIG. 3 to FIG. 8 (including FIG. 8a to FIG. 8d) by using a DMRS as an example of the pilot signal.

Method 1a

Optionally, the transmit end device sends the indication information to the receive end device. The indication information is specifically used to indicate an antenna port number for transmitting the pilot signal, and the antenna port number is determined by the transmit end device based on the total quantity of layers of the to-be-transmitted data stream, so that the receive end device determines the target pilot pattern corresponding to the antenna port number, so as to determine the target time-frequency resource based on the target pilot pattern, and receive the pilot signal from the transmit end device based on the target time-frequency resource. The transmit end device and the receive end device prestore a one-to-one mapping relationship between the N pilot patterns and N antenna port number groups, any antenna port number in an $i^{th}$ port number group is used to uniquely indicate an $i^{th}$ pilot pattern, and $i \in [1, N]$.

Specifically, after determining the quantity of layers of the to-be-transmitted data stream, the base station sends signaling to the user equipment to indicate antenna port numbers used for transmission, and a specific process in which the base station determines, based on the quantity of transport layers, the antenna port numbers used for transmission is similar to that in the prior art. Different from the prior art, the antenna port numbers may be grouped into N antenna port number groups based on the quantity of layers of the to-be-transmitted data stream, and each antenna port number group corresponds to one layer quantity group. That is, a layer quantity included in each layer quantity group is the same as a quantity of port numbers included in a corresponding antenna port number group. In addition, antenna port numbers in the N groups are different from each other. That is, each antenna port number appears only once among the N port number groups. Therefore, any port number in each antenna port number group may be used to uniquely indicate one pilot pattern. That is, the N antenna port number groups have a one-to-one mapping relationship with the N pilot patterns.

Optionally, the N antenna port number groups have a one-to-one mapping relationship with index numbers of the N pilot patterns, and the index numbers of the N pilot patterns have a one-to-one mapping relationship with the N pilot patterns.

In this embodiment of this application, the first mapping relationship may be indicated by using a one-to-one mapping relationship between antenna port numbers and index numbers of pilot patterns, and a pilot pattern corresponding to each index number is prestored in the base station and the user equipment. That is, the first mapping relationship may be indicated by using two mapping relationships (for example, a mapping relationship A and a mapping relationship B). The mapping relationship A is used to indicate the one-to-one mapping relationship between the antenna port numbers and the index numbers of the pilot patterns, and the mapping relationship B is used to indicate a one-to-one mapping relationship between the pilot patterns and the index numbers. The first mapping relationship is indicated by using two or more mapping relationships, facilitating flexible configuration. Table 1 shows the one-to-one mapping relationship (that is, the mapping relationship A) between the N antenna port number groups and the index numbers of the N pilot patterns.

TABLE 1

| (L = 16, and N = 4) | |
| --- | --- |
| Antenna port number | Index number |
| #0 to #3 | 1 |
| #4 to #11 | 2 |
| #12 to #23 | 3 |
| #24 to #39 | 4 |

It may be learned from Table 1 that, the antenna port numbers #0 to #3 may correspond to the index number 1, the antenna port numbers #4 to #11 may correspond to the index number 2, the antenna port numbers #12 to #23 may correspond to the index number 3, and the antenna port numbers #24 to #39 may correspond to the index number 4. It may be learned that, none of the antenna port numbers in each two port number groups is repeated, and an index number can be correspondingly found from Table 1 if any port number is given. For example, if the indication information sent by the base station to the user equipment indicates that the antenna port number for transmitting the pilot signal is #3, the user equipment may determine, based on the mapping relationship A, that an index number of the pilot pattern is 1.

It should be understood that, the first mapping relationship may alternatively be indicated by a one-to-one mapping relationship between a layer quantity group, a port number group, an index number, and a pilot pattern, or a one-to-one mapping relationship between a layer quantity group, a port number group, and an index number. This is not specially limited in this application.

A specific process of indicating a pilot pattern by using an antenna port number is described in detail below with reference to FIG. 3 and FIG. 4 (including FIG. 4a to FIG. 4d) by using an example in which L=16, N=4, and a pilot density d=3.

Figures 3, 4A:
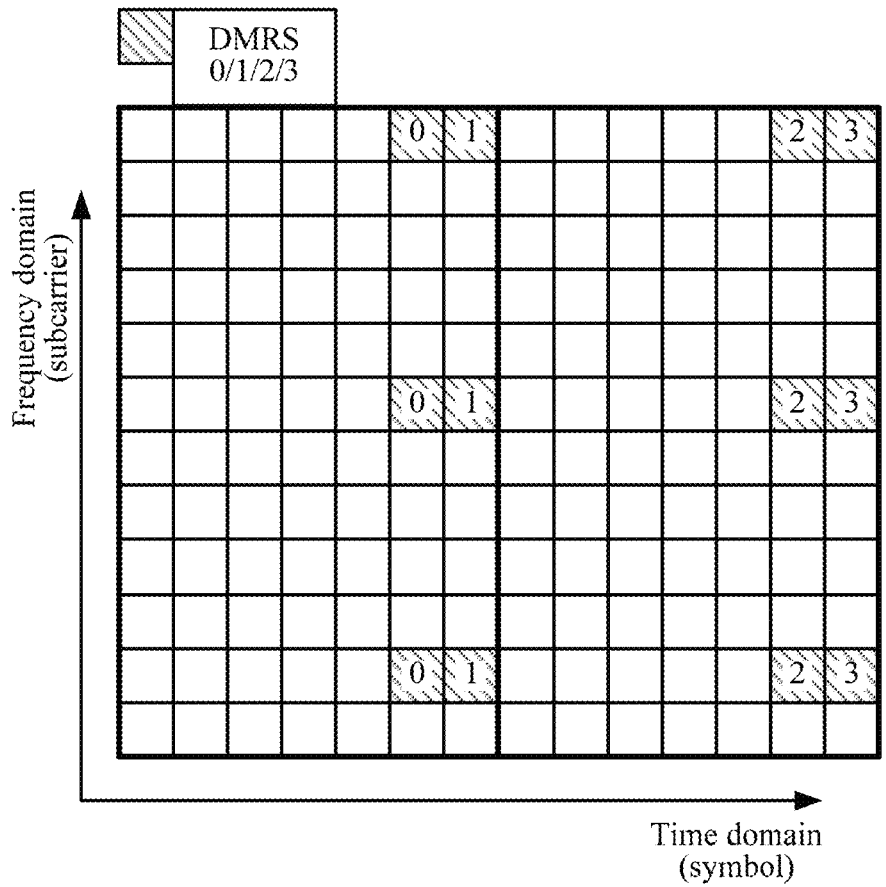
FIG. 3 is a schematic diagram of a first mapping relationship according to an embodiment of this application.
FIG. 4a to FIG. 4d are schematic diagrams of N pilot patterns according to an embodiment of this application.

FIG. 3 is a schematic diagram of a first mapping relationship according to an embodiment of this application. Specifically, FIG. 3 is a schematic diagram of a first mapping relationship when L=16, N=4, and d=3. It may be learned from FIG. 3 that, antenna port numbers #0 to #3 correspond to an index number 1, and the index number 1 corresponds to a first pilot pattern (for example, FIG. 4a); antenna port numbers #4 to #11 correspond to an index number 2, and the index number 2 corresponds to a second pilot pattern (for example, FIG. 4b); antenna port numbers #12 to #23 correspond to an index number 3, and the index number 3 corresponds to a third pilot pattern (for example, FIG. 4c); and antenna port numbers #24 to #39 correspond to an index number 4, and the index number 4 corresponds to a fourth pilot pattern (for example, FIG. 4d).

In addition, it may be learned from FIG. 3 that, a corresponding pilot pattern may be determined after any one of an antenna port number, an index number, or a quantity of layers is determined. It should be understood that, the schematic diagram of the first mapping relationship shown in FIG. 3 is only a representation form of the first mapping relationship, and should not be construed as any limitation on this application. This application should not be limited thereto either. Any method that can indicate a mapping relationship between the indication information (including the antenna port number, the index number, the quantity of layers) and the target time-frequency resource falls within the protection scope of this application.

Optionally, the transmit end device determines that a quantity $M_1$ of bits that carry the antenna port number for transmitting the pilot signal is:

$$M_1 = \lceil \log_2(\Sigma_{i=1}^{N} i \times \lceil L/N \rceil) \rceil, \text{ where } \lceil \; \rceil \text{ represents roundup.}$$

The transmit end device sends the indication information by using the $M_1$ bits, where the indication information is used to indicate the antenna port number for transmitting the pilot signal.

In this embodiment of this application, optimization processing is performed on the antenna port number, so that the index number of the pilot pattern can be implicitly indicated by indicating the antenna port number, so as to find the corresponding pilot pattern (an example of the first mapping relationship). Specifically, in the prior art, after determining the antenna port number for transmitting the pilot signal, the base station needs to send the antenna port number to the user equipment by using signaling, so that a signal is transmitted between the user equipment and the base station. Therefore, optimization processing is performed on the antenna port number, so that no port number is repeated, and each port number can uniquely indicate an index number of one pilot pattern. In this way, signaling overheads are reduced, and the pilot pattern is also indicated.

For example, in the schematic diagram of the first mapping relationship shown in FIG. 3, 16 transport layers correspond to 16 antenna ports (for example, #0 to #15). That is, a pilot signal is configured for each antenna port (or a transport layer) based on a configuration solution in the prior art. Signaling overheads required by the 16 antenna port numbers are $\lceil \log_2 16 \rceil = 4$ bits. However, in this embodiment of this application, optimization processing is performed on the antenna port number, so that no antenna port number is repeated among the layer quantity groups. Therefore, the 16 transport layers correspond to $\Sigma_{i=1}^{4} i \times \lceil 16/4 \rceil = 40$ antenna port numbers (for example, #0 to #39), and required signaling overheads are $\lceil \log_2 40 \rceil = 6$ bits. In this embodiment of this application, when the maximum transport layer quantity L is 16, the OCC code is of 4 bits, and the pilot density d is 3, the indication information used in the method 1a requires 2-bit signaling overheads more than the signaling overheads required in the configuration method in the prior art, but only the increased 2-bit signaling overheads can enable a large quantity of idle pilot resources in pilot patterns that are pre-configured for the 16 transport layers based on the configuration method in the prior art to be released to transmit data, thereby greatly improving resource usage.

FIG. 4a to FIG. 4d are schematic diagrams of N pilot patterns according to an embodiment of this application. Specifically, the pilot patterns shown in FIG. 4a to FIG. 4d may correspond to the four pilot patterns corresponding to the four antenna port number groups in FIG. 3, where L=16, N=4, and d=3.

FIG. 4a shows a corresponding pilot pattern when and only when one, two, three, or all of the antenna port numbers #0 to #3 is/are used for transmission. It may be learned that, a quantity of the antenna port numbers #0 to #3 and a layer quantity of transport layers are the same, and are both 4. In other words, the quantity of the antenna port numbers corresponds to the quantity of transport layers. For example, when the quantity of transport layers is 1, the used antenna port number may be #0. When the quantity of transport layers is 2, the used antenna port numbers may be #0 and #1. When the quantity of transport layers is 3, the used antenna port numbers may be #0, #1, and #2. When the quantity of transport layers is 4, the used antenna port numbers may be #0, #1, #2, and #3.

In this embodiment of this application, when the quantity of actually used transport layers is any one of 1 to 4, the pilot pattern (FIG. 4a) corresponding to the antenna port numbers #0 to #3 may be used to transmit a DMRS. It may be learned from FIG. 4a that, only REs for transmitting four DMRSs are configured in the pilot pattern, and each DMRS corresponds to one RE. That is, even if the maximum transport layer quantity is 16, when the quantity of actually used layers of the to-be-transmitted data stream is 1 to 4, only four DMRSs need to be configured, and REs for transmitting other 12 DMRSs in the 16 DMRSs that are pre-configured for the 16 antenna ports based on the configuration method in the prior art are all released to transmit data. Therefore, when the maximum transport layer quantity L is up to 16, the OCC code is of 4 bits, and the pilot density d is 3, the base station reduces overheads of pilot resources from 28.6% to 7.1% by increasing only 2-bit signaling overheads. In this way, resource usage and data transmission efficiency are greatly improved.

Figure 4B:
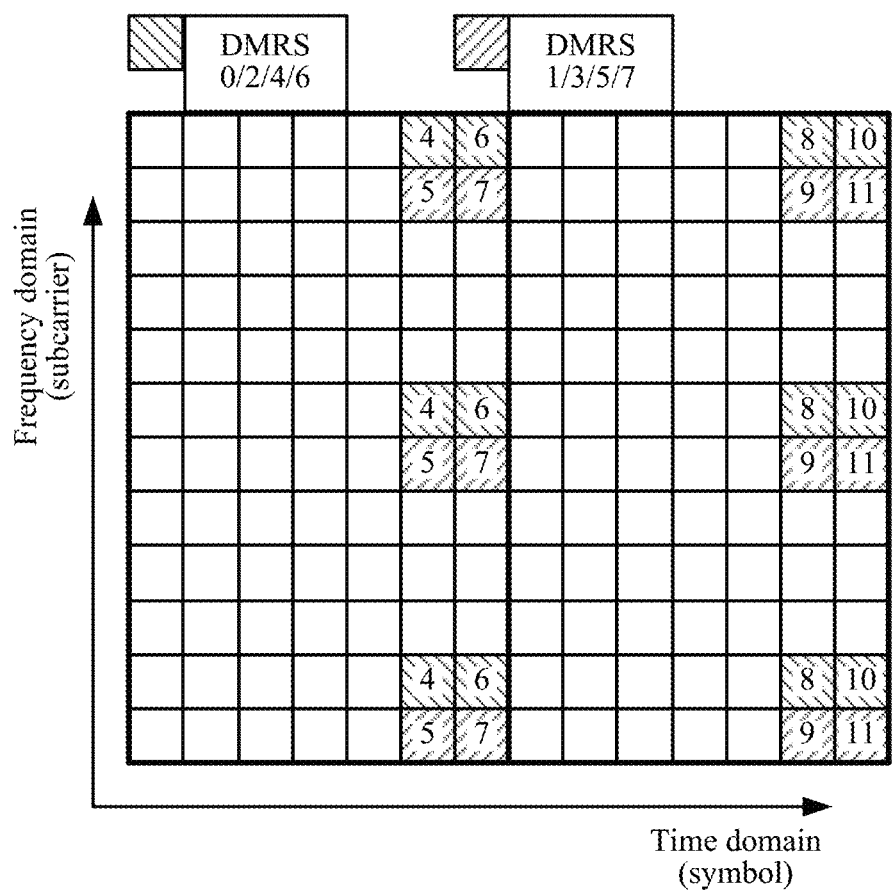

Similarly, FIG. 4b shows a corresponding pilot pattern when and only when one, more, or all of the antenna port numbers #4 to #11 is/are used for transmission. It may be learned that, a quantity of the antenna port numbers #4 to #11 and a layer quantity of transport layers are the same, and are both 8. In other words, the quantity of the antenna port numbers corresponds to the quantity of transport layers. For example, when the quantity of transport layers is 5, the used antenna port numbers may be #4, #5, #6, #7, and #8. When the quantity of transport layers is 6, the used antenna port numbers may be #4, #5, #6, #7, #8, and #9. When the quantity of transport layers is 7, the used antenna port numbers may be #4, #5, #6, #7, #8, #9, and #10. When the quantity of transport layers is 8, the used antenna port numbers may be #4, #5, #6, #7, #8, #9, #10, and #11. It may be learned that, no optimized antenna port number is repeated among different port number groups, thereby avoiding a problem that a repeated port number cannot uniquely indicate a pilot pattern.

In this embodiment of this application, when the quantity of actually used transport layers is any one of 5 to 8, the pilot pattern (FIG. 4b) corresponding to the antenna port numbers #4 to #11 may be used to transmit a DMRS. It may be learned from FIG. 4b that, only REs for transmitting eight DMRSs are configured in the pilot pattern, and each DMRS corresponds to one RE. That is, even if the maximum transport layer quantity is 16, when the quantity of actually used layers of the to-be-transmitted data stream is 5 to 8, only eight DMRSs need to be configured, and REs for transmitting other eight DMRSs in the 16 DMRSs that are pre-configured for the 16 antenna ports based on the configuration method in the prior art are all released to transmit data. Therefore, when the maximum transport layer quantity L is up to 16, the OCC code is of 4 bits, and the pilot density d is 3, the base station reduces overheads of pilot resources from 28.6% to 14.3% by increasing only 2-bit signaling overheads. In this way, resource usage and data transmission efficiency are greatly improved.

Figure 4C:
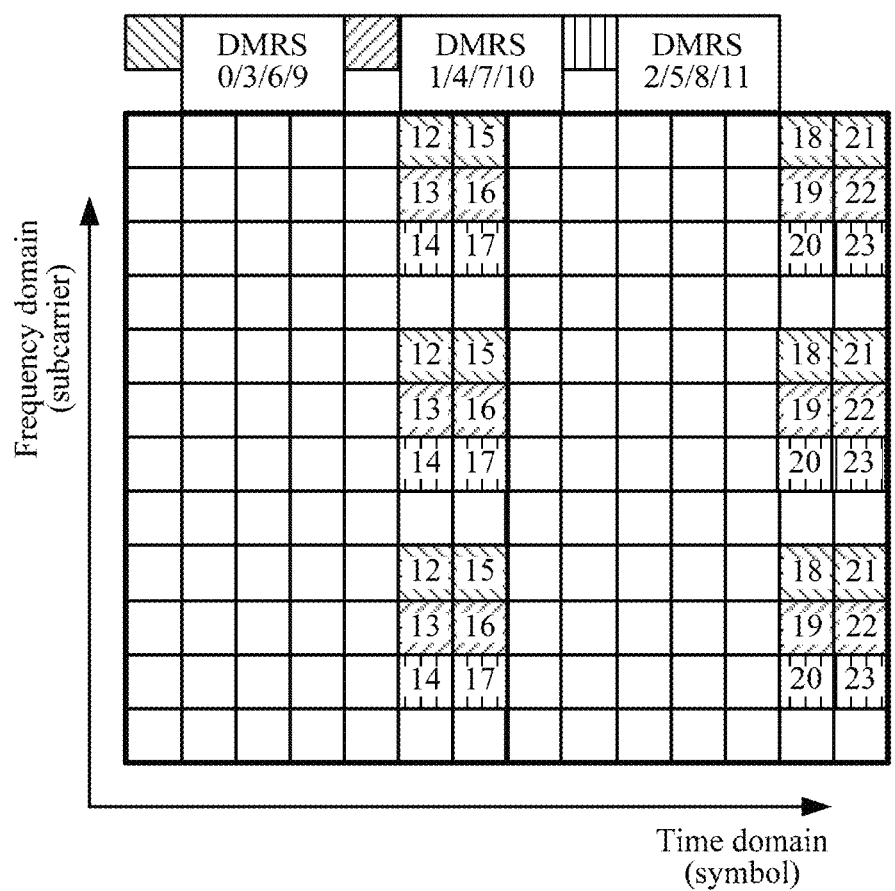

FIG. 4c shows a corresponding pilot pattern when and only when one, a plurality of, or all of the antenna port numbers #12 to #23 is/are used for transmission. It may be learned that, a quantity of the antenna port numbers #12 to #23 and a layer quantity of transport layers are the same, and are both 12. In other words, the quantity of the antenna port numbers corresponds to the quantity of transport layers. A specific method for determining, based on the quantity of transport layers, antenna port numbers to be used is the same as the foregoing method. For brevity, details are not described herein again.

In this embodiment of this application, when the quantity of actually used transport layers is any one of 9 to 12, the pilot pattern (FIG. 4c) corresponding to the antenna port numbers #12 to #23 may be used to transmit a DMRS. It may be learned from FIG. 4c that, only REs for transmitting 12 DMRSs are configured in the pilot pattern, and each DMRS corresponds to one RE. That is, even if the maximum transport layer quantity is 16, when the quantity of actually used layers of the to-be-transmitted data stream is 9 to 12, only 12 DMRSs need to be configured, and REs for transmitting other four DMRSs in the 16 DMRSs that are pre-configured for the 16 antenna ports based on the configuration method in the prior art are all released to transmit data. Therefore, when the maximum transport layer quantity L is up to 16, the OCC code is of 4 bits, and the pilot density d is 3, the base station reduces overheads of pilot resources from 28.6% to 21.4% by increasing only 2-bit signaling overheads. In this way, resource usage and data transmission efficiency are improved to some extent.

Figures 4D, 5:
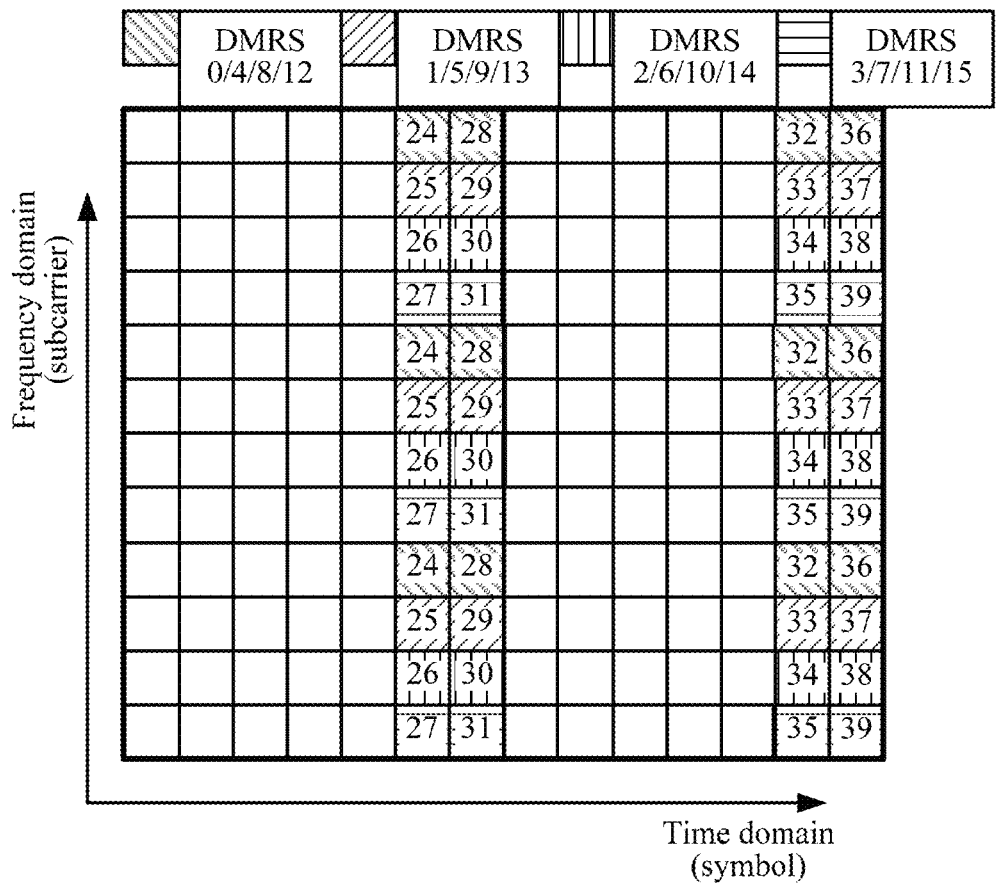
FIG. 5 is another schematic diagram of a first mapping relationship according to an embodiment of this application.

FIG. 4d shows a corresponding pilot pattern when and only when one, a plurality of, or all of the antenna port numbers #24 to #39 is/are used for transmission. It may be learned that, a quantity of the antenna port numbers #24 to #39 and a layer quantity of transport layers are the same, and are both 16. In other words, the quantity of the antenna port numbers corresponds to the quantity of transport layers. In this embodiment of this application, when the quantity of actually used transport layers is any one of 13 to 16, the pilot pattern (FIG. 4d) corresponding to the antenna port numbers #24 to #39 may be used to transmit a DMRS. It may be learned from FIG. 4d that, only REs for transmitting 16 DMRSs are configured in the pilot pattern, and each DMRS corresponds to one RE. That is, 16 DMRSs are configured only when the quantity of actually used transport layers of the to-be-transmitted data stream is 13 to 16, and this is the same as a pilot pattern pre-configured for the 16 antenna ports to transmit DMRSs in the configuration method in the prior art. For brevity, details are not described herein again.

It may be learned from the above that, in this embodiment of this application, an antenna port number that is actually used for transmission is determined based on the quantity of actually used transport layers of the to-be-transmitted data stream, and a corresponding pilot pattern is indicated by using an optimized antenna port number, so that pilot resources can be released by using four layers as one group, and flexible pilot resource configuration is achieved, thereby improving resource usage.

It should be noted that, the grouping method provided above in which four transport layers are grouped as one group is merely described by way of example, and should not be construed as any limitation on this application. When more groups are obtained through grouping, a quantity of layers in each group is smaller, and more flexible resource release is achieved.

It should be further noted that, the antenna port numbers #0 to #39 provided above are merely described by way of example, and should not be construed as any limitation on this application. The antenna port numbers may alternatively be discontinuous and non-repeated values. For example, antenna port numbers of a first port number group may be #2, #4, #6, and #8. Determining of antenna port numbers is not specially limited in this application, and falls within the protection scope of this application provided that any port number can be used to uniquely indicate one pilot pattern.

This embodiment of this application is described for an illustration purpose by using an example in which the maximum transport layer quantity L is 16 and the pilot density is 3. The pilot density may be understood as a quantity of pilot signals (for example, DMRSs) corresponding to each antenna port that are on each RB pair of each transport layer. For example, in FIG. 4a, DMRSs 0/1/2/3 appear three times on each RB pair of each transport layer, and the pilot density is 3. The pilot density is not specially limited in this application, and the pilot density may be 3, 2, or 1. The pilot density may be determined based on a channel environment. For example, as a higher-order antenna array is introduced, a narrower beam causes weaker interference, and the pilot density may decrease provided that channel frequency selectivity is relatively low.

The specific process of indicating a pilot pattern by using an antenna port number is described in detail above with reference to FIG. 3 and FIG. 4 (including FIG. 4a to FIG. 4d) by using an example in which L=16, N=4, and d=3. The specific process of indicating a pilot pattern by using an antenna port number is described in detail below with reference to FIG. 5 and FIG. 6 (including FIG. 6a to FIG. 6θ by using an example in which L=24, N=6, and d=1.

FIG. 5 is another schematic diagram of a first mapping relationship according to an embodiment of this application. Specifically, FIG. 5 is a schematic diagram of a first mapping relationship when L=24, N=6, and d=1. It may be learned from FIG. 5 that, antenna port numbers #0 to #3 may correspond to a first pilot pattern (for example, FIG. 6a), antenna port numbers #4 to #11 may correspond to a second pilot pattern (for example, FIG. 6b), antenna port numbers #12 to #23 may correspond to a third pilot pattern (for example, FIG. 6c), antenna port numbers #24 to #39 may correspond to a fourth pilot pattern (for example, FIG. 6d), antenna port numbers #40 to #59 may correspond to a fifth pilot pattern (for example, FIG. 6e), and antenna port numbers #60 to #83 may correspond to a sixth pilot pattern (for example, FIG. 6f).

In this embodiment of this application, an optimized antenna port number is used to uniquely indicate one pilot pattern. Therefore, 24 layers correspond to $\Sigma_{i=1}^{6} i \times \lceil 24/6 \rceil = 84$ antenna port numbers (for example, #0 to #83), and required signaling overheads are $\lceil \log_2 84 \rceil = 7$ bits. If a pilot signal is configured for each antenna port (or a transport layer) based on a configuration method in the prior art, the 24 transport layers correspond to 24 antenna port numbers (for example, #0 to #23), and required signaling overheads are $\lceil \log_2 24 \rceil = 5$ bits. That is, when the maximum transport layer quantity L is 24, the OCC code is of 4 bits, and the pilot density d is 1, the indication information used in the method 1a requires 2-bit signaling overheads more than the signaling overheads required in the configuration method in the prior art, but only the increased 2-bit signaling overheads can enable a large quantity of idle pilot resources in pilot patterns that are pre-configured for the 24 transport layers based on the configuration method in the prior art to be released to transmit data, thereby greatly improving resource usage.

FIG. 6a to FIG. 6f are other schematic diagrams of N pilot patterns according to an embodiment of this application. Specifically, the pilot patterns shown in FIG. 6a to FIG. 6f may correspond to the six pilot patterns corresponding to the six antenna port number groups in FIG. 5, where L=24, N=6, and d=1.

Figure 6A:
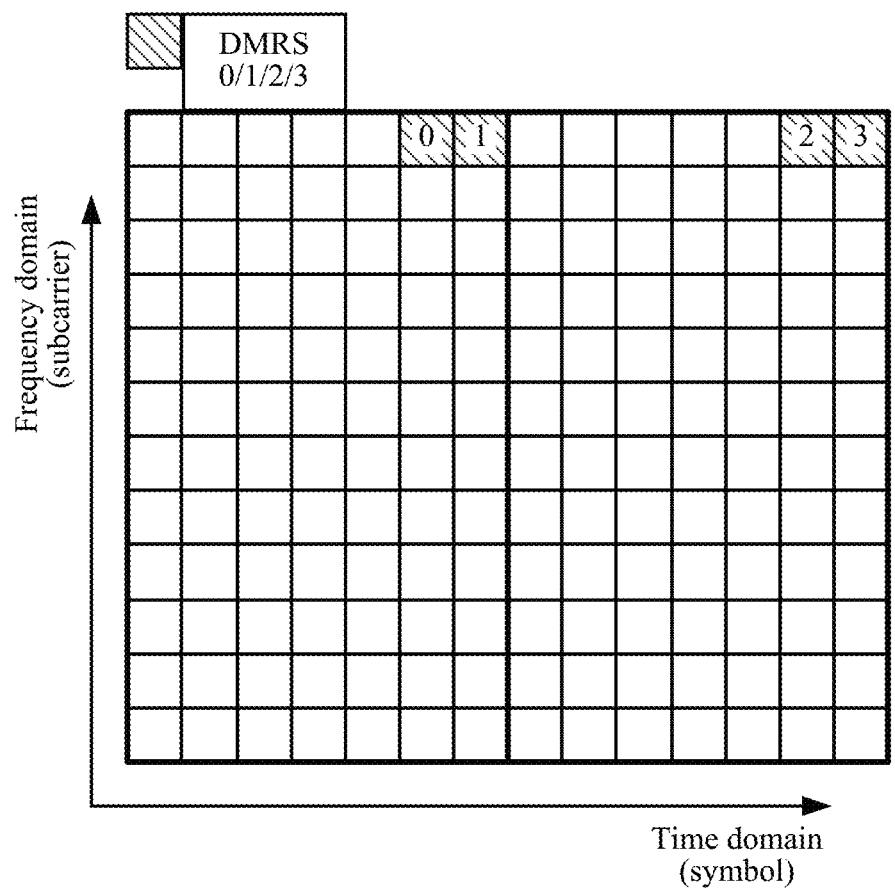
FIG. 6a to FIG. 6f are other schematic diagrams of N pilot patterns according to an embodiment of this application.
Figure 6B:
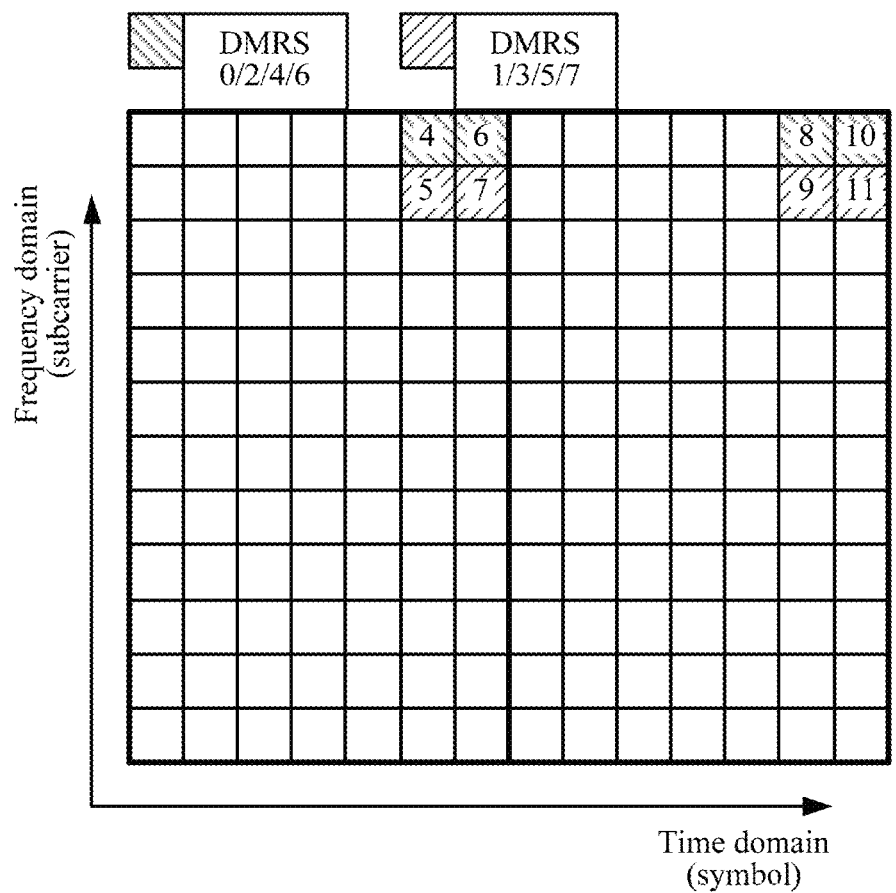
Figure 6C:
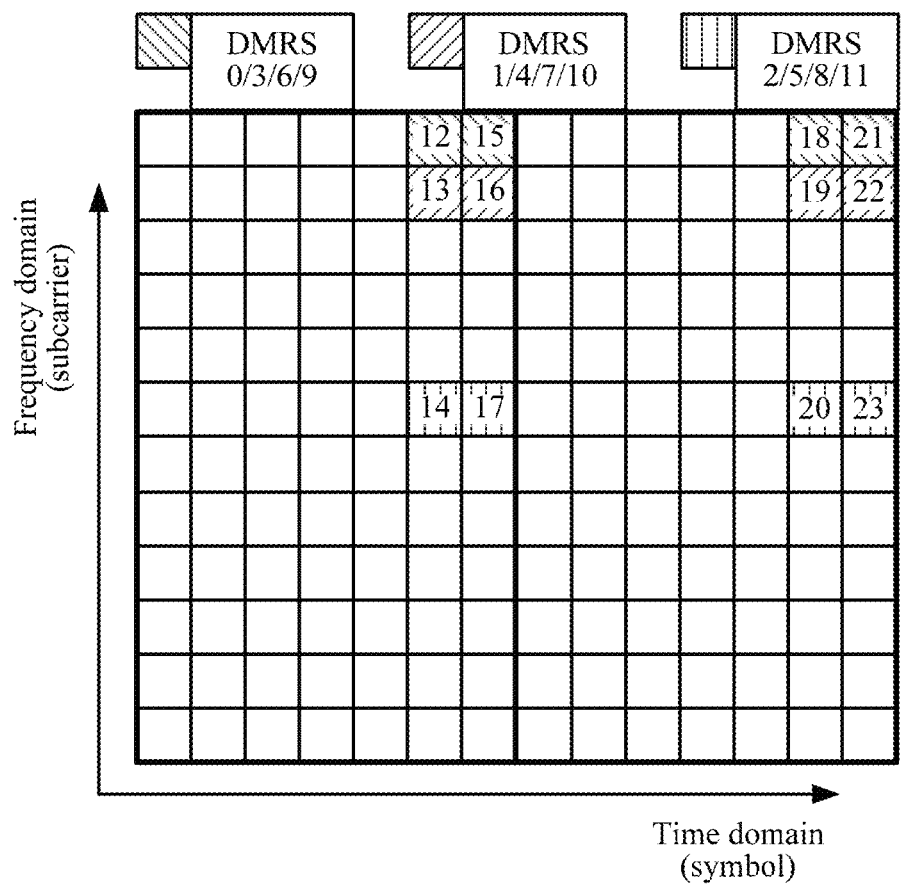
Figure 6D:
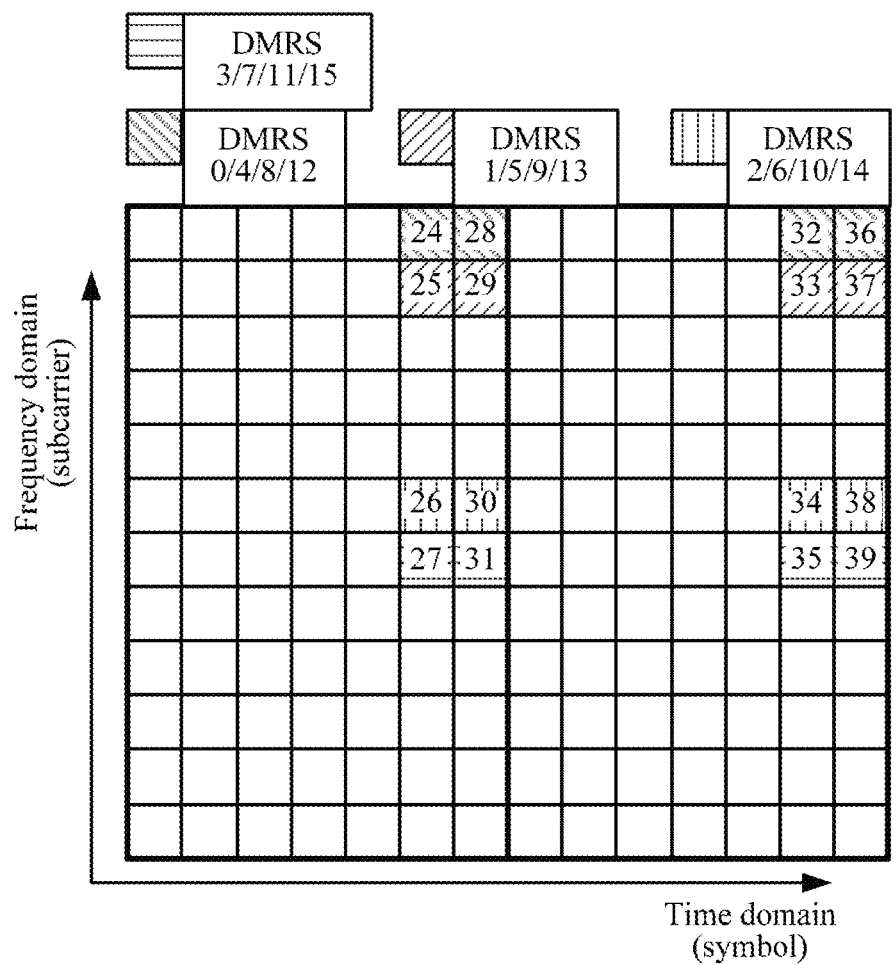
Figure 6E:
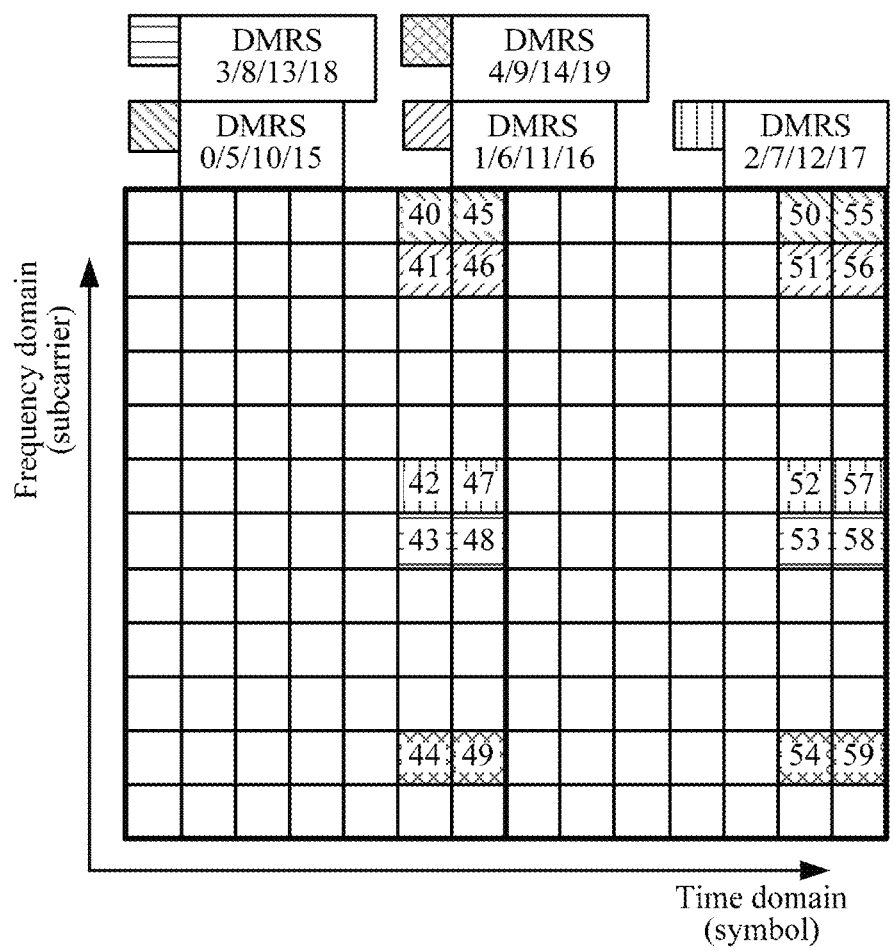

FIG. 6a shows a corresponding pilot pattern when and only when one, two, three, or all of the antenna port numbers #0 to #3 is/are used for transmission. It may be learned that, a quantity of the antenna port numbers #0 to #3 and a layer quantity of transport layers are the same, and are both 4. In other words, the quantity of the antenna port numbers corresponds to the quantity of transport layers. In this embodiment of this application, when the quantity of actually used transport layers is any one of 1 to 4, the pilot pattern (FIG. 6a) corresponding to the antenna port numbers #0 to #3 may be used to transmit a DMRS. It may be learned from FIG. 6a that, only REs for transmitting four DMRSs are configured in the pilot pattern, and each DMRS corresponds to one RE. That is, even if the maximum transport layer quantity is 24, when the quantity of actually used layers of the to-be-transmitted data stream is 1 to 4, only four DMRSs need to be configured, and REs for transmitting other 20 DMRSs in the 24 DMRSs that are pre-configured for the 24 antenna ports based on the configuration method in the prior art are all released to transmit data. Therefore, when the maximum transport layer quantity L is up to 24, the OCC code is of 4 bits, and the pilot density d is 1, the base station reduces overheads of pilot resources from 14.3% to 2.4% by increasing only 2-bit signaling overheads. In this way, resource usage and data transmission efficiency are greatly improved.

Similarly, FIG. 6b to FIG. 6f show corresponding pilot patterns when and only when antenna port numbers used for transmission are one, a plurality of, or all of antenna port numbers of the port number groups. Specific analysis of the pilot pattern is described in detail above. To avoid repetition, detailed descriptions thereof are omitted herein.

It may be learned from the above that, in this embodiment of this application, an antenna port number that is actually used for transmission is determined based on the quantity of actually used transport layers of the to-be-transmitted data stream, and a corresponding pilot pattern is indicated by using an optimized antenna port number, so that pilot resources can be released by using four layers as one group, and flexible pilot resource configuration is achieved, thereby improving resource usage.

It should be understood that, L, N, d, and the signaling overheads provided above are merely described by way of example, and should not be construed as any limitation on this application. This application should not be limited thereto either. Values of L and d are not specially limited in this application.

It should be noted that, the grouping method provided above in which four transport layers are grouped as one group is merely described by way of example, and should not be construed as any limitation on this application. When more groups are obtained through grouping, a quantity of layers in each group is smaller, and more flexible resource release is achieved.

It should be further noted that, the antenna port numbers #0 to #83 provided above are merely described by way of example, and should not be construed as any limitation on this application. The antenna port numbers may alternatively be discontinuous and non-repeated values. For example, antenna port numbers of a first port number group may be #2, #4, #6, and #8. Determining of antenna port numbers is not specially limited in this application, and falls within the protection scope of this application provided that any port number can be used to uniquely indicate one pilot pattern.

It should be further noted that, determining of the pilot density is not specially limited in this application. A specific process of determining the pilot density is the same as that in the prior art. To avoid repetition, detailed descriptions thereof are omitted herein.

It should be further noted that, in this embodiment of this application, the method for indicating the target time-frequency resource to the user equipment by using the indication information is not limited to indicating an optimized antenna port number. The base station may directly send a layer quantity of actually used transport layers or an index number to the user equipment, so that the user equipment determines a corresponding pilot pattern. Regardless of whether the quantity of layers or the index number is specifically indicated by the indication information, the user equipment needs to be notified of the antenna port number. A difference lies in that, the pilot pattern may be determined based on the quantity of layers or the index number after the quantity of layers or the index number is specifically indicated, instead of implicitly indicating the antenna port number. Therefore, the antenna port number may be the same as an antenna port number that is allocated based on the configuration method in the prior art, requires no optimization processing, and may be repeated among the layer quantity groups. In this way, an increase in signaling overheads required by the antenna port number is avoided, but signaling overheads required by the index number or the quantity of layers are increased.

The following describes, in detail with reference to the method 1b, a method for indicating an index number specifically by using the indication information.

Method 1b

Optionally, the transmit end device sends the indication information to the receive end device, where the indication information is specifically used to indicate an index number of the target pilot pattern, and the index number of the target pilot pattern is determined by the transmit end device based on the total quantity of layers of the to-be-transmitted data stream, so that the receive end device determines the target pilot pattern corresponding to the index number of the target pilot pattern, so as to determine the target time-frequency resource based on the target pilot pattern, and receives the pilot signal from the transmit end device based on the target time-frequency resource. The transmit end device and the receive end device prestore a one-to-one mapping relationship between the N pilot patterns and index numbers of the N pilot patterns.

Specifically, each pilot pattern may correspond to one index number, and the N pilot patterns are in a one-to-one correspondence with the index numbers of the N pilot patterns. Therefore, a corresponding pilot pattern may be indicated by using an index number. The base station and the user equipment may prestore the one-to-one mapping relationship between the N pilot patterns and the index numbers of the N pilot patterns. The base station may send the index number of the target pilot pattern to the user equipment, and the user equipment may determine the target pilot pattern based on the index number.

Further, the base station may also group transport layers into N groups, and each layer quantity group corresponds to one pilot pattern. For example, 16 transport layers are grouped into four groups, and each group corresponds to an index number of one pilot pattern. The user equipment may determine the target pilot pattern based on the index number.

A specific process of indicating a pilot pattern by using an index number of a pilot pattern is described in detail below with reference to FIG. 7 and FIG. 8 (including FIG. 8a to FIG. 8d) by using an example in which L=16, N=4, and d=3.

Figures 6F, 7:
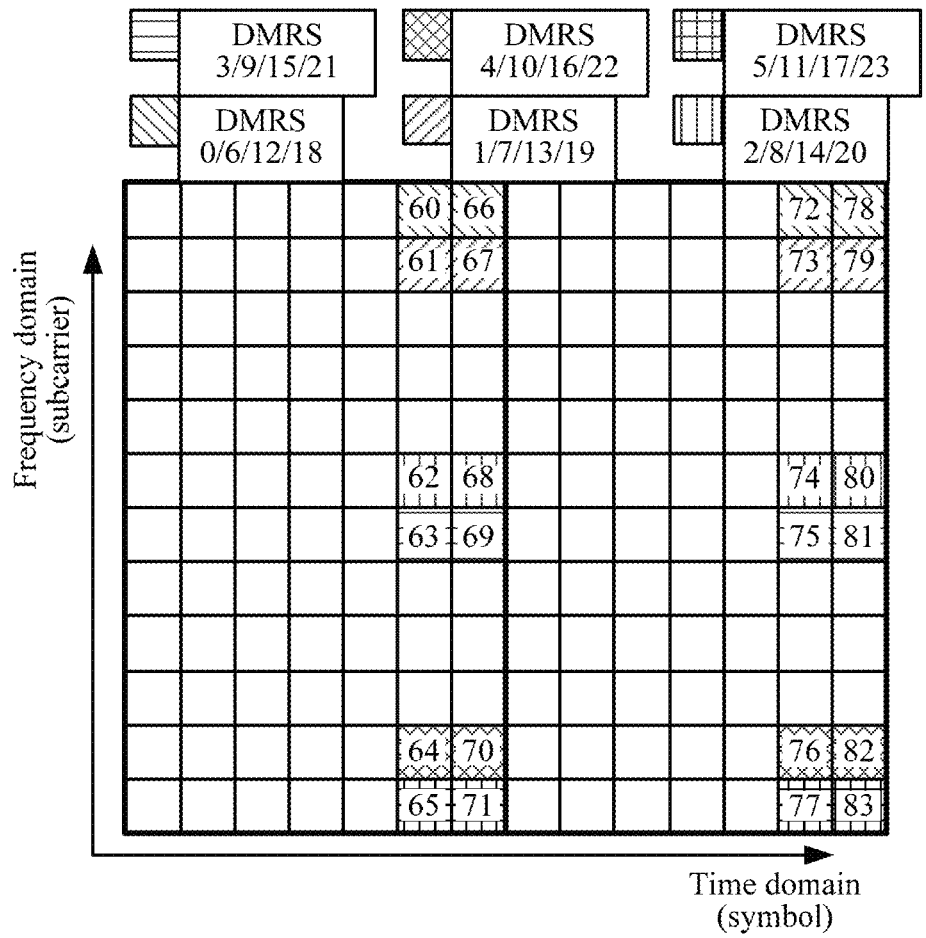
FIG. 7 is a schematic diagram of a first mapping relationship according to another embodiment of this application.

FIG. 7 is a schematic diagram of a first mapping relationship according to another embodiment of this application. Specifically, FIG. 7 is a schematic diagram of a first mapping relationship when L=16, N=4, and d=3. It may be learned from FIG. 7 that, antenna port numbers #0 to #3 correspond to an index number 1, and the index number 1 corresponds to a first pilot pattern (for example, FIG. 8a); antenna port numbers #0 to #7 correspond to an index number 2, and the index number 2 corresponds to a second pilot pattern (for example, FIG. 8b); antenna port numbers #0 to #11 correspond to an index number 3, and the index number 3 corresponds to a third pilot pattern (for example, FIG. 8c); and antenna port numbers #0 to #15 correspond to an index number 4, and the index number 4 corresponds to a fourth pilot pattern (for example, FIG. 8d). In this embodiment of this application, the base station indicates the target pilot pattern by indicating the index number of the pilot pattern to the user equipment, and performs no optimization processing on the antenna port number. Any port number may be repeated among the port number groups.

Optionally, the transmit end device determines that a quantity $M_2$ of bits that carry the index number of the target pilot pattern is:

$M_2 = \lceil \log_2 N \rceil$, where $\lceil \ \rceil$ represents roundup.

The transmit end device sends the indication information by using the $M_2$ bits, where the indication information is used to indicate the index number of the target pilot pattern.

Specifically, signaling overheads required by the antenna port number are the same as those in the prior art, but an added index number requires specific signaling overheads. In this embodiment of this application, the signaling overheads of the index number are $\lceil \log_2 4 \rceil = 2$ bits. When the signaling overheads required by the index number are s bits, the index number may be used to indicate a pilot pattern when the maximum transport layer quantity is up to $C \times 2^s$. For example, in this embodiment of this application, when the signaling overheads are 2 bits and the code length C of the OCC is 4, the 2-bit signaling overheads (that is, the indication information of the index number) can be used to indicate a pilot pattern when the maximum transport layer quantity is up to 16.

Therefore, in this embodiment of this application, when the maximum transport layer quantity L is 16, the code length of the OCC is 4 bits, and the pilot density d is 3, the indication information used in the method 1b requires 2-bit signaling overheads more than the signaling overheads required in the configuration method in the prior art, but only the increased 2-bit signaling overheads can enable a large quantity of idle pilot resources in pilot patterns that are pre-configured for the 16 transport layers based on the configuration method in the prior art to be released to transmit data, thereby greatly improving resource usage.

FIG. 8a to FIG. 8d are schematic diagrams of N pilot patterns according to another embodiment of this application. Specifically, the pilot patterns shown in FIG. 8a to FIG. 8d may correspond to the four pilot patterns in FIG. 7, where L=16, N=4, and d=3.

Figure 8A:
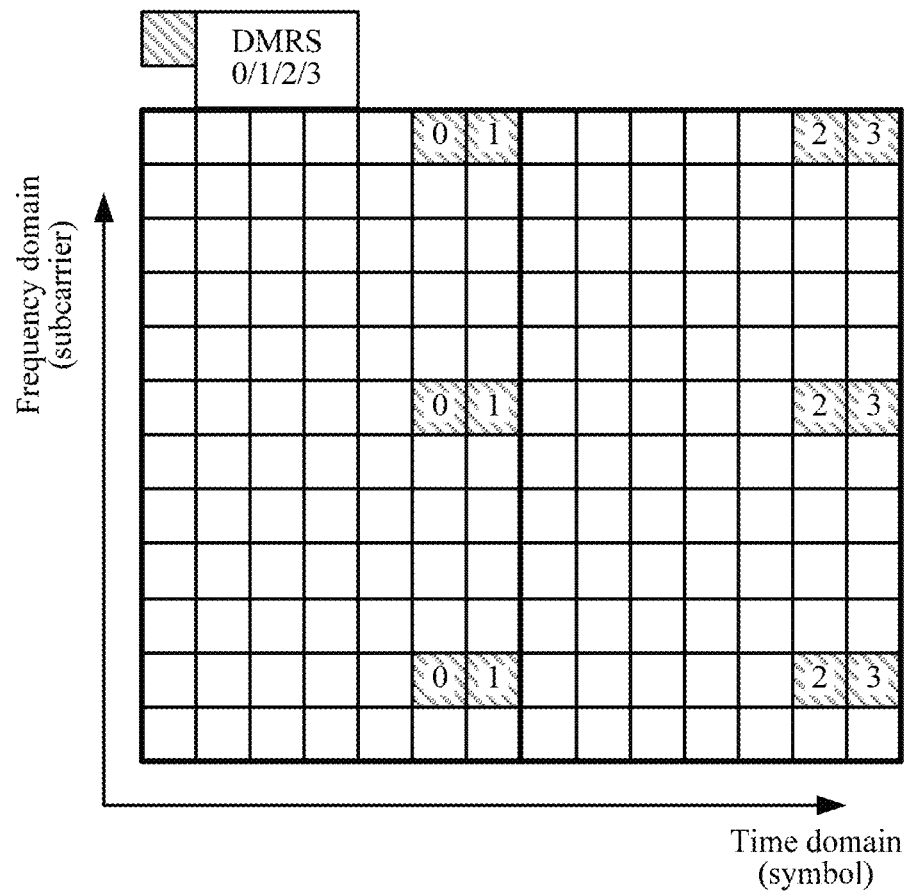
FIG. 8a to FIG. 8d are schematic diagrams of N pilot patterns according to another embodiment of this application.

FIG. 8a shows a corresponding pilot pattern when an index number is 1. It may be learned that, when the index number is 1, a quantity of the corresponding antenna port numbers #0 to #3 and a layer quantity of transport layers are the same, and are both 4. In other words, the quantity of the antenna port numbers corresponds to the quantity of transport layers. For example, when the quantity of transport layers is 1, the used antenna port number may be #0. When the quantity of transport layers is 2, the used antenna port numbers may be #0 and #1. When the quantity of transport layers is 3, the used antenna port numbers may be #0, #1, and #2. When the quantity of transport layers is 4, the used antenna port numbers may be #0, #1, #2, and #3.

In this embodiment of this application, when the quantity of actually used transport layers is any one of 1 to 4, the pilot pattern (FIG. 8a) corresponding to the index number 1 may be used to transmit a DMRS. It may be learned from FIG. 8a that, only REs for transmitting four DMRSs are configured in the pilot pattern, and each DMRS corresponds to one RE. That is, even if the maximum transport layer quantity is 16, when the quantity of actually used layers of the to-be-transmitted data stream is 1 to 4, only four DMRSs need to be configured, and REs for transmitting other 12 DMRSs in the 16 DMRSs that are pre-configured for the 16 antenna ports by using the configuration method in the prior art are all released to transmit data. Therefore, when the maximum transport layer quantity L is up to 16, the OCC code is of 4 bits, and the pilot density d is 3, the base station reduces overheads of pilot resources from 28.6% to 7.1% by increasing only 2-bit signaling overheads. In this way, resource usage and data transmission efficiency are greatly improved.

Figure 8B:
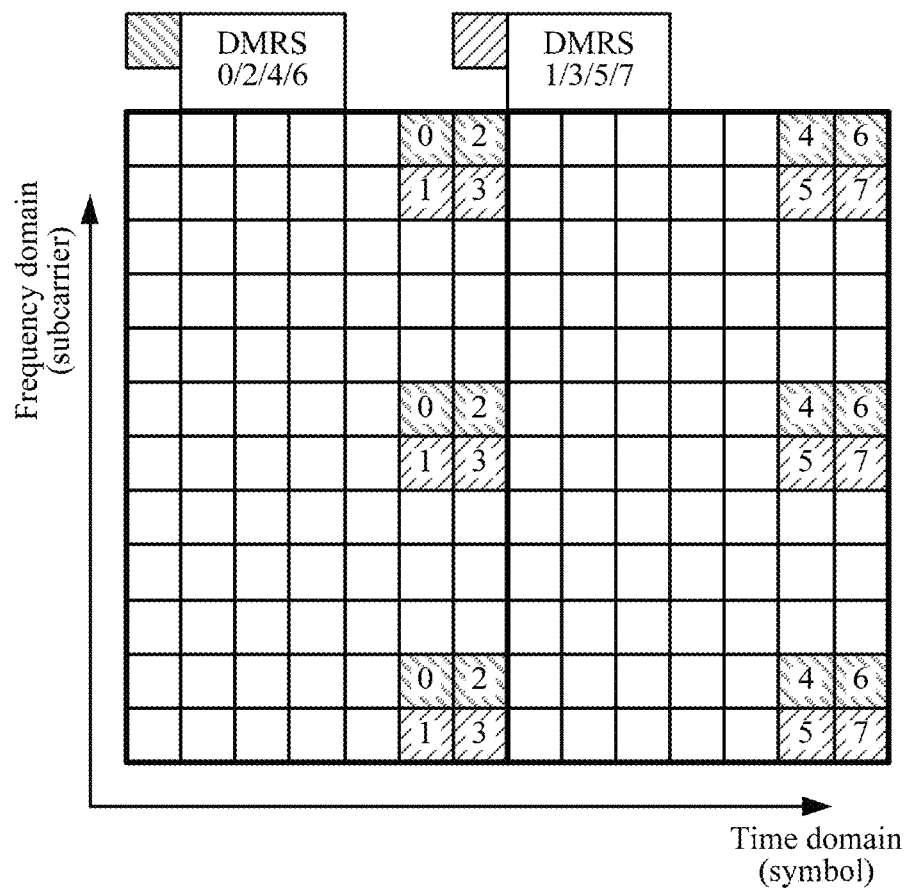

FIG. 8b shows a corresponding pilot pattern when an index number is 2. It may be learned that, when the index number is 2, a quantity of the corresponding antenna port numbers #0 to #7 and a layer quantity of transport layers are the same, and are both 8. In other words, the quantity of the antenna port numbers corresponds to the quantity of transport layers. For example, when the quantity of transport layers is 5, the used antenna port numbers may be #0, #1, #2, #3, and #4. When the quantity of transport layers is 6, the used antenna port numbers may be #0, #1, #2, #3, #4, and #5. When the quantity of transport layers is 7, the used antenna port numbers may be #0, #1, #2, #3, #4, #5, and #6. When the quantity of transport layers is 8, the used antenna port numbers may be #0, #1, #2, #3, #4, #5, #6, and #7. It may be learned that, in this embodiment of this application, for antenna port numbers, the antenna port numbers 0# to #3 corresponding to the index number 1 can be repeated, because the index number can be directly used to indicate the pilot pattern and an antenna port number does not need to uniquely indicate one pilot pattern.

Specific analysis of the pilot pattern in FIG. 8b is similar to specific analysis of the pilot pattern in FIG. 8a. To avoid repetition, detailed descriptions thereof are omitted herein.

Figure 8C:
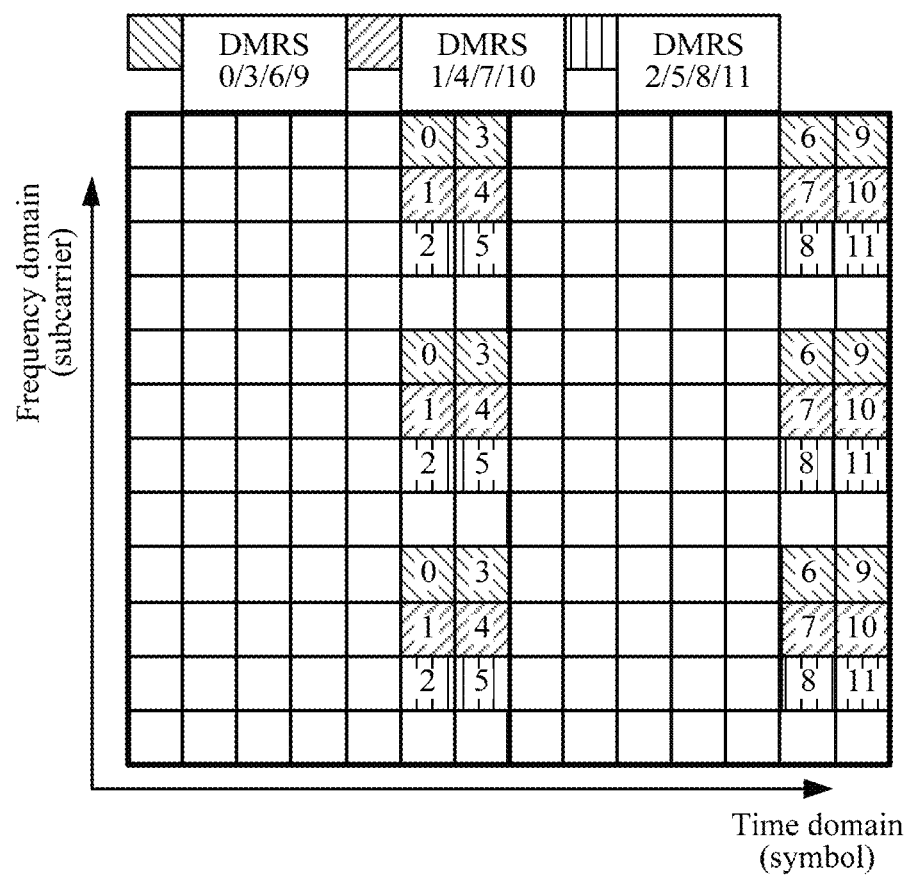
Figure 8D:
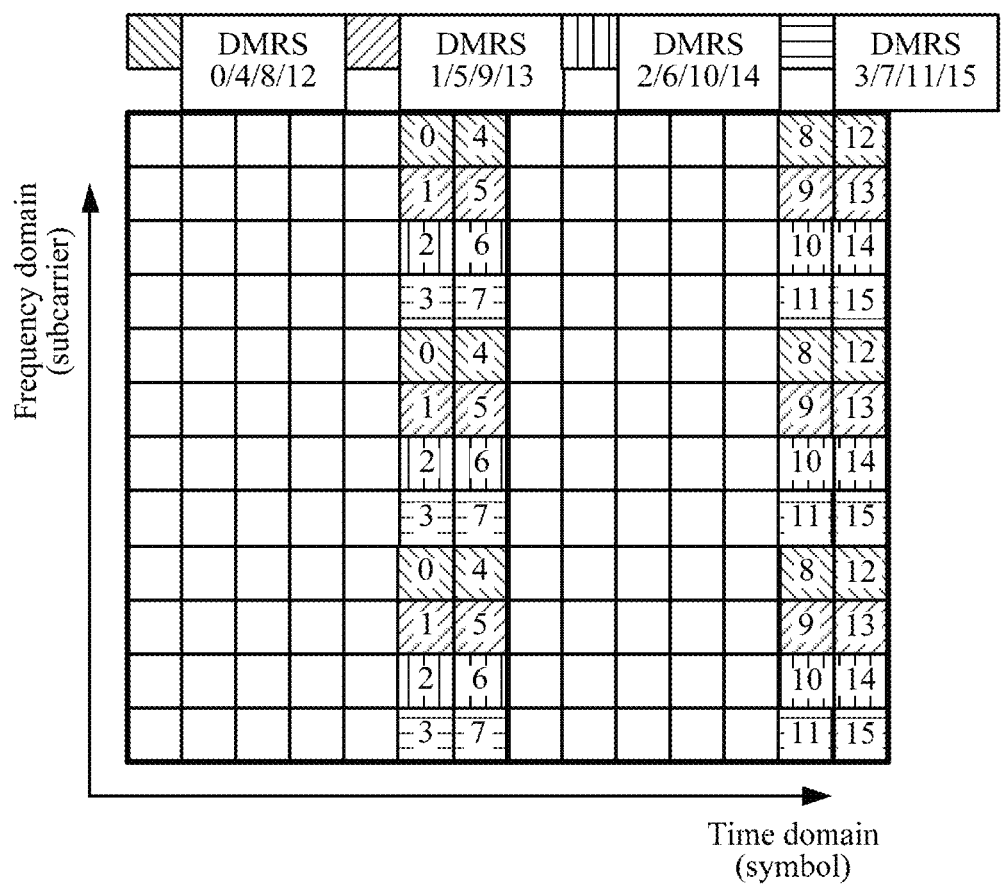

Similarly, FIG. 8c and FIG. 8d show corresponding pilot patterns when index numbers are 3 and 4. Specific analysis of the pilot patterns is similar to the specific analysis of the pilot pattern in FIG. 8a. To avoid repetition, detailed descriptions thereof are omitted herein.

It may be learned from the above that, in this embodiment of this application, the index number of the target pilot pattern is determined based on the quantity of actually used transport layers of the to-be-transmitted data stream, and the corresponding target pilot pattern is indicated by using the index number, so that pilot resources can be released by using four layers as one group, and flexible pilot resource configuration is achieved, thereby improving resource usage.

It should be understood that, L, N, d, and the signaling overheads provided in FIG. 7 are merely described by way of example, and should not be construed as any limitation on this application. This application should not be limited thereto either. Values of L and d are not specially limited in this application.

It should be noted that, the antenna port numbers #0 to #15 provided above are merely described by way of example, and should not be construed as any limitation on this application. The antenna port numbers may alternatively be discontinuous values, and an antenna port number may be repeated or not repeated among different antenna port number groups. For example, antenna port numbers of a first port number group may be #2, #4, #6, and #8, and antenna port numbers of a second port number group may be #3, #4, #5, #6, #7, #8, #9, and #10. Determining of antenna port numbers is not specially limited in this application, provided that port numbers in each port number group can correspond to a layer quantity in a layer quantity group. Further, if a quantity of port numbers is the same as the maximum transport layer quantity, no extra signaling overheads are required. If a quantity of port numbers is greater than the maximum transport layer quantity, the method for transmitting a pilot signal in this application may still be used, but extra signaling overheads are required.

The specific process of indicating a pilot pattern by using an index number is described in detail above with reference to FIG. 7 and FIG. 8 (including FIG. 8a to FIG. 8d) by using an example in which L=16, N=4, and d=3. The specific process of indicating a pilot pattern by using an index number is described in detail below by using an example in which L=24, N=6, and d=1.

It may be learned from the foregoing detailed descriptions that, in this embodiment of this application, when L=24, N=6, and d=1, the first mapping relationship is: the antenna port numbers #0 to #3 correspond to the index number 1, and the index number 1 corresponds to the first pilot pattern; the antenna port numbers #0 to #7 correspond to the index number 2, and the index number 2 corresponds to the second pilot pattern; the antenna port numbers #0 to #11 correspond to the index number 3, and the index number 3 corresponds to the third pilot pattern; the antenna port numbers #0 to #15 correspond to the index number 4, and the index number 4 corresponds to the fourth pilot pattern; the antenna port numbers #0 to #19 correspond to the index number 5, and the index number 5 corresponds to the fifth pilot pattern; the antenna port numbers #0 to #23 correspond to the index number 6, and the index number 6 corresponds to the sixth pilot pattern. In this embodiment of this application, the base station indicates the target pilot pattern by indicating the index number of the pilot pattern to the user equipment, and does not need to perform optimization processing on the antenna port number. Any port number may be repeated among the port number groups.

Signaling overheads required by the antenna port number are the same as the signaling overheads required in the configuration method in the prior art, but an added index number requires specific signaling overheads. In this embodiment of this application, the signaling overheads of the index number are $\lceil \log_2 6 \rceil = 3$ bits. Further, when the signaling overheads required by the index number are 3 bits, the index number may be used to indicate a pilot pattern when the maximum transport layer quantity is up to $C \times 2^3$. For example, in this embodiment of this application, when the signaling overheads are 3 bits and the code length C of the OCC is 4, the 3-bit signaling overheads (that is, the indication information of the index number) can be used to indicate a pilot pattern when the maximum transport layer quantity is up to 32.

Therefore, in this embodiment of this application, when the maximum transport layer quantity L is 24, the code length of the OCC is 4 bits, and the pilot density d is 1, the indication information used in the method 1b requires 3-bit signaling overheads more than the signaling overheads required in the configuration method in the prior art, but only the increased 3-bit signaling overheads can enable a large quantity of idle pilot resources in pilot patterns that are pre-configured for the 24 transport layers based on the configuration method in the prior art to be released to transmit data, thereby greatly improving resource usage.

When L=24, N=6, and d=1, the schematic diagram of the corresponding first mapping relationship and the specific descriptions of the N pilot patterns are similar to the foregoing analysis. For brevity, detailed descriptions thereof are omitted herein.

Therefore, according to the method for transmitting a pilot signal in this embodiment of this application, the transmit end device determines, based on the prestored pilot patterns, a time-frequency resource corresponding to the quantity of layers for transmitting the data stream, so that a resource for transmitting the pilot signal can be determined based on a quantity of actual layers for transmitting the data stream. In this way, an idle pilot resource is released to transmit data, so that more flexible resource configuration is achieved, thereby improving resource usage.

It should be understood that, the DMRSs provided above should not be construed as any limitation on this application. This application should not be limited thereto either. Other pilot signals such as a common reference signal (CRS) and a channel state information-reference signal (CRI-RS) each may be used for channel estimation or channel sounding, and each may correspond to an antenna port. Therefore, the method for transmitting a pilot signal in this embodiment of this application may be used to transmit another pilot signal. This is not specially limited in this application.

The foregoing describes in detail a specific process of the method 1 with reference to FIG. 3 to FIG. 8. The following describes, in detail with reference to FIG. 9 to FIG. 14, a specific process in which the method 2 is used for the target time-frequency resource.

Method 2:

In another embodiment, the N pilot patterns include a first pilot pattern, and the first pilot pattern is used to indicate, when the total quantity of layers of the to-be-transmitted data stream is a maximum transport layer quantity L supported by the transmit end device, pre-configured d×L resource elements REs for transmitting L pilot signals, where d is a density of a pilot signal that corresponds to each transport layer and that is on each resource block RB pair, d is a natural number greater than or equal to 1, L is a natural number greater than or equal to 1, L=$n_F$×$n_T$, $n_F$ is a quantity of target REs that are used by the L pilot signals on each RB pair in a frequency domain resource direction, $n_T$ is a quantity of target REs that are used by the L pilot signals on each RB pair in a time domain resource direction, the indication information includes an indication bitmap, and the target time-frequency resource includes a target RE.

The transmit end device determines, based on the pre-stored first pilot pattern, the target RE for transmitting the pilot signal. The target RE corresponds to the total quantity of layers of the to-be-transmitted data stream.

The transmit end device determines, based on a prestored first mapping relationship diagram, corresponding bits of the target RE for transmitting the pilot signal that are in the indication bitmap. The first mapping relationship diagram is used to indicate a correspondence between the d×L REs in the first pilot pattern and the bits in the indication bitmap.

The transmit end device sends the indication bitmap to the receive end device, where the indication bitmap is used to instruct the receive end device to receive the pilot signal from the transmit end device based on the target RE, and the receive end device prestores the first mapping relationship diagram.

Specifically, the base station may prestore one or more pilot patterns. In this embodiment of this application, the one pilot pattern may be the first pilot pattern, and the first pilot pattern is used to indicate, when the total quantity of layers of the to-be-transmitted data stream is the maximum transport layer quantity L supported by the transmit end device, pre-configured time-frequency resources for transmitting the pilot signals. In other words, the first pilot pattern is used to indicate a time-frequency resource that is allocated, based on the maximum transport layer quantity designed in the system, to a pilot signal corresponding to each layer. That is, when the maximum transport layer quantity is L, there are L pilot signals, and there are d×L REs to be used, where d is a pilot density, and d is a natural number greater than or equal to 1. That is, the L pilot signals are repeated d times on each RB pair. For ease of description, using d=1 as an example, L REs are used by the L pilot signals, and the L REs have different distributions on one RB pair in the frequency domain resource direction and the time domain resource direction. It is assumed that there are $n_F$ pilot signals in the frequency domain resource direction and $n_T$ pilot signals in the time domain resource direction on each RB pair, or there are $n_F$ REs, in the frequency domain resource direction, for transmitting pilot signals and there are $n_T$ REs, in the time domain resource direction, for transmitting pilot signals. Therefore, L=$n_F$×$n_T$. If d is greater than 1, a quantity of REs used by the L pilot signals is d×L, that is, d×$n_F$×$n_T$ or $n_F$×d×$n_T$.

After determining the quantity of actually used layers of the to-be-transmitted data stream, the base station may determine, based on the first pilot pattern, a pilot signal needing to be sent and the target time-frequency resource for transmitting the pilot signal (for example, the target RE).

In this embodiment of this application, the base station and the user equipment may further prestore a same first mapping relationship diagram, and the first mapping relationship diagram is used to indicate the correspondence between the d×L REs in the first pilot pattern and the bits in the indication bitmap. The first pilot pattern may be a part of the first mapping relationship diagram. The first pilot pattern and the first mapping relationship diagram may be one diagram: the first mapping relationship diagram, and the first mapping relationship diagram includes the first pilot pattern. The first pilot pattern and the first mapping relationship diagram may alternatively be two separate diagrams. This is not specially limited in this application.

The base station may indicate, by using bits in the indication bitmap, an RE (the target RE) that corresponds to a time-frequency resource (the target time-frequency resource) and that is in the first pilot pattern. For example, a bit corresponding to an RE to be used (the target RE) may be set to "1", and a bit corresponding to an RE that is not to be used may be set to "0". After determining the correspondence between the bits in the indication bitmap and the REs in the first pilot pattern, the base station determines target REs for different transport layers based on the quantity of actually used transport layers, and then indicates, by using the indication bitmap, an RE to be used and an RE that is not to be used. When receiving the indication bitmap, the user equipment may make a comparison on the first mapping relationship diagram, to determine the target RE, so as to receive a DMRS to the base station.

Figure 9:
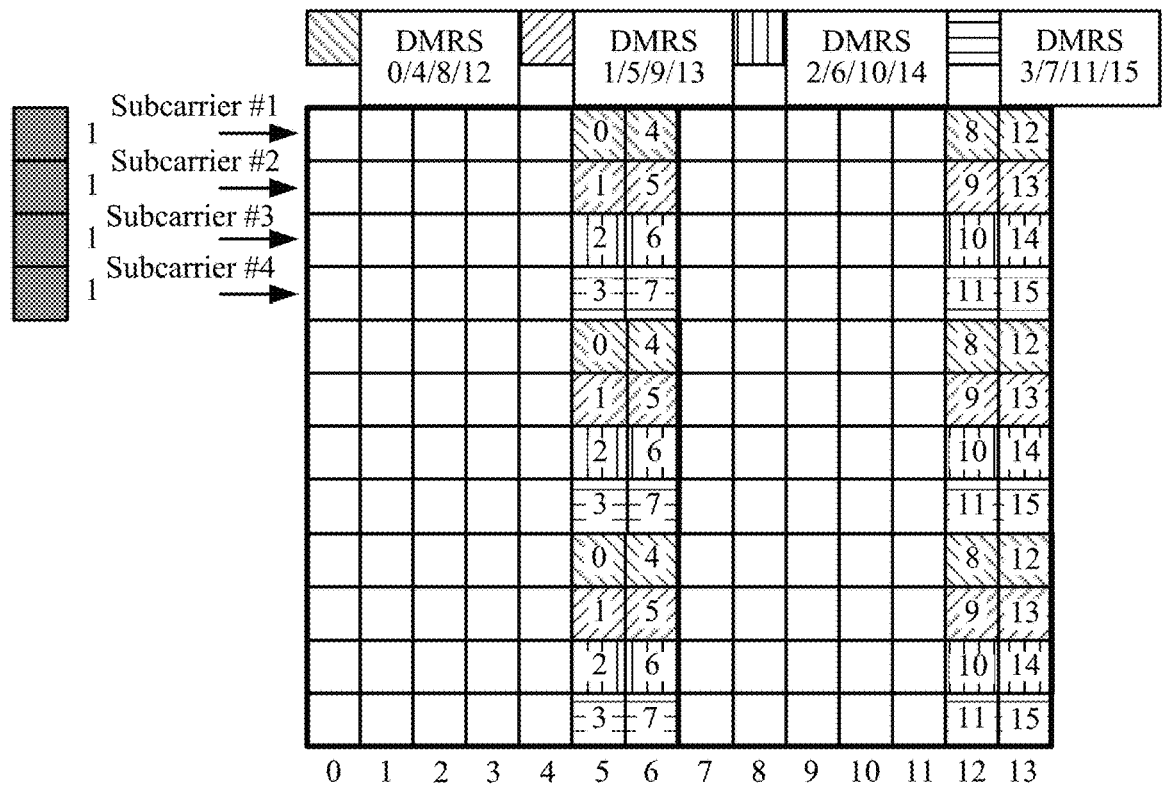
FIG. 9 is a schematic diagram of a first mapping relationship diagram according to still another embodiment of this application.

FIG. 9 is a schematic diagram of a first mapping relationship diagram according to still another embodiment of this application. Specifically, FIG. 9 shows a first mapping relationship diagram when L=16, N=4, and d=3. Target REs that are used by 16 DMRSs (including a DMRS 0 to a DMRS 15) on each transport layer are shown in FIG. 9. It may be learned from FIG. 9 that, a density d of the DMRS 0 to the DMRS 15 on one RB pair is 3. More specifically, the density of the DMRS 0 to the DMRS 15 on one RB pair in a frequency domain direction is 3. Further, it may be learned that the DMRS 0 to the DMRS 15 always occupy, in time domain, all OFDM symbols (for example, a fifth OFDM symbol, a sixth OFDM symbol, a twelfth OFDM symbol, and a thirteenth OFDM symbol shown in FIG. 9) allocated in advance, and occupy, in frequency domain, an entire frequency band of the RB pair.

Therefore, whether the target REs corresponding to the 16 DMRSs (including the DMRS 0 to the DMRS 15) are occupied may be indicated by using an indication bitmap. If the bitmap indicates 1, the target RE is occupied, or if the bitmap indicates 0, the target RE is not occupied. Likewise, an occupation status of an RE on each symbol in a time-frequency resource direction may also be indicated by using the indication bitmap.

The following describes, in detail with reference to FIG. 9 to FIG. 14, a specific process of indicating a use status of an RE in a time domain resource, a frequency domain resource, or a time-frequency resource by using an indication bitmap.

Optionally, the indication bitmap includes a one-dimensional indication bitmap.

The transmit end device determines the one-dimensional indication bitmap, the one-dimensional indication bitmap is used to indicate a resource corresponding to the target RE in a first dimensional direction, and the first dimensional direction is the frequency domain resource direction or the time domain resource direction.

The transmit end device determines, based on a quantity of target REs that are used by the L pilot signals on each RB pair in the first dimensional direction, that a quantity of bits used to indicate the target REs is $M_3$=L/$n_F$ or $M_3$=L/$n_T$.

The transmit end device sends the one-dimensional indication bitmap by using the $M_3$ bits.

Specifically, when all time domain resources or frequency domain resources that are allocated in advance are occupied by pilot signals such as DMRSs to be transmitted, a use status of a frequency domain resource or a time domain resource may be indicated by using only the one-dimensional indication bitmap.

Figure 10A:
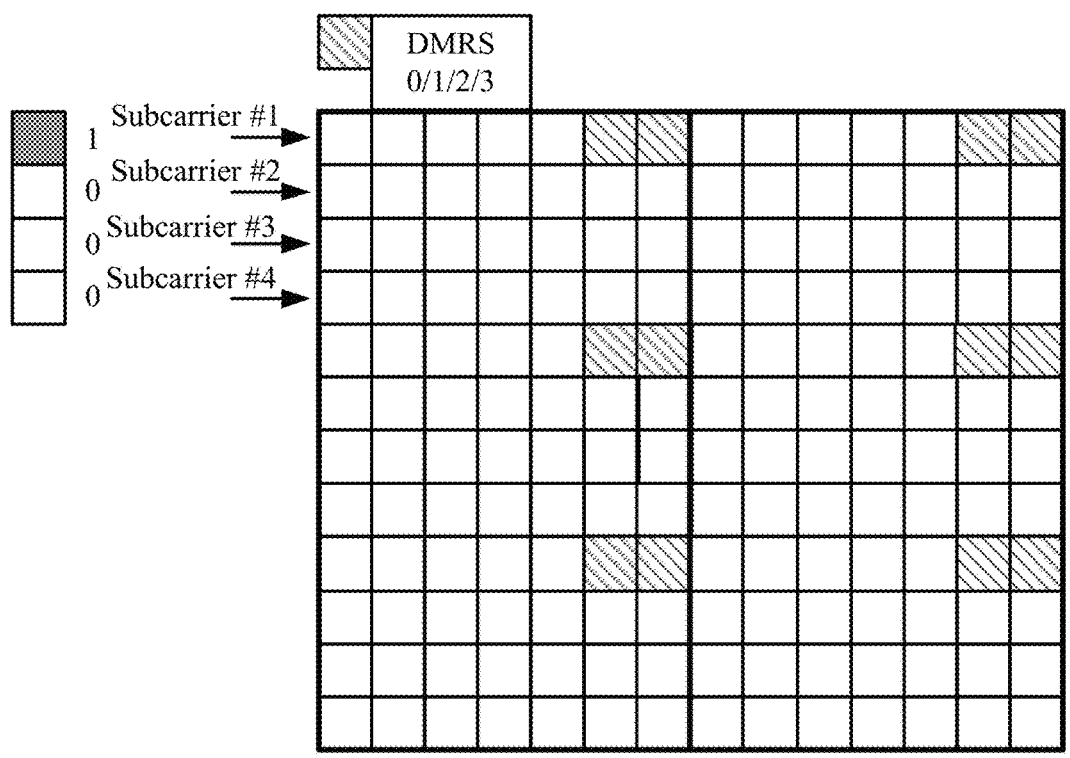
FIG. 10a to FIG. 10c are schematic diagrams of a one-dimensional indication bitmap for indicating a target RE according to still another embodiment of this application.
Figure 10B:
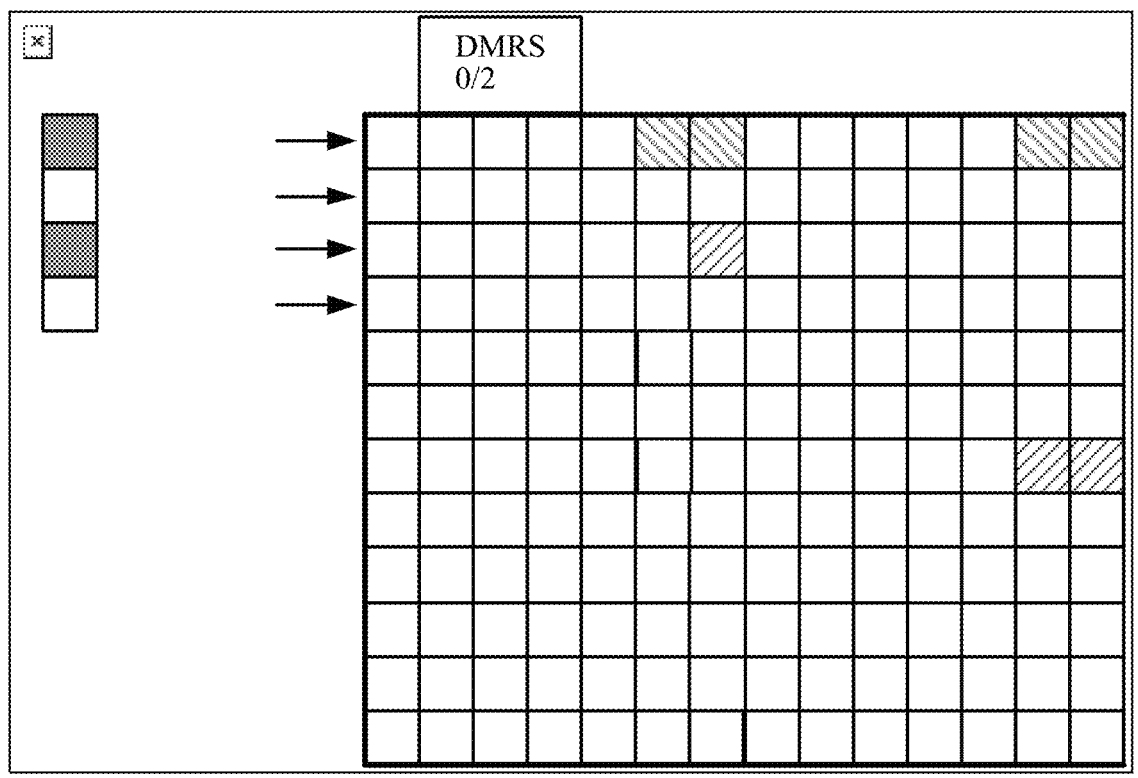
Figure 10C:
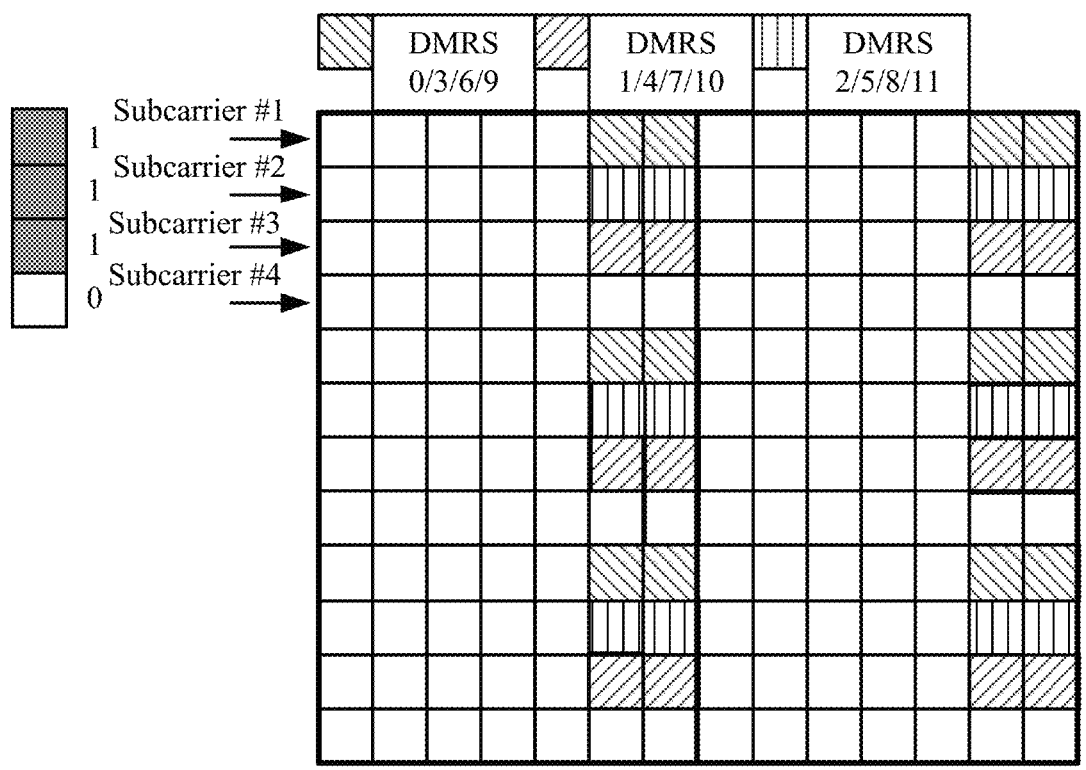

The following describes, in detail with reference to FIG. 9 to FIG. 10 (including FIG. 10a to FIG. 10c), a specific process of indicating a use status of an RE in the frequency domain resource direction by using a one-dimensional indication bitmap.

As shown in FIG. 9, the DMRS 0 to the DMRS 15 always occupy, in time domain, all time domain resources (or OFDM symbols) allocated in advance, and occupy, in frequency domain, the entire frequency band of the RB pair. Each of the DMRS 0 to the DMRS 15 uses ⅓ of the frequency band (which is denoted as a target frequency domain resource for ease of description) of the RB pair. The frequency band corresponding to the target frequency domain resource includes four subcarriers, and a correspondence between the four subcarriers and the DMRSs is that: a first subcarrier (which is denoted as a subcarrier #1 for ease of differentiation and description) corresponds to the DMRS 0, the DMRS 4, the DMRS 8, and the DMRS 12; a second subcarrier (which is denoted as a subcarrier #2 for ease of differentiation and description) corresponds to the DMRS 1, the DMRS 5, the DMRS 9, and the DMRS 13; a third subcarrier (which is denoted as a subcarrier #3 for ease of differentiation and description) corresponds to the DMRS 2, the DMRS 6, the DMRS 10, and the DMRS 14; and a fourth subcarrier (which is denoted as a subcarrier #4 for ease of differentiation and description) corresponds to the DMRS 3, the DMRS 7, the DMRS 11, and the DMRS 15. Therefore, the one-dimensional indication bitmap may indicate, in the frequency domain direction by using only 12/3=4 bits, whether an RE corresponding to each subcarrier is occupied, where 12 represents that one RB pair includes 12 subcarriers, and 3 represents that a density of L DMRSs in the frequency domain resource direction is 3. Alternatively, the one-dimensional indication bitmap may indicate, in the frequency domain direction by using only 12/3=4 bits, whether an RE corresponding to each subcarrier is occupied, where 16 represents the supported maximum transport layer quantity, and 4 represents that the four OFDM symbols allocated in advance are all occupied in the time domain direction. Bits in the one-dimensional indication bitmap corresponding to a pilot pattern shown in FIG. 9 may be set to "1111", to represent that the four subcarriers in the time domain resource are all occupied. An OFDM symbol corresponding to each bit may be determined based on the four OFDM symbols that are all occupied shown in FIG. 9, and each bit corresponds to one OFDM symbol. That is, a time domain resource (for example, an OFDM symbol) indicated by using each bit in the one-dimensional indication bitmap may be determined by using the first mapping relationship diagram.

Therefore, in this embodiment of this application, when the maximum transport layer quantity L is 16, the code length of the OCC is 4 bits, and the pilot density d is 3, the base station indicates that the one-dimensional indication bitmap requires 4-bit signaling overheads, but the 4-bit signaling overheads can enable a large quantity of idle pilot resources in pilot patterns that are pre-configured for the 16 transport layers based on the configuration method in the prior art to be released to transmit data, thereby greatly improving resource usage. In addition, different from the method 1, only one diagram (the first mapping relationship diagram) needs to be prestored in the receive end device and the transmit end device in the method 2, and occupied resources are reduced in comparison with the method 1. In addition, the base station may select a specific to-be-released resource based on a current data transmission status and based on a quantity of resources that can be released, and explicitly indicate, by using bits in the indication bitmap, the resources that can be released without being limited to a fixed pilot pattern. Therefore, more flexible and convenient time-frequency resource configuration is achieved.

FIG. 10a to FIG. 10c are schematic diagrams of a one-dimensional indication bitmap for indicating a target RE according to still another embodiment of this application.

It should be understood that, a pilot pattern in FIG. 10 (including FIG. 10a to FIG. 10c) described by way of example is merely used to facilitate description, and should not be construed as any limitation on this application. In an actual execution process of this embodiment of this application, the indication bitmap may be directly sent to the user equipment based on the prestored first mapping relationship diagram and the determined target RE without generating different pilot patterns based on a change in transport layers.

FIG. 10a is a schematic diagram of indicating a target RE by using a one-dimensional indication bitmap when the quantity of actually used transport layers is 1 to 4. As shown in FIG. 10a, target REs occupied by a DMRS 0 to a DMRS 3 are all distributed on a subcarrier #1 of a target frequency band, and REs on a subcarrier #2, a subcarrier #3, and a subcarrier #4 are not occupied. Frequency domain resources corresponding to the subcarrier #2, the subcarrier #3, and the subcarrier #4 are released to transmit data. Therefore, corresponding bits in the one-dimensional indication bitmap may be set to "1000". After receiving the one-dimensional indication bitmap, the user equipment may determine a time-frequency resource for receiving a DMRS and a time-frequency resource for receiving data.

Therefore, in this embodiment of this application, when the maximum transport layer quantity L is 16, the code length of the OCC is 4 bits, and the pilot density d is 3, the one-dimensional indication bitmap sent by the base station requires 4-bit signaling overheads, but the 4-bit signaling overheads can enable a large quantity of idle pilot resources in pilot patterns that are pre-configured for the 16 transport layers based on the configuration method in the prior art to be released to transmit data, to reduce overheads of pilot resources from 28.6% to 7.1%. In this way, resource usage and data transmission efficiency are greatly improved. In addition, different from the method 1, only one diagram (the first mapping relationship diagram) needs to be prestored in the receive end device and the transmit end device in the method 2, and occupied resources are reduced in comparison with the method 1. In addition, the base station may select a specific to-be-released resource based on a current data transmission status and based on a quantity of resources that can be released, and explicitly indicate, by using bits in the indication bitmap, the resources that can be released without being limited to a fixed pilot pattern. Therefore, more flexible and convenient time-frequency resource configuration is achieved.

FIG. 10b is a schematic diagram of indicating a target RE by using a one-dimensional indication bitmap when the quantity of actually used transport layers is 5 to 8. As shown in FIG. 10b, target REs occupied by a DMRS 0 to a DMRS 7 are all distributed on a subcarrier #1 and a subcarrier #3 of a target frequency band, and REs on a subcarrier #2 and a subcarrier #4 are not occupied. Frequency domain resources corresponding to the subcarrier #2 and the subcarrier #4 are released to transmit data. Therefore, corresponding bits in the one-dimensional indication bitmap may be set to "1010". After receiving the one-dimensional indication bitmap, the user equipment may determine a time-frequency resource for receiving a DMRS and a time-frequency resource for receiving data.

Therefore, in this embodiment of this application, when the maximum transport layer quantity L is 16, the code length of the OCC is 4 bits, and the pilot density d is 3, the one-dimensional indication bitmap sent by the base station requires 4-bit signaling overheads, but the 4-bit signaling overheads can enable a large quantity of idle pilot resources in pilot patterns that are pre-configured for the 16 transport layers based on the configuration method in the prior art to be released to transmit data, to reduce overheads of pilot resources from 28.6% to 14.3%. In this way, resource usage and data transmission efficiency are greatly improved. Further, the base station and the user equipment need to prestore only the first mapping relationship diagram, and occupied resources are reduced. In addition, the base station may select a specific to-be-released resource based on a current data transmission status and based on a quantity of resources that can be released, and explicitly indicate, by using bits in the indication bitmap, the resources that can be released without being limited to a fixed pilot pattern. Therefore, more flexible and convenient time-frequency resource configuration is achieved.

FIG. 10c is a schematic diagram of indicating a target RE by using a one-dimensional indication bitmap when the quantity of actually used transport layers is 9 to 12. As shown in FIG. 10c, target REs occupied by a DMRS 0 to a DMRS 11 are all distributed on a subcarrier #1, a subcarrier #2, and a subcarrier #3 of a target frequency band, and an RE on a subcarrier #4 is not occupied. A frequency domain resource corresponding to the subcarrier #4 is released to transmit data. Therefore, corresponding bits in the one-dimensional indication bitmap may be set to "1110". After receiving the one-dimensional indication bitmap, the user equipment may determine a time-frequency resource for receiving a DMRS and a time-frequency resource for receiving data.

Therefore, in this embodiment of this application, when the maximum transport layer quantity L is 16, the code length of the OCC is 4 bits, and the pilot density d is 3, the one-dimensional indication bitmap sent by the base station requires 4-bit signaling overheads, but the 4-bit signaling overheads can enable a large quantity of idle pilot resources in pilot patterns that are pre-configured for the 16 transport layers based on the configuration method in the prior art to be released to transmit data, to reduce overheads of pilot resources from 28.6% to 21.4%. In this way, resource usage and data transmission efficiency are improved to some extent. Further, the base station and the user equipment need to prestore only the first mapping relationship diagram, and occupied resources are reduced. In addition, the base station may select a specific to-be-released resource based on a current data transmission status and based on a quantity of resources that can be released, and explicitly indicate, by using bits in the indication bitmap, the resources that can be released without being limited to a fixed pilot pattern. Therefore, more flexible and convenient time-frequency resource configuration is achieved.

When the quantity of actually used layers is 13 to 16, a target RE to be used corresponds to the pilot pattern (the first pilot pattern or the first mapping relationship diagram) shown in FIG. 9. That is, 16 DMRSs are configured only when the quantity of actually used transport layers of the to-be-transmitted data stream is 13 to 16, and this is the same as a pilot pattern that is pre-configured for transmitting a DMRS in the configuration method based on the prior art. For brevity, details are not described herein again.

It may be learned from the above that, in this embodiment of this application, the target RE is determined based on the quantity of actually used transport layers, and a time-frequency resource to be used and a time-frequency resource that is not to be used are indicated by using the indication bitmap, so that flexible pilot resource configuration is achieved, thereby improving resource usage.

It should be noted that, the correspondence between a quantity of transport layers and target REs that is provided above is merely described by way of example, and should not be construed as any limitation on this application. In this embodiment of this application, after determining the first pilot pattern based on the prestored first mapping relationship diagram, the base station may flexibly configure, based on the quantity of actually used transport layers, a time-frequency resource to transmit a DMRS and data. This is not specially limited in this application.

The foregoing describes, in detail with reference to FIG. 9 to FIG. 10 (including FIG. 10a to FIG. 10c), the specific process of indicating a use status of an RE in the frequency domain resource direction by using a one-dimensional indication bitmap. The following describes, in detail with reference to FIG. 11 to FIG. 12 (including FIG. 12a to FIG. 12c), a specific process of indicating a use status of an RE in the time domain resource direction by using a one-dimensional indication bitmap.

Figure 11:
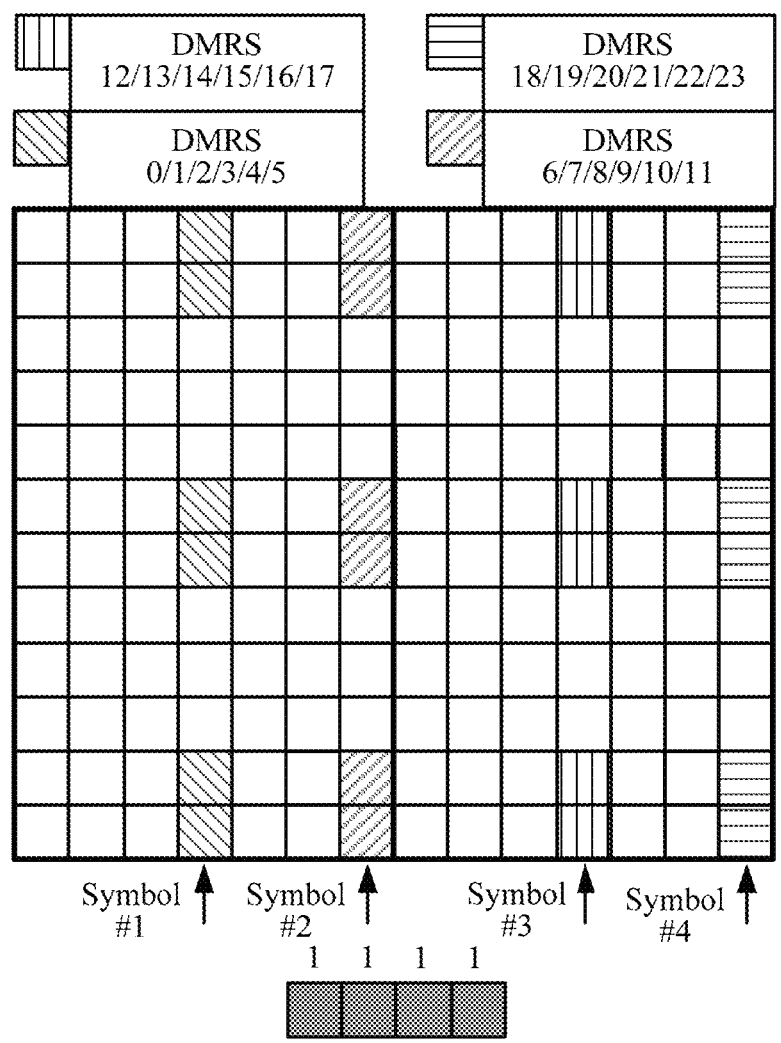
FIG. 11 is a schematic diagram of a first mapping relationship diagram according to yet another embodiment of this application.

FIG. 11 is a schematic diagram of a first mapping relationship diagram according to yet another embodiment of this application. Specifically, FIG. 11 shows a first mapping relationship diagram when L=24, N=6, and d=1. As shown in FIG. 11, a DMRS 0 to a DMRS 23 always occupy, in frequency domain, an entire frequency band (or subcarriers) allocated in advance, and occupy four symbols (which are denoted as a target time domain resource for ease of description) in time domain. In all the symbols corresponding to the target time domain resource, six corresponding target REs on each symbol respectively correspond to six transport layers, and each target RE represents one DMRS of a transport layer. That is, a density d=1. Specifically, on a time domain resource corresponding to a first symbol (which is denoted as a symbol #1 for ease of differentiation and description), six subcarriers respectively correspond to six DMRSs: the DMRS 0, the DMRS 1, the DMRS 2, the DMRS 3, the DMRS 4, and the DMRS 5. On a time domain resource corresponding to a second symbol (which is denoted as a symbol #2 for ease of differentiation and description), the six subcarriers respectively correspond to six DMRSs: the DMRS 6, the DMRS 7, the DMRS 8, the DMRS 9, the DMRS 10, and the DMRS 11. On a time domain resource corresponding to a third symbol (which is denoted as a symbol #3 for ease of differentiation and description), the six subcarriers respectively correspond to six DMRSs: the DMRS 12, the DMRS 13, the DMRS 14, the DMRS 15, the DMRS 16, and the DMRS 17. On a time domain resource corresponding to the fourth symbol (which is denoted as a symbol #4 for ease of differentiation and description), the six subcarriers respectively correspond to six DMRSs: the DMRS 18, the DMRS 19, the DMRS 20, the DMRS 21, the DMRS 22, and the DMRS 23. Because the DMRS 0 to the DMRS 23 occupy fixed frequency domain resources on a RB pair, REs that are occupied by the DMRSs in the time domain resource (that is, another example of the first dimensional direction) need to be indicated by using only a one-dimensional indication bitmap. It may be learned from FIG. 11 that, the DMRSs occupy only four symbols in the time domain resource, that is, $M_3=n_T=4$. Alternatively, a quantity of subcarriers that are to be allocated in advance in the frequency domain resource to the DMRSs is 6, and therefore $M_3=L/n_F=24/6=4$. Therefore, an occupation status of the DMRSs in the time domain resource may be indicated by using four bits. Bits in the one-dimensional indication bitmap corresponding to a pilot pattern shown in FIG. 11 may be set to "1111", to represent that the four symbols on the frequency domain resources are all occupied. A subcarrier corresponding to each bit may be determined based on the six subcarriers that are all occupied shown in FIG. 11. That is, a frequency domain resource (for example, a subcarrier) indicated by using each bit in the one-dimensional indication bitmap may be determined by using the first mapping relationship diagram.

Therefore, in this embodiment of this application, when the maximum transport layer quantity L is 24, the code length of the OCC is 4 bits, and the pilot density d is 1, the one-dimensional indication bitmap sent by the base station requires 4-bit signaling overheads, but the 4-bit signaling overheads can enable a large quantity of idle pilot resources in pilot patterns that are pre-configured for the 24 transport layers based on the configuration method in the prior art to be released to transmit data, thereby greatly improving resource usage. Further, the base station and the user equipment need to prestore only the first mapping relationship diagram, and occupied resources are reduced. In addition, the base station may select a specific to-be-released resource based on a current data transmission status and based on a quantity of resources that can be released without being limited to a fixed pilot pattern. Therefore, more flexible and convenient time-frequency resource configuration is achieved.

Figure 12A:
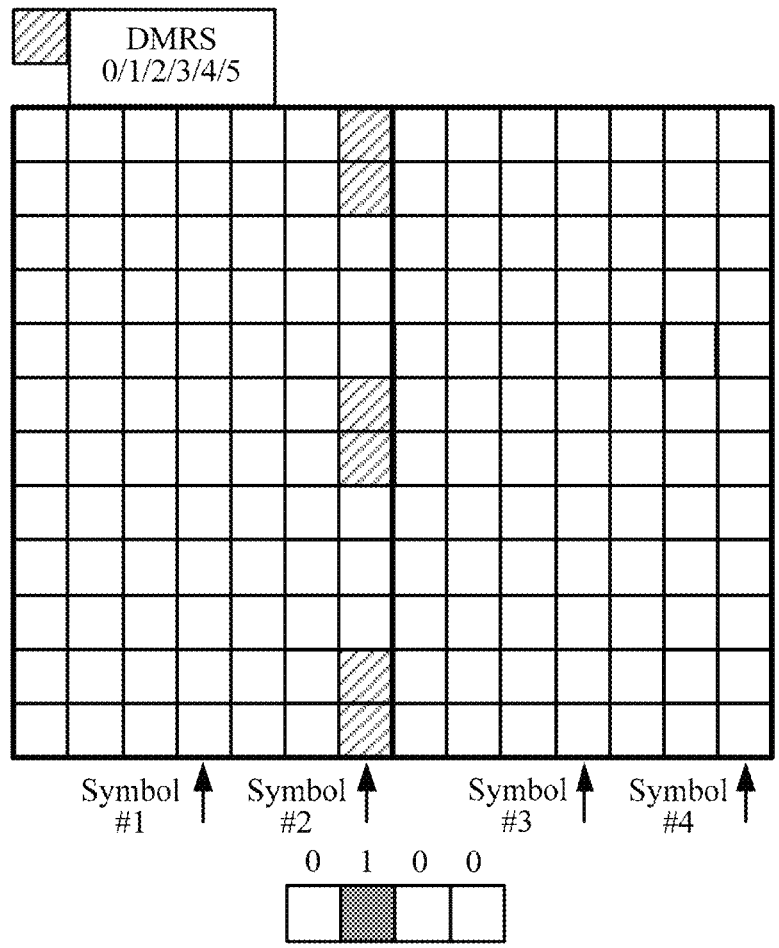
FIG. 12a to FIG. 12c are schematic diagrams of a one-dimensional indication bitmap for indicating a target RE according to yet another embodiment of this application.
Figure 12B:
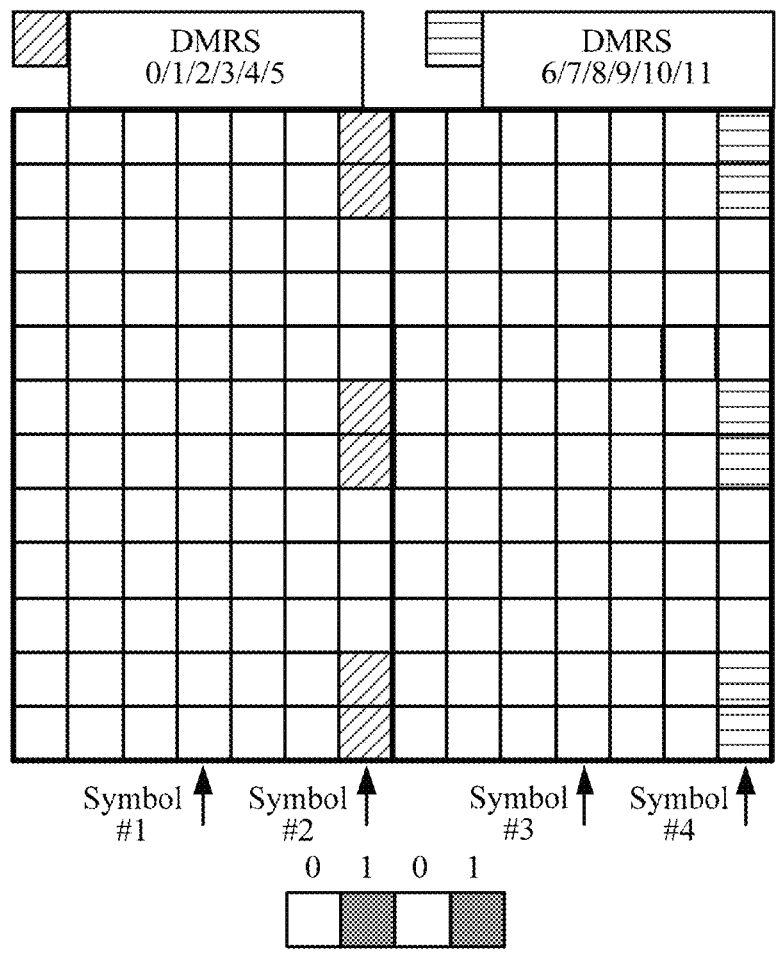
Figure 12C:
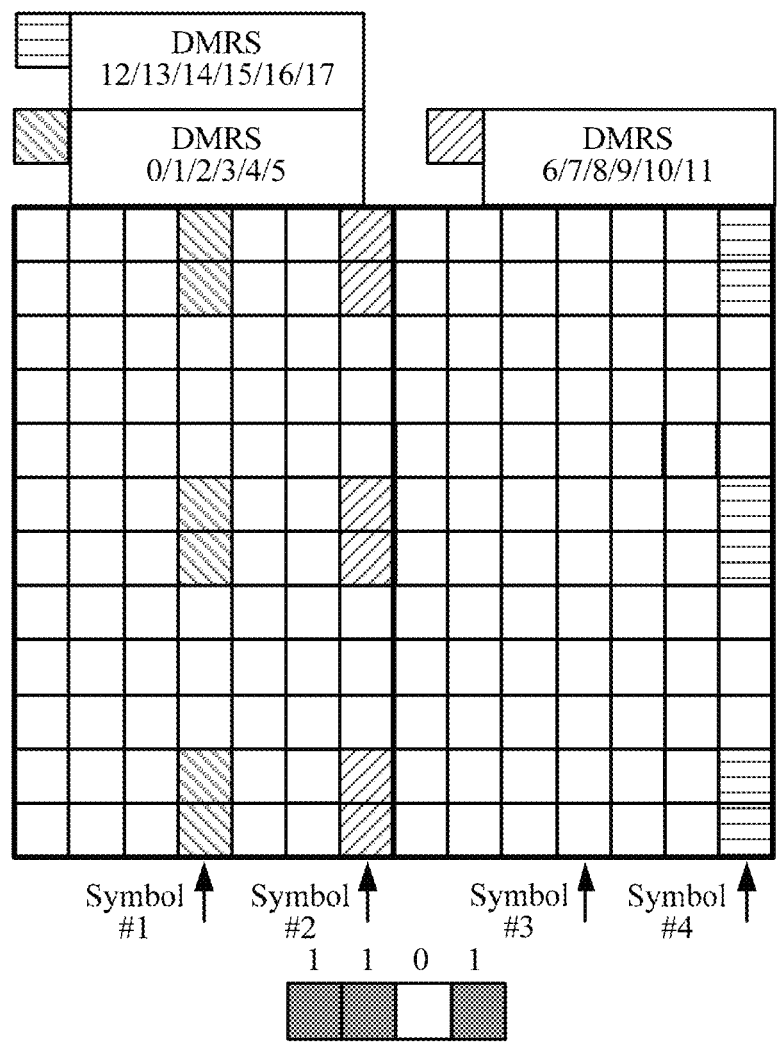

FIG. 12a to FIG. 12c are schematic diagrams of a one-dimensional indication bitmap for indicating a target RE according to yet another embodiment of this application.

It should be understood that, a pilot pattern in FIG. 12 (including FIG. 12a to FIG. 12c) described by way of example is merely used to facilitate description, and should not be construed as any limitation on this application. In an actual execution process of this embodiment of this application, the indication bitmap may be directly sent to the user equipment based on the prestored first mapping relationship diagram and the determined target RE without generating different pilot patterns based on a change in transport layers.

FIG. 12a is a schematic diagram of indicating a target RE by using a one-dimensional indication bitmap when the quantity of actually used transport layers is 1 to 6. As shown in FIG. 12a, a DMRS 0 to a DMRS 5 are distributed in a frequency band (or subcarriers) allocated in advance, and occupy only one OFDM symbol: a symbol #2, and REs corresponding to a symbol #1, a symbol #3, and a symbol #4 are not occupied. Time domain resources corresponding to the symbol #1, the symbol #3, and the symbol #4 are released to transmit data. Therefore, corresponding bits in the one-dimensional indication bitmap may be set to "0100". After receiving the one-dimensional indication bitmap, the user equipment may determine a time-frequency resource for receiving a DMRS and a time-frequency resource for receiving data.

Therefore, in this embodiment of this application, when the maximum transport layer quantity L is 24, the code length of the OCC is 4 bits, and the pilot density d is 1, the one-dimensional indication bitmap sent by the base station requires 4-bit signaling overheads, but the 4-bit signaling overheads can enable a large quantity of idle pilot resources in pilot patterns that are pre-configured for the 24 transport layers based on the configuration method in the prior art to be released to transmit data, to reduce overheads of pilot resources from 14.3% to 3.6%. In this way, resource usage and data transmission efficiency are greatly improved. Further, the base station and the user equipment need to prestore only the first mapping relationship diagram, and occupied resources are reduced. In addition, the base station may select a specific to-be-released resource based on a current data transmission status and based on a quantity of resources that can be released without being limited to a fixed pilot pattern. Therefore, more flexible and convenient time-frequency resource configuration is achieved.

FIG. 12b is a schematic diagram of indicating a target RE by using a one-dimensional indication bitmap when the quantity of actually used transport layers is 7 to 12. As shown in FIG. 12b, a DMRS 0 to a DMRS 11 are distributed in a frequency band (or subcarriers) allocated in advance, and occupy only two OFDM symbols: a symbol #2 and a symbol #4, and REs corresponding to a symbol #1 and a symbol #3 are not occupied. Time domain resources corresponding to the symbol #1 and the symbol #3 are released to transmit data. Therefore, corresponding bits in the one-dimensional indication bitmap may be set to "0101". After receiving the one-dimensional indication bitmap, the user equipment may determine a time-frequency resource for receiving a DMRS and a time-frequency resource for receiving data.

Therefore, in this embodiment of this application, when the maximum transport layer quantity L is 24, the code length of the OCC is 4 bits, and the pilot density d is 1, the one-dimensional indication bitmap sent by the base station requires 4-bit signaling overheads, but the 4-bit signaling overheads can enable a large quantity of idle pilot resources in pilot patterns that are pre-configured for the 24 transport layers based on the configuration method in the prior art to be released to transmit data, to reduce overheads of pilot resources from 14.3% to 7.1%. In this way, resource usage and data transmission efficiency are greatly improved.

FIG. 12c is a schematic diagram of indicating a target RE by using a one-dimensional indication bitmap when the quantity of actually used transport layers is 13 to 18. As shown in FIG. 12c, a DMRS 0 to a DMRS 17 are distributed in a frequency band (or subcarriers) allocated in advance, and occupy three OFDM symbols: a symbol #1, a symbol #2, and a symbol #4, and an RE corresponding to a symbol #3 is not occupied. A time domain resource corresponding to the symbol #3 is released to transmit data. Therefore, corresponding bits in the one-dimensional indication bitmap may be set to "1101". After receiving the one-dimensional indication bitmap, the user equipment may determine a time-frequency resource for receiving a DMRS and a time-frequency resource for receiving data.

Therefore, in this embodiment of this application, when the maximum transport layer quantity L is 24, the code length of the OCC is 4 bits, and the pilot density d is 1, the one-dimensional indication bitmap sent by the base station requires 4-bit signaling overheads, but the 4-bit signaling overheads can enable a large quantity of idle pilot resources in pilot patterns that are pre-configured for the 24 transport layers based on the configuration method in the prior art to be released to transmit data, to reduce overheads of pilot resources from 14.3% to 10.7%. In this way, resource usage and data transmission efficiency are improved to some extent. Further, the base station and the user equipment need to prestore only the first mapping relationship diagram, and occupied resources are reduced. In addition, the base station may select a specific to-be-released resource based on a current data transmission status and based on a quantity of resources that can be released, and explicitly indicate, by using bits in the indication bitmap, the resources that can be released without being limited to a fixed pilot pattern. Therefore, more flexible and convenient time-frequency resource configuration is achieved.

When the quantity of actually used layers is 19 to 24, a target RE to be used corresponds to the pilot pattern (the first pilot pattern or the first mapping relationship diagram) shown in FIG. 11. That is, 24 DMRSs are configured only when the quantity of actually used transport layers of the to-be-transmitted data stream is 19 to 24, and this is the same as a pilot pattern that is pre-configured for transmitting a DMRS in the configuration method based on the prior art. For brevity, details are not described herein again.

It may be learned from the above that, in this embodiment of this application, the target RE is determined based on the quantity of actually used transport layers, and a time-frequency resource to be used and a time-frequency resource that is not to be used are indicated by using the indication bitmap, so that flexible pilot resource configuration is achieved, thereby improving resource usage.

It should be noted that, the correspondence between a quantity of transport layers and target REs that is provided above is merely described by way of example, and should not be construed as any limitation on this application. For example, 24 pilot signals shown in FIG. 11 and FIG. 12 (including FIG. 12a to FIG. 12c) may be distributed based on time domain resources (for example, OFDM symbols) allocated in advance, and are flexibly configured in frequency domain. In this case, a use status of the 24 pilot signals may be indicated by using a one-dimensional indication bitmap in terms of a frequency domain resource. That is, the one-dimensional indication bitmap may be of 6 bits, to indicate a use status of the six subcarriers that are all occupied in the first mapping relationship diagram (or the first pilot pattern). Each bit corresponds to one subcarrier.

Therefore, when the maximum transport layer quantity L is 24, the code length of the OCC is 4 bits, and the pilot density d is 1, the one-dimensional indication bitmap sent by the base station requires 6-bit signaling overheads, but the 6-bit signaling overheads can enable a large quantity of idle pilot resources in pilot patterns that are pre-configured for the 24 transport layers based on the configuration method in the prior art to be released to transmit data, thereby greatly improving resource usage. Further, the base station and the user equipment need to prestore only the first mapping relationship diagram, and occupied resources are reduced. In addition, the base station may select a specific to-be-released resource based on a current data transmission status and based on a quantity of resources that can be released, and explicitly indicate, by using bits in the indication bitmap, the resources that can be released without being limited to a fixed pilot pattern. Therefore, more flexible and convenient time-frequency resource configuration is achieved.

In this embodiment of this application, after determining the first pilot pattern based on the prestored first mapping relationship diagram, the base station may flexibly configure, based on the quantity of actually used transport layers, a time-frequency resource to transmit a DMRS and data. This is not specially limited in this application. The foregoing describes, in detail with reference to FIG. 9 to FIG. 12, a specific process of indicating a use status of an RE in the frequency domain resource direction or the time domain resource direction by using a one-dimensional indication bitmap. The following describes, in detail with reference to FIG. 13 and FIG. 14, a specific process of indicating a use status of an RE in the time domain resource direction and the frequency domain resource direction by using a two-dimensional bitmap.

Optionally, the indication bitmap includes a two-dimensional indication bitmap.

The transmit end device determines the two-dimensional indication bitmap. The two-dimensional indication bitmap is used to indicate resources corresponding to the target RE in a first dimensional direction and a second dimensional direction. The first dimensional direction is the frequency domain resource direction and the second dimensional direction is the time domain resource direction, or the first dimensional direction is the time domain resource direction and the second dimensional direction is the frequency domain resource direction.

The transmit end device determines, based on a quantity of target REs that are used by the L pilot signals on each RB pair in the first dimensional direction and a quantity of target REs that are used by the L pilot signals on each RB pair in the second dimensional direction, that a quantity of bits used to indicate the target REs is $M_4 = L/n_F + L/n_T$.

The transmit end device sends the two-dimensional indication bitmap by using the $M_4$ bits.

Specifically, in this embodiment of this application, a use status of an RE in the time domain resource direction and the frequency domain resource direction may alternatively be indicated by using a two-dimensional indication bitmap.

Figure 13:
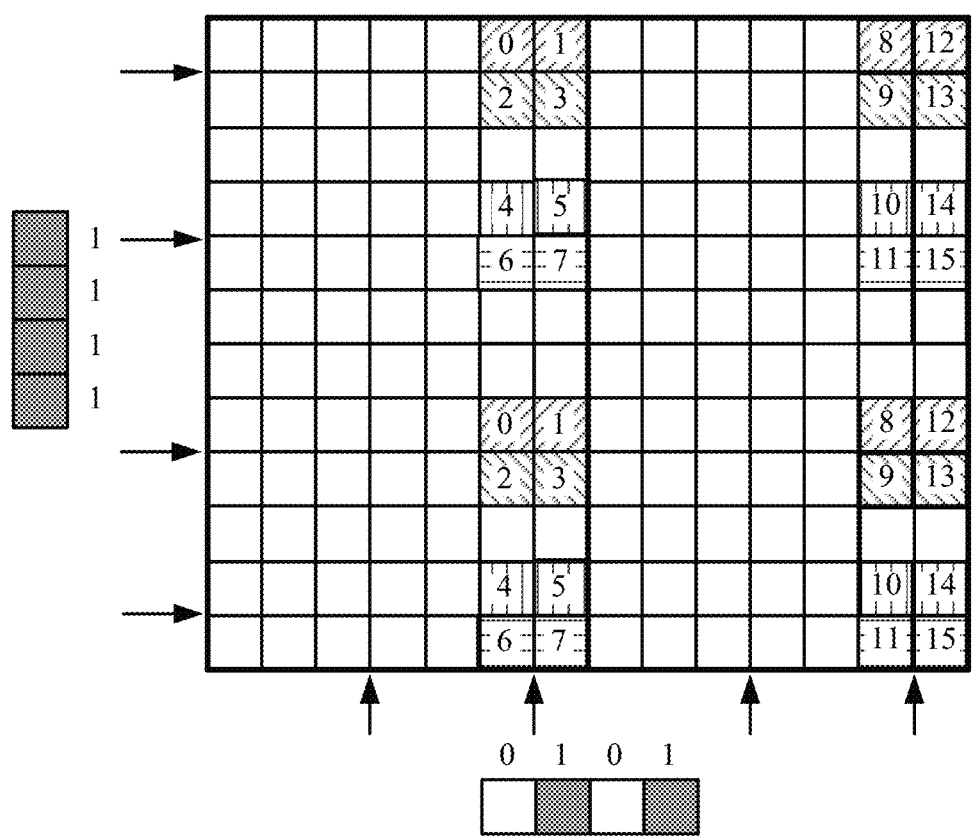
FIG. 13 is a schematic diagram of a first mapping relationship diagram according to yet another embodiment of this application.

FIG. 13 is a schematic diagram of a first mapping relationship diagram according to yet another embodiment of this application. Specifically, FIG. 13 shows a first mapping relationship diagram when L=16, N=4, and d=2. As shown in FIG. 13, a density of a DMRS 0 to a DMRS 15 in a frequency domain direction is $d_F = 2$, and a density of the DMRS 0 to the DMRS 15 in a time domain direction is $d_T = 1$. The DMRS 0/1/8/12, the DMRS 2/3/9/13, the DMRS 4/5/10/14, and the DMRS 6/7/11/15 each occupy one subcarrier in a frequency domain resource, and the DMRS 0/2/4/6, the DMRS 1/3/5/7, the DMRS 8/9/10/11, and the DMRS 12/13/14/15 each occupy one symbol in a time domain resource. Subcarriers occupied by the DMRS 0/1/8/12 and the DMRS 2/3/9/13 are adjacent, and subcarriers occupied by the DMRS 4/5/10/14 and the DMRS 6/7/11/15 are adjacent. The two adjacent subcarriers may be considered as one frequency domain unit, and may be indicated by using one indicator bit. Symbols occupied by the DMRS 0/2/4/6 and the DMRS 1/3/5/7 are adjacent, and symbols occupied by the DMRS 8/9/10/11 and the DMRS 12/13/14/15 are adjacent. The two adjacent symbols may be considered as one time domain unit, and may be indicated by using one indicator bit. Bits of a two-dimensional indication bitmap in FIG. 13 in a frequency domain resource direction may be set to "1111", and bits in a time domain resource direction may be set to "0101". That is, bits occupied by the two-dimensional indication bitmap are $M_4 = L/n_F + L/n_T = 4 + 4 = 8$ bits, and the two-dimensional indication bitmap sent by the base station requires 8-bit signaling overheads.

Therefore, in this embodiment of this application, when the maximum transport layer quantity L is 16, the code length of the OCC is 4 bits, and the pilot density d is 2, the two-dimensional indication bitmap sent by the base station requires 8-bit signaling overheads, but the 8-bit signaling overheads can enable a large quantity of idle pilot resources in pilot patterns that are pre-configured for the 16 transport layers based on the configuration method in the prior art to be released to transmit data, thereby greatly improving resource usage. Further, the base station and the user equipment need to prestore only the first mapping relationship diagram, and occupied resources are reduced. In addition, the base station may select a specific to-be-released resource based on a current data transmission status and based on a quantity of resources that can be released, and explicitly indicate, by using bits in the indication bitmap, the resources that can be released without being limited to a fixed pilot pattern. Therefore, more flexible and convenient time-frequency resource configuration is achieved. Moreover, the signaling overheads required by the two-dimensional indication bitmap are higher than the signaling overheads required by the one-dimensional indication bitmap, but the two-dimensional indication bitmap may be used in combination with one or more other two-dimensional indication bitmaps (for example, a two-dimensional indication bitmap shown in FIG. 14) to indicate an idle pilot resource, so that densities of the pilot signal in the time domain direction and the frequency domain direction are flexibly switched, and resources used by the pilot signal in terms of time domain resource and frequency domain resource are adjustable. Therefore, resource configuration flexibility is further improved.

Figure 14:
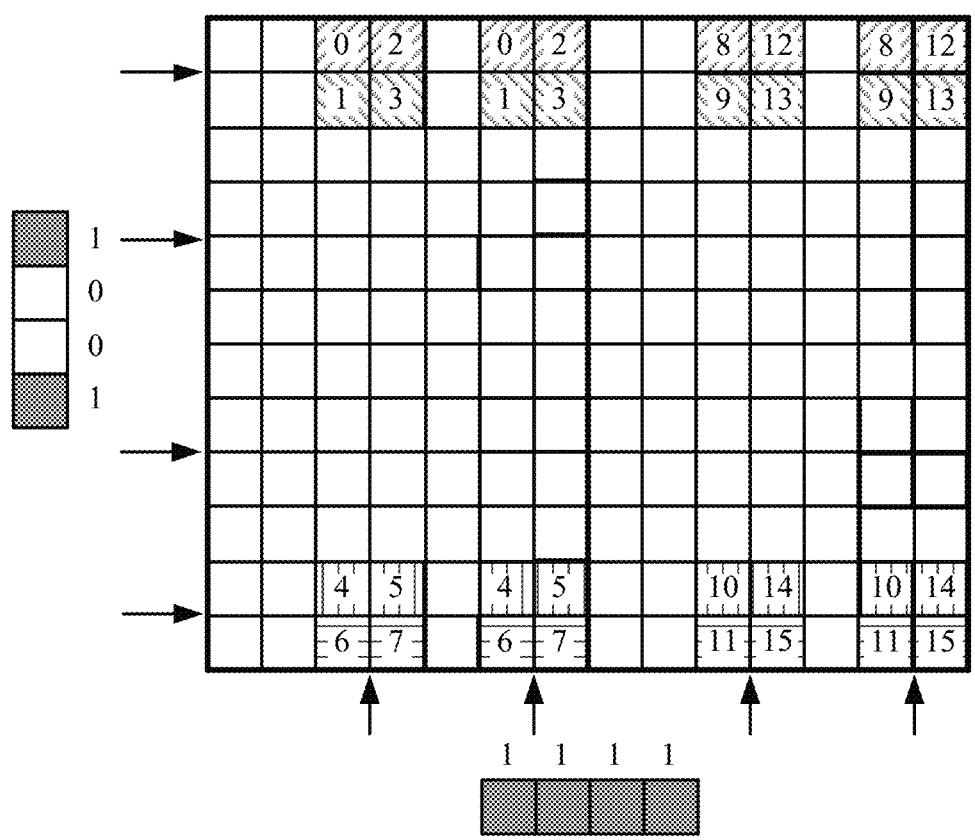
FIG. 14 is another schematic diagram of a first mapping relationship diagram according to yet another embodiment of this application.

FIG. 14 is another schematic diagram of a first mapping relationship diagram according to yet another embodiment of this application. Specifically, FIG. 14 shows a first mapping relationship diagram when L=16, N=4, and d=2. As shown in FIG. 14, a density of a DMRS 0 to a DMRS 15 in a frequency domain direction is $d_F=1$, and a density of the DMRS 0 to the DMRS 15 in a time domain direction is $d_T=2$. The DMRS 0/1/8/12, the DMRS 2/3/9/13, the DMRS 4/5/10/14, and the DMRS 6/7/11/15 each occupy one subcarrier in a frequency domain resource, and the DMRS 0/2/4/6, the DMRS 1/3/5/7, the DMRS 8/9/10/11, and the DMRS 12/13/14/15 each occupy one symbol in a time domain resource. Subcarriers occupied by the DMRS 0/1/8/12 and the DMRS 2/3/9/13 are adjacent, and subcarriers occupied by the DMRS 4/5/10/14 and the DMRS 6/7/11/15 are adjacent. The two adjacent subcarriers may be considered as one frequency domain unit, and may be indicated by using one indicator bit. Symbols occupied by the DMRS 0/2/4/6 and the DMRS 1/3/5/7 are adjacent, and symbols occupied by the DMRS 8/9/10/11 and the DMRS 12/13/14/ 15 are adjacent. The two adjacent symbols may be considered as one time domain unit, and may be indicated by using one indicator bit. Bits of a two-dimensional indication bitmap in FIG. 14 in a frequency domain resource direction may be set to "1001", and bits in a time domain resource direction may be set to "1111". That is, bits occupied by the two-dimensional indication bitmap is $M_4=L/n_F+L/n_T=4+4=8$ bits, and the two-dimensional indication bitmap sent by the base station requires 8-bit signaling overheads.

Therefore, in this embodiment of this application, when the maximum transport layer quantity L is 16, the code length of the OCC is 4 bits, and the pilot density d is 2, the two-dimensional indication bitmap sent by the base station requires 8-bit signaling overheads, but the 8-bit signaling overheads can enable a large quantity of idle pilot resources in pilot patterns that are pre-configured for the 16 transport layers based on the configuration method in the prior art to be released to transmit data, thereby greatly improving resource usage. Further, the base station and the user equipment need to prestore only the first mapping relationship diagram, and occupied resources are reduced. In addition, the base station may select a specific to-be-released resource based on a current data transmission status and based on a quantity of resources that can be released, and explicitly indicate, by using bits in the indication bitmap, the resources that can be released without being limited to a fixed pilot pattern. Therefore, more flexible and convenient time-frequency resource configuration is achieved. Moreover, the signaling overheads required by the two-dimensional indication bitmap are higher than the signaling overheads required by the one-dimensional indication bitmap, but the two-dimensional indication bitmap may be used in combination with one or more other two-dimensional indication bitmaps (for example, a two-dimensional indication bitmap shown in FIG. 13) to indicate an idle pilot resource, so that densities of the pilot signal in the time domain direction and the frequency domain direction are flexibly switched, and resources used by the pilot signal in terms of time domain resource and frequency domain resource are adjustable. Therefore, resource configuration flexibility is further improved.

It should be noted that, FIG. 13 and FIG. 14 show two different first mapping relationship diagrams when L=16, N=4, d=2. In the first mapping relationship diagram shown in FIG. 13, the density in the frequency domain direction is $d_F=2$, and the density in the time domain direction is $d_T=1$. In the first mapping relationship diagram shown in FIG. 14, the density in the frequency domain direction is $d_F=1$, and the density in the time domain direction is $d_T=2$. Examples of the densities provided above are merely described by way of example, and should not be construed as any limitation on this application. In this embodiment of this application, the two-dimensional indication bitmap is used to indicate an idle pilot resource, so that densities of the pilot signal in the time domain direction and the frequency domain direction can be switched, and resources used by the pilot signal in terms of time domain resource and frequency domain resource can be flexibly adjusted. For example, in a channel environment with relatively high frequency selectivity, a density of DMRSs in frequency domain may be increased. For example, $d_F=2$ and $d_T=1$ are used. In a time-varying channel, a density of DMRSs in time domain may be increased. For example, $d_F=2$ and $d_T=1$ are used.

It should be understood that, the two-dimensional indication bitmaps provided above are merely described by way of example, and should not be construed as any limitation on this application. This application should not be limited thereto either. The transmit end device (for example, the base station) can switch densities in two or more two-dimensional indication bitmaps in the time domain resource direction and the frequency domain resource direction, provided that in first mapping relationship diagrams corresponding to the two or more two-dimensional indication bitmaps, transport layer quantities L, OCC code lengths, and pilot densities d are the same.

Therefore, although the two-dimensional indication bitmap requires higher signaling overheads, an idle pilot resource that can be released can be flexibly configured, and the densities can be dynamically switched in time domain and frequency domain for the channel environment, so that more flexible resource configuration is achieved, thereby further improving system performance.

It should be understood that, the DMRSs provided above should not be construed as any limitation on this application. This application should not be limited thereto either. Other pilot signals such as a CRS and a CRI-RS each may be used for channel estimation or channel sounding, and each may correspond to an antenna port. Therefore, the method for transmitting a pilot signal in this embodiment of this application may be used to transmit another pilot signal. This is not specially limited in this application.

In view of the above, the method 2 requires more signaling overheads than the method 1, but a quantity of pilot patterns can be reduced while idle pilot resources are released, thereby reducing a resource occupation percentage. In addition, a specific to-be-released resource is flexibly selected based on a quantity of resources that can be released, and an idle pilot resource is indicated by using a two-dimensional indication bitmap, so that densities of the pilot signal in the time domain direction and the frequency domain direction can be switched, and resource configuration flexibility is greatly improved.

The foregoing describes, in detail with reference to FIG. 3 to FIG. 14, the method for transmitting a pilot signal according to the embodiments of this application. The following describes, in detail with reference to FIG. 15 to FIG. 16, a resource usage change caused by the method for transmitting a pilot signal according to the embodiments of this application.

Figure 15:
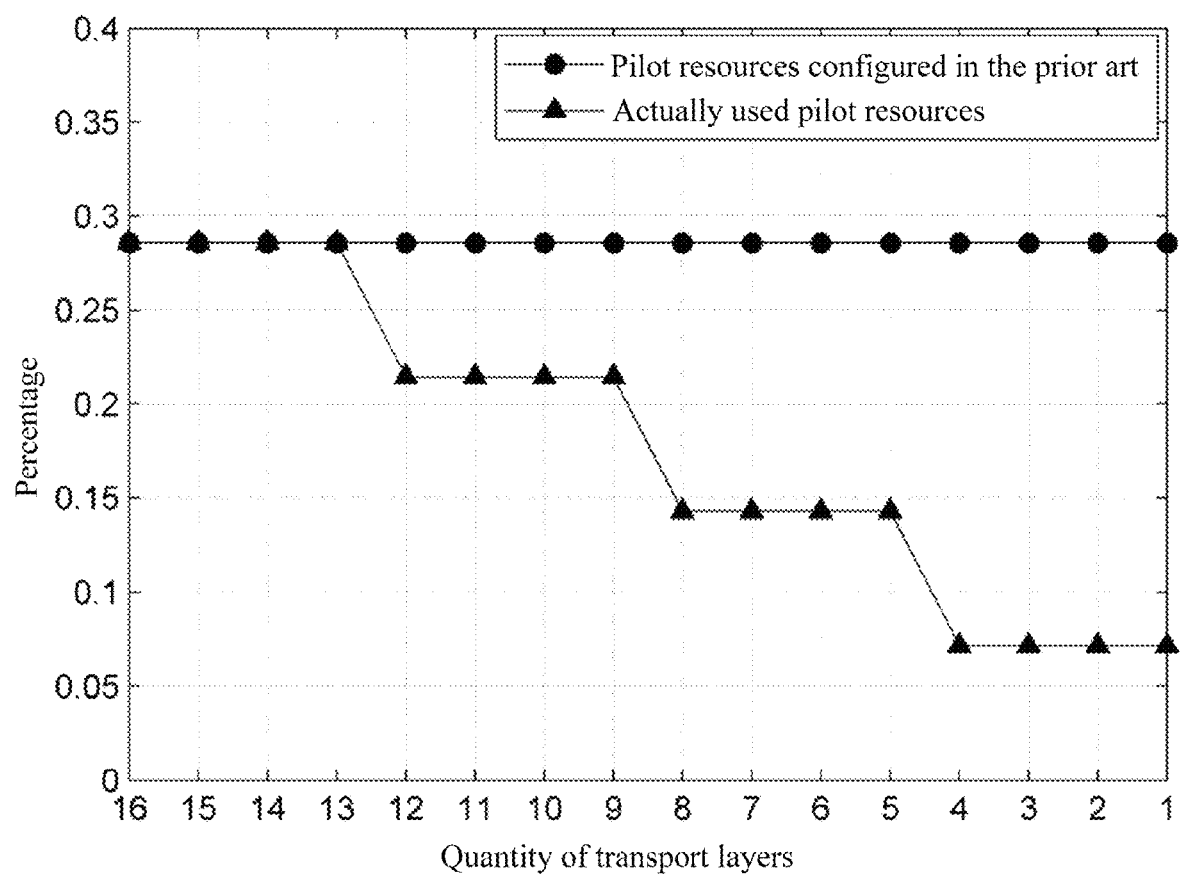
FIG. 15 is a schematic diagram of resource usage according to an embodiment of this application.

FIG. 15 is a schematic diagram of resource usage according to an embodiment of this application. Specifically, FIG. 15 is a schematic curve of releasing a pilot resource for multiplexing in data transmission according to this application when L=16, N=4, and d=3. As shown in FIG. 15, a horizontal coordinate represents a quantity of actually used transport layers, and a vertical coordinate represents a percentage of target REs (or the pilot resource) to one RB pair. ● represents a percentage of pilot resources that are preconfigured for a maximum transport layer quantity based on a configuration method in the prior art to one RB pair (which is a first percentage for ease of description), and ▲ represents a percentage of actually used pilot resources to one RB pair according to this embodiment of this application (which is briefly referred to as a second percentage for ease of description). It may be learned from the figure that, when the quantity of actually used transport layers is 13 to 16, the first percentage and the second percentage are on a same horizontal line and are both 28.6%. When the quantity of actually used transport layers is reduced to 9 to 12, the second percentage is reduced to 21.4%, but the first percentage is still 28.6%. When the quantity of actually used transport layers is reduced to 5 to 8, the second percentage is reduced to 14.3%, but the first percentage is still 28.6%. When the quantity of actually used transport layers is reduced to 0 to 4, the second percentage is reduced to 7.1%, but the first percentage is still 28.6%. It may be obviously learned from the above that, a smaller quantity of actually used transport layers indicates a higher proportion of idle pilot resources that are released by using this application. In addition, the pilot resources are released by using four layers as one group. This increases signaling overheads by 2 to 4 bits, but greatly improves resource usage and achieves flexible resource configuration.

Figure 16:
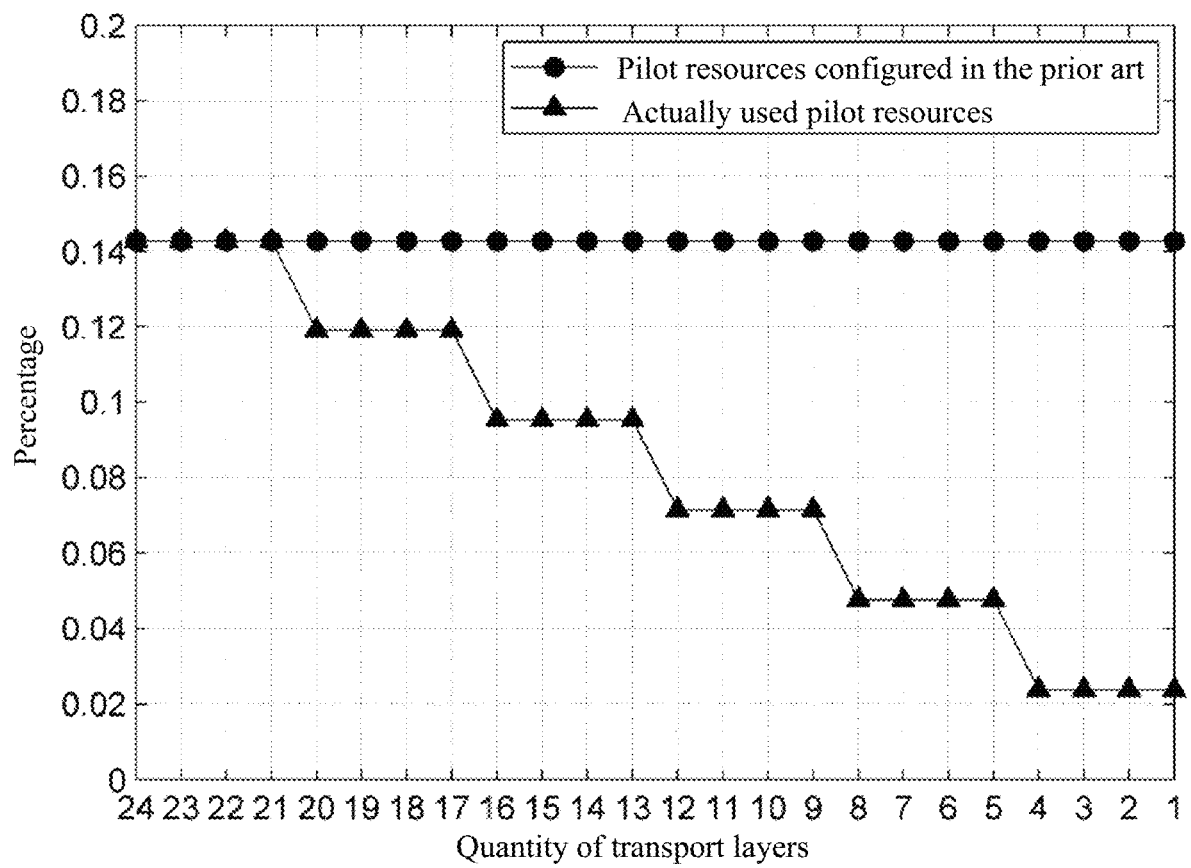
FIG. 16 is a schematic diagram of resource usage according to another embodiment of this application.

FIG. 16 is a schematic diagram of resource usage according to another embodiment of this application. Specifically, FIG. 16 is a schematic curve of releasing a pilot resource for multiplexing in data transmission according to this application when L=24, N=6, and d=1. As shown in FIG. 16, a horizontal coordinate represents a quantity of actually used transport layers, and a vertical coordinate represents a percentage of target REs (or the pilot resource) to one RB pair. ● represents a percentage of pilot resources that are preconfigured for a maximum transport layer quantity based on a configuration method in the prior art to one RB pair (which is a first percentage for ease of description), and ▲ represents a percentage of actually used pilot resources to one RB pair according to this embodiment of this application (which is briefly referred to as a second percentage for ease of description). It may be learned from the figure that, when the quantity of actually used transport layers is 20 to 24, the first percentage and the second percentage are on a same horizontal line and are both 14.3%. When the quantity of actually used transport layers is reduced to 17 to 20, the second percentage is reduced to 11.9%, but the first percentage is still 14.3%. When the quantity of actually used transport layers is reduced to 13 to 16, the second percentage is reduced to 9.5%, but the first percentage is still 14.3%. When the quantity of actually used transport layers is reduced to 9 to 12, the second percentage is reduced to 7.1%, but the first percentage is still 14.3%. When the quantity of actually used transport layers is reduced to 5 to 8, the second percentage is reduced to 4.8%, but the first percentage still is 14.3%. When the quantity of actually used transport layers is reduced to 0 to 4, the second percentage is reduced to 2.4%, but the first percentage still is 14.3%. It may be obviously learned from the above that, a smaller quantity of actually used transport layers indicates a higher proportion of idle pilot resources that are released by using this application. In addition, the pilot resources are released by using four layers as one group. This increases signaling overheads by 2 to 6 bits, but greatly improves resource usage and achieves flexible resource configuration.

Therefore, according to the method for transmitting a pilot signal in this embodiment of this application, the transmit end device determines, based on the one or more prestored pilot patterns, a time-frequency resource corresponding to the quantity of layers for transmitting the data stream, so that a resource for transmitting the pilot signal can be determined based on a quantity of actual layers for transmitting the data stream. In this way, an idle pilot resource is released to transmit data, so that more flexible resource configuration is achieved, thereby improving resource usage.

The method for transmitting a pilot signal according to the embodiments of this application is described in detail above with reference to FIG. 2 to FIG. 16, and an apparatus for transmitting a pilot signal according to the embodiments of this application is described in detail below with reference to FIG. 17 and FIG. 18.

Figure 17:
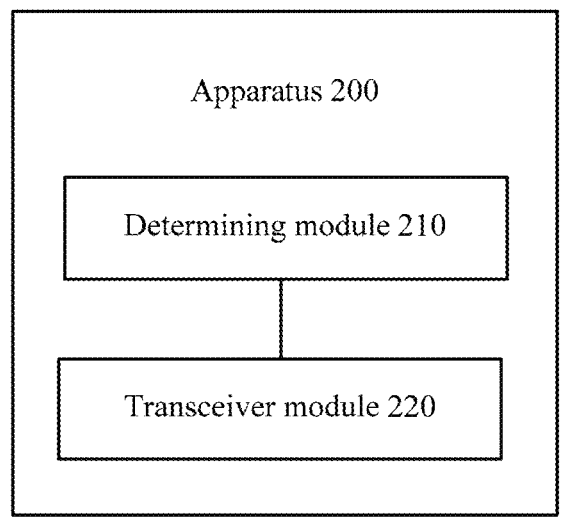
FIG. 17 is a schematic block diagram of an apparatus for transmitting a pilot signal according to an embodiment of this application.

FIG. 17 is a schematic block diagram of an apparatus 200 for transmitting a pilot signal according to an embodiment of this application. As shown in FIG. 17, the apparatus 200 includes a determining module 210 and a transceiver module 220.

The determining module 210 is configured to determine, based on prestored N pilot patterns, a target time-frequency resource for transmitting a pilot signal. The target time-frequency resource corresponds to a total quantity of layers of a to-be-transmitted data stream, the N pilot patterns are different from each other, and N is a natural number greater than or equal to 1.

The transceiver module 220 is configured to send indication information to a receive end device. The indication information is used to instruct the receive end device to transmit the pilot signal to the apparatus 200 based on the target time-frequency resource.

Optionally, the determining module 210 is specifically configured to determine a target pilot pattern corresponding to the total quantity of layers of the to-be-transmitted data stream in the prestored N pilot patterns. The target pilot pattern is used to indicate the target time-frequency resource, N is determined based on a maximum transport layer quantity L supported by the apparatus 200, and L is a natural number greater than or equal to 1.

Optionally, the determining module 210 is specifically configured to: determine a corresponding layer quantity group based on the total quantity of layers of the to-be-transmitted data stream, and determine, based on a one-to-one mapping relationship between the N pilot patterns and N layer quantity groups, the target pilot pattern corresponding to the layer quantity group.

The apparatus 200 prestores the one-to-one mapping relationship between the N pilot patterns and the N layer quantity groups. A layer quantity included in an $i^{th}$ layer quantity group in the N layer quantity groups is a natural number greater than $(i-1) \times \lceil L/N \rceil$ and less than or equal to $i \times \lceil L/N \rceil$, $i \in [1, N]$, and $N = \lceil L/C \rceil$, where $\lceil \ \rceil$ represents roundup, C is a code length of an orthogonal cover code used between transport layers, a value of C is $2^n$, and n is a natural number greater than or equal to 1.

Optionally, the transceiver module 220 is specifically configured to send, to the receive end device, indication information used to indicate an antenna port number, where the antenna port number is a port number of an antenna port for transmitting the pilot signal, and the antenna port number is determined by the determining module based on the total quantity of layers of the to-be-transmitted data stream, so that the receive end device determines the target pilot pattern corresponding to the antenna port number, so as to determine the target time-frequency resource based on the target pilot pattern, and transmit the pilot signal to the apparatus 200 based on the target time-frequency resource.

The apparatus 200 and the receive end device prestore a one-to-one mapping relationship between the N pilot patterns and N antenna port number groups, any antenna port number in an $i^{th}$ port number group is used to uniquely indicate an $i^{th}$ pilot pattern, and $i \in [1, N]$.

Optionally, the determining module 210 is further configured to determine that a quantity $M_1$ of bits that carry the antenna port number is:

$M_1 = \lceil \log_2(\Sigma_{i=1}^{N} i \times \lceil L/N \rceil) \rceil$, where $\lceil \ \rceil$ represents roundup.

And the transceiver module 220 is specifically configured to send the indication information by using the $M_1$ bits, where the indication information is used to indicate the antenna port number.

Optionally, the transceiver module 220 is specifically configured to send indication information used to indicate an index number of the target pilot pattern, where the index number of the target pilot pattern is determined by the apparatus 200 based on the total quantity of layers of the to-be-transmitted data stream, so that the receive end device determines the target pilot pattern corresponding to the index number of the target pilot pattern, so as to determine the target time-frequency resource based on the target pilot pattern, and receive the pilot signal from the apparatus 200 based on the target time-frequency resource.

The apparatus 200 and the receive end device prestore a one-to-one mapping relationship between the N pilot patterns and index numbers of the N pilot patterns.

Optionally, the determining module 210 is further configured to determine that a quantity $M_2$ of bits that carry the index number of the target pilot pattern is: $M_2 = \lceil \log_2 N \rceil$, where $\lceil \ \rceil$ represents roundup.

The transceiver module 220 is specifically configured to send the indication information by using the $M_2$ bits, where the indication information is used to indicate the index number of the target pilot pattern.

Optionally, the determining module 210 is specifically configured to determine, based on a prestored first pilot pattern, a target resource element RE for transmitting the pilot signal. The target time-frequency resource includes the target RE, the N pilot patterns include the first pilot pattern, and the first pilot pattern is used to indicate, when the total quantity of layers of the to-be-transmitted data stream is a maximum transport layer quantity L supported by the apparatus 200, pre-configured $d \times L$ REs for transmitting L pilot signals, where d is a density of a pilot signal that corresponds to each transport layer and that is on each resource block RB pair, d is a natural number greater than or equal to 1, L is a natural number greater than or equal to 1, $L = n_F \times n_T$, $n_F$ is a quantity of REs that are used by the L pilot signals on each RB pair in a frequency domain resource direction, $n_T$ is a quantity of REs that are used by the L pilot signals on each RB pair in a time domain resource direction, the indication information includes an indication bitmap, and the target time-frequency resource includes the target RE.

The determining module 210 is specifically configured to determine, based on a prestored first mapping relationship diagram, corresponding bits of the target RE that are in the indication bitmap. The first mapping relationship diagram is used to indicate a correspondence between the $d \times L$ REs in the first pilot pattern and the bits in the indication bitmap.

The transceiver module 220 is specifically configured to send the indication bitmap to the receive end device. The indication bitmap is used to instruct the receive end device to receive the pilot signal from the apparatus 200 based on the target RE, and the receive end device prestores the first mapping relationship diagram.

Optionally, the determining module 210 is specifically configured to: determine a one-dimensional indication bitmap, where the one-dimensional indication bitmap is used to indicate a resource corresponding to the target RE in a first dimensional direction, and determine, based on a quantity of target REs that are used by the L pilot signals on each RB pair in the first dimensional direction, that a quantity of bits used to indicate the target REs is $M_3 = L/n_F$ or $M_3 = L/n_T$. The first dimensional direction is the frequency domain resource direction or the time domain resource direction.

The transceiver module 220 is specifically configured to send the one-dimensional indication bitmap by using the $M_3$ bits.

Optionally, the determining module 210 is specifically configured to: determine a two-dimensional indication bitmap, where the two-dimensional indication bitmap is used to indicate resources corresponding to the target RE in a first dimensional direction and a second dimensional direction, and determine, based on a quantity of target REs that are used by the L pilot signals on each RB pair in the first dimensional direction and a quantity of target REs that are used by the L pilot signals on each RB pair in the second dimensional direction, that a quantity of bits used to indicate the target REs is $M_4 = L/n_F + L/n_T$. The first dimensional direction is the frequency domain resource direction and the second dimensional direction is the time domain resource direction, or the first dimensional direction is the time domain resource direction and the second dimensional direction is the frequency domain resource direction.

The transceiver module 220 is specifically configured to send the two-dimensional indication bitmap by using the $M_4$ bits.

Optionally, the apparatus 200 is a network device and the receive end device is user equipment; or the apparatus 200 is user equipment and the receive end device is a network device.

The apparatus 200 for transmitting a pilot signal according to this embodiment of this application may correspond to the transmit end device in the method for transmitting a pilot signal according to the embodiments of this application. Moreover, the modules in the apparatus 200 and the foregoing and other operations and/or functions are separately used for implementing corresponding procedures in the methods in FIG. 2 to FIG. 16. For brevity, details are not described herein.

Therefore, the apparatus for transmitting a pilot signal in this embodiment of this application determines, based on one or more prestored pilot patterns, a time-frequency resource corresponding to the quantity of layers for transmitting the data stream, so that a resource for transmitting the pilot signal can be determined based on a quantity of actual layers for transmitting the data stream. In this way, an idle pilot resource is released to transmit data, so that more flexible resource configuration is achieved, thereby improving resource usage.

Figure 18:
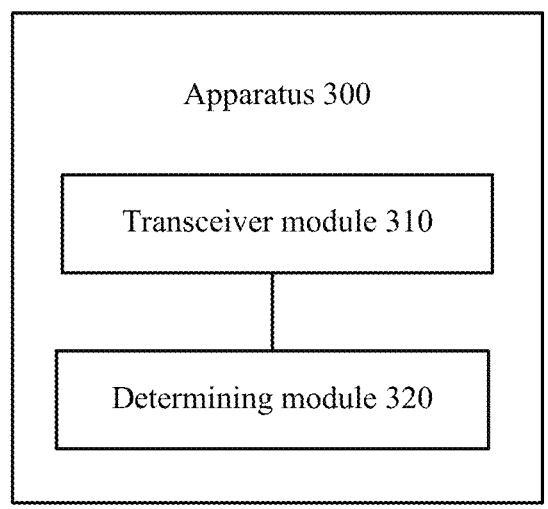
FIG. 18 is a schematic block diagram of an apparatus for transmitting a pilot signal according to another embodiment of this application.

FIG. 18 is a schematic block diagram of an apparatus 300 for transmitting a pilot signal according to another embodiment of this application. As shown in FIG. 18, the apparatus 300 includes a transceiver module 310 and a determining module 320.

The transceiver module 310 is configured to receive indication information sent by a transmit end device.

The determining module 320 is configured to determine, based on the indication information, a target time-frequency resource for transmitting a pilot signal. The target time-frequency resource is determined by the transmit end device based on prestored N pilot patterns, the target time-frequency resource corresponds to a total quantity of layers of a to-be-transmitted data stream, the N pilot patterns are different from each other, and N is a natural number greater than or equal to 1.

The transceiver module 310 is further configured to receive the pilot signal from the transmit end device based on the target time-frequency resource.

Optionally, the determining module 320 is specifically configured to: determine a target pilot pattern based on an antenna port number that is used for transmitting the pilot signal and that is indicated by the indication information, and determine the target time-frequency resource based on the target pilot pattern.

The transmit end device and the apparatus 300 prestore a one-to-one mapping relationship between the N pilot patterns and N antenna port number groups, any antenna port number in an $i^{th}$ port number group is used to uniquely indicate an $i^{th}$ pilot pattern, and i∈[1, N].

Optionally, the determining module 320 is specifically configured to: determine a target pilot pattern based on an index number that is of the target pilot pattern and that is indicated by the indication information, and determine the target time-frequency resource based on the target pilot pattern.

The transmit end device and the apparatus 300 prestore a one-to-one mapping relationship between the N pilot patterns and index numbers of the N pilot patterns.

Optionally, the determining module 320 is specifically configured to determine, based on an indication bitmap indicated by the indication information and a prestored first mapping relationship diagram, a target resource element RE for transmitting the pilot signal. The target time-frequency resource includes the target RE.

The N pilot patterns include a first pilot pattern, the first pilot pattern is used to indicate, when the total quantity of layers of the to-be-transmitted data stream is a maximum transport layer quantity L supported by the transmit end device, pre-configured d×L REs for transmitting L pilot signals, and the first mapping relationship diagram is used to indicate a correspondence between the d×L REs in the first pilot pattern and bits in the indication bitmap, where d is a density of a pilot signal that corresponds to each transport layer and that is on each resource block RB pair, d is a natural number greater than or equal to 1, L is a natural number greater than or equal to 1, $L=n_F \times p_T$, $n_F$ is a quantity of REs that are used by the L pilot signals on each RB pair in a frequency domain resource direction, and $n_T$ is a quantity of REs that are used by the L pilot signals on each RB pair in a time domain resource direction.

Optionally, the transmit end device is a network device and the apparatus 300 is user equipment; or the transmit end device is user equipment and the apparatus 300 is a network device.

The apparatus 300 for transmitting a pilot signal according to this embodiment of this application may correspond to the receive end device in the method for transmitting a pilot signal according to the embodiments of this application. Moreover, the modules in the apparatus 300 and the foregoing and other operations and/or functions are separately used for implementing corresponding procedures in the methods in FIG. 2 to FIG. 16. For brevity, details are not described herein.

Therefore, the apparatus for transmitting a pilot signal in this embodiment of this application determines, based on the indication information sent by the transmit end device, the time-frequency resource for transmitting the pilot signal, so that a resource for transmitting the pilot signal can be determined based on a quantity of actual layers for transmitting the data stream. In this way, an idle pilot resource is released to transmit data, so that more flexible resource configuration is achieved, thereby improving resource usage.

The apparatus for transmitting a pilot signal according to the embodiments of this application is described in detail above with reference to FIG. 17 to FIG. 18, and a device for transmitting a pilot signal according to the embodiments of this application is described in detail below with reference to FIG. 19 and FIG. 20.

Figure 19:
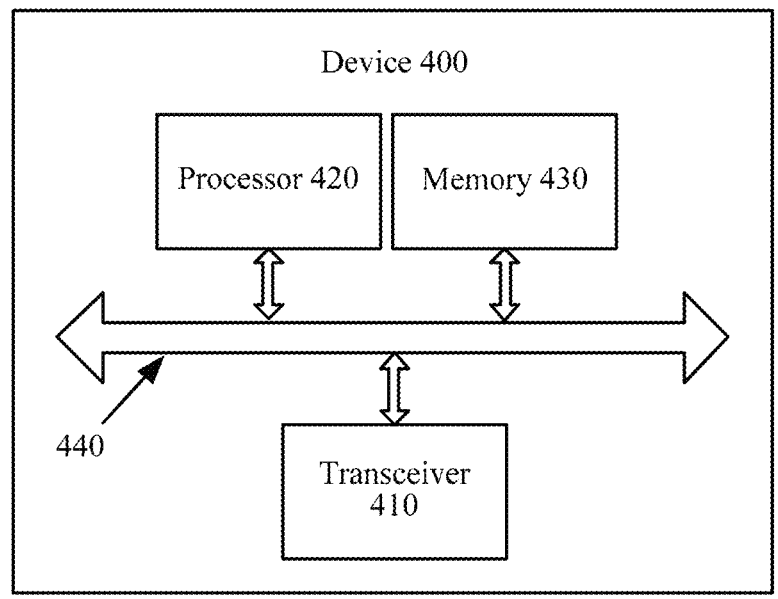
FIG. 19 is a schematic block diagram of a device for transmitting a pilot signal according to an embodiment of this application.

FIG. 19 is a schematic block diagram of a device 400 for transmitting a pilot signal according to an embodiment of this application. As shown in FIG. 19, the device 400 includes: a transceiver 410, a processor 420, a memory 430, and a bus system 440. The transceiver 410, the processor 420, and the memory 430 are connected by using the bus system 440. The memory 430 is configured to store an instruction. The processor 420 is configured to execute the instruction stored in the memory 430, to control the transceiver 410 to send and receive a signal.

The processor 420 is configured to determine, based on prestored N pilot patterns, a target time-frequency resource for transmitting a pilot signal. The target time-frequency resource corresponds to a total quantity of layers of a to-be-transmitted data stream, the N pilot patterns are different from each other, and N is a natural number greater than or equal to 1.

The transceiver 410 is configured to send indication information to a receive end device. The indication information is used to instruct the receive end device to receive the pilot signal from the device 400 based on the target time-frequency resource.

Optionally, the processor 420 is specifically configured to determine a target pilot pattern corresponding to the total quantity of layers of the to-be-transmitted data stream in the prestored N pilot patterns. The target pilot pattern is used to indicate the target time-frequency resource, N is determined based on a maximum transport layer quantity L supported by the device 400, and L is a natural number greater than or equal to 1.

Optionally, the processor 420 is specifically configured to: determine a corresponding layer quantity group based on the total quantity of layers of the to-be-transmitted data stream, and determine, based on a one-to-one mapping relationship between the N pilot patterns and N layer quantity groups, the target pilot pattern corresponding to the layer quantity group.

The device 400 prestores the one-to-one mapping relationship between the N pilot patterns and the N layer quantity groups. A layer quantity included in an $i^{th}$ layer quantity group in the N layer quantity groups is a natural number greater than $(i-1)\times\lceil L/N\rceil$ and less than or equal to $i\times\lceil L/N\rceil$, $i\in[1, N]$, and $N=\lceil L/C\rceil$, where $\lceil\ \rceil$ represents roundup, C is a code length of an orthogonal cover code used between transport layers, a value of C is $2^n$, and n is a natural number greater than or equal to 1.

Optionally, the transceiver 410 is specifically configured to send, to the receive end device, indication information used to indicate an antenna port number, where the antenna port number is a port number of an antenna port for transmitting the pilot signal, and the antenna port number is determined by the determining module based on the total quantity of layers of the to-be-transmitted data stream, so that the receive end device determines the target pilot pattern corresponding to the antenna port number, so as to determine the target time-frequency resource based on the target pilot pattern, and receive the pilot signal from the device 400 based on the target time-frequency resource.

The device 400 and the receive end device prestore a one-to-one mapping relationship between the N pilot patterns and N antenna port number groups, any antenna port number in an $i^{th}$ port number group is used to uniquely indicate an $i^{th}$ pilot pattern, and $i\in[1, N]$.

Optionally, the processor 420 is further configured to determine that a quantity $M_1$ of bits that carry the antenna port number is:

$M_1=\lceil\log_2(\Sigma_{i=1}^{N} i\times\lceil L/N\rceil)\rceil$, where $\lceil\ \rceil$ represents roundup.

And the transceiver 410 is specifically configured to send the indication information by using the $M_1$ bits, where the indication information is used to indicate the antenna port number.

Optionally, the transceiver 410 is specifically configured to send indication information used to indicate an index number of the target pilot pattern, where the index number of the target pilot pattern is determined by the device 400 based on the total quantity of layers of the to-be-transmitted data stream, so that the receive end device determines the target pilot pattern corresponding to the index number of the target pilot pattern, so as to determine the target time-frequency resource based on the target pilot pattern, and receive the pilot signal from the device 400 based on the target time-frequency resource.

The device 400 and the receive end device prestore a one-to-one mapping relationship between the N pilot patterns and index numbers of the N pilot patterns.

Optionally, the processor 420 is further configured to determine that a quantity $M_2$ of bits that carry the index number of the target pilot pattern is: $M_2=\lceil\log_2 N\rceil$, where $\lceil\ \rceil$ represents roundup.

The transceiver 410 is specifically configured to send the indication information by using the $M_2$ bits, where the indication information is used to indicate the index number of the target pilot pattern.

Optionally, the processor 420 is specifically configured to determine, based on a prestored first pilot pattern, a target resource element RE for transmitting the pilot signal. The target time-frequency resource includes the target RE, the N pilot patterns include the first pilot pattern, and the first pilot pattern is used to indicate, when the total quantity of layers of the to-be-transmitted data stream is a maximum transport layer quantity L supported by the device 400, pre-configured d×L REs for transmitting L pilot signals, where d is a density of a pilot signal that corresponds to each transport layer and that is on each resource block RB pair, d is a natural number greater than or equal to 1, L is a natural number greater than or equal to 1, $L=n_F\times n_T$, $n_F$ is a quantity of REs that are used by the L pilot signals on each RB pair in a frequency domain resource direction, $n_T$ is a quantity of REs that are used by the L pilot signals on each RB pair in a time domain resource direction, the indication information includes an indication bitmap, and the target time-frequency resource includes the target RE.

The processor 420 is specifically configured to determine, based on a prestored first mapping relationship diagram, corresponding bits of the target RE that are in the indication bitmap. The first mapping relationship diagram is used to indicate a correspondence between the d×L REs in the first pilot pattern and the bits in the indication bitmap.

The transceiver 410 is specifically configured to send the indication bitmap to the receive end device. The indication bitmap is used to instruct the receive end device to receive the pilot signal from the device 400 based on the target RE, and the receive end device prestores the first mapping relationship diagram.

Optionally, the processor 420 is specifically configured to: determine a one-dimensional indication bitmap, where the one-dimensional indication bitmap is used to indicate a resource corresponding to the target RE in a first dimensional direction, and determine, based on a quantity of target REs that are used by the L pilot signals on each RB pair in the first dimensional direction, that a quantity of bits used to indicate the target REs is $M_3=L/n_F$ or $M_3=L/n_T$. The first dimensional direction is the frequency domain resource direction or the time domain resource direction.

The transceiver 410 is specifically configured to send the one-dimensional indication bitmap by using the $M_3$ bits.

Optionally, the processor 420 is specifically configured to: determine a two-dimensional indication bitmap, where the two-dimensional indication bitmap is used to indicate resources corresponding to the target RE in a first dimensional direction and a second dimensional direction, and determine, based on a quantity of target REs that are used by the L pilot signals on each RB pair in the first dimensional direction and a quantity of target REs that are used by the L pilot signals on each RB pair in the second dimensional direction, that a quantity of bits used to indicate the target REs is $M_4=L/n_F+L/n_T$. The first dimensional direction is the frequency domain resource direction and the second dimensional direction is the time domain resource direction, or the first dimensional direction is the time domain resource direction and the second dimensional direction is the frequency domain resource direction.

The transceiver 410 is specifically configured to send the two-dimensional indication bitmap by using the $M_4$ bits.

Optionally, the device 400 is a network device and the receive end device is user equipment; or the device 400 is user equipment and the receive end device is a network device.

It should be understood that, in this embodiment of this application, the processor 420 may be a central processing unit (CPU), or the processor 420 may be another general purpose processor, a digital signal processor (DSP), an application-specific integrated circuit (ASIC), a field programmable gate array (FPGA) or another programmable logical device, a discrete gate or a transistor logical device, a discrete hardware component, or the like. The general purpose processor may be a microprocessor or the processor may be any conventional processor or the like.

The memory 430 may include a read-only memory and a random access memory, and provides an instruction and data for the processor 420. A part of the memory 430 may further include a non-volatile random access memory. For example, the memory 430 may further store device type information.

The bus system 440 may include a power bus, a control bus, a status signal bus, and the like, in addition to a data bus. However, for clear description, various types of buses in the figure are marked as the bus system 440.

In an implementation process, steps in the foregoing methods may be completed by using an integrated logical circuit of hardware in the processor 420 or instructions in a form of software in the processor 420. The steps of the methods disclosed with reference to the embodiments of this application may be directly performed by a hardware processor, or may be performed by using a combination of hardware and software modules in the processor. The software module may be located in a mature storage medium in the art, such as a random access memory, a flash memory, a read-only memory, a programmable read-only memory, an electrically-erasable programmable memory, or a register. The storage medium is located in the memory 430, and the processor 420 reads information in the memory 430 and completes the steps in the foregoing methods in combination with hardware of the processor 420. To avoid repetition, details are not described herein again.

The device 400 for transmitting a pilot signal according to this embodiment of this application may correspond to the transmit end device in the method for transmitting a pilot signal according to the embodiments of this application. Moreover, the modules in the device 400 and the foregoing and other operations and/or functions are separately used for implementing corresponding procedures in the methods in FIG. 2 to FIG. 16. For brevity, details are not described herein.

Therefore, the apparatus for transmitting a pilot signal in this embodiment of this application determines, based on one or more prestored pilot patterns, a time-frequency resource corresponding to the quantity of layers for transmitting the data stream, so that a resource for transmitting the pilot signal can be determined based on a quantity of actual layers for transmitting the data stream. In this way, an idle pilot resource is released to transmit data, so that more flexible resource configuration is achieved, thereby improving resource usage.

Figure 20:
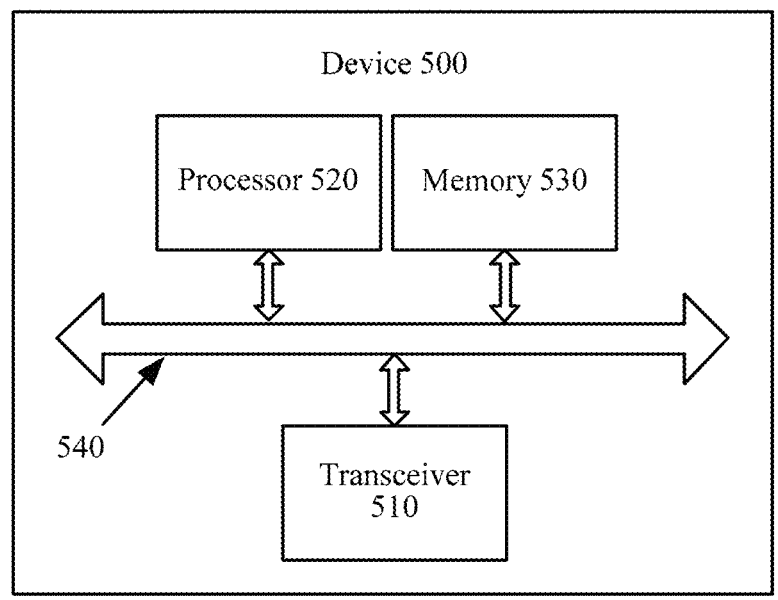
FIG. 20 is a schematic block diagram of a device for transmitting a pilot signal according to another embodiment of this application.

FIG. 20 is a schematic block diagram of a device 500 for transmitting a pilot signal according to an embodiment of this application. As shown in FIG. 20, the device 500 includes: a transceiver 510, a processor 520, a memory 530, and a bus system 540. The transceiver 510, the processor 520, and the memory 530 are connected by using the bus system 540. The memory 530 is configured to store an instruction. The processor 520 is configured to execute the instruction stored in the memory 530, to control the transceiver 510 to send and receive a signal.

The transceiver 510 is configured to receive indication information sent by a transmit end device.

The processor 520 is configured to determine, based on the indication information, a target time-frequency resource for transmitting a pilot signal. The target time-frequency resource is determined by the transmit end device based on prestored N pilot patterns, the target time-frequency resource corresponds to a total quantity of layers of a to-be-transmitted data stream, the N pilot patterns are different from each other, and N is a natural number greater than or equal to 1.

The transceiver 510 is further configured to receive the pilot signal from the transmit end device based on the target time-frequency resource.

Optionally, the processor 520 is specifically configured to: determine a target pilot pattern based on an antenna port number that is used for transmitting the pilot signal and that is indicated by the indication information, and determine the target time-frequency resource based on the target pilot pattern.

The transmit end device and the device 500 prestore a one-to-one mapping relationship between the N pilot patterns and N antenna port number groups, any antenna port number in an $i^{th}$ port number group is used to uniquely indicate an $i^{th}$ pilot pattern, and i∈[1, N].

Optionally, the processor 520 is specifically configured to: determine a target pilot pattern based on an index number that is of the target pilot pattern and that is indicated by the indication information, and determine the target time-frequency resource based on the target pilot pattern.

The transmit end device and the device 500 prestore a one-to-one mapping relationship between the N pilot patterns and index numbers of the N pilot patterns.

Optionally, the processor 520 is specifically configured to determine, based on an indication bitmap indicated by the indication information and a prestored first mapping relationship diagram, a target resource element RE for transmitting the pilot signal. The target time-frequency resource includes the target RE.

The N pilot patterns include a first pilot pattern, the first pilot pattern is used to indicate, when the total quantity of layers of the to-be-transmitted data stream is a maximum transport layer quantity L supported by the transmit end device, pre-configured d×L REs for transmitting L pilot signals, and the first mapping relationship diagram is used to indicate a correspondence between the d×L REs in the first pilot pattern and bits in the indication bitmap, where d is a density of a pilot signal that corresponds to each transport layer and that is on each resource block RB pair, d is a natural number greater than or equal to 1, L is a natural number greater than or equal to 1, $L=n_F \times n_T$, $n_F$ is a quantity of REs that are used by the L pilot signals on each RB pair in a frequency domain resource direction, and $n_T$ is a quantity of REs that are used by the L pilot signals on each RB pair in a time domain resource direction.

Optionally, the transmit end device is a network device and the device 500 is user equipment; or, the transmit end device is user equipment and the device 500 is a network device.

The device 500 for transmitting a pilot signal according to this embodiment of this application may correspond to the receive end device in the method for transmitting a pilot signal according to the embodiments of this application. Moreover, the modules in the device 500 and the foregoing and other operations and/or functions are separately used for implementing corresponding procedures in the methods in FIG. 2 to FIG. 16. For brevity, details are not described herein.

Therefore, the device for transmitting a pilot signal in this embodiment of this application determines, based on the indication information sent by the transmit end device, the time-frequency resource for transmitting the pilot signal, so that a resource for transmitting the pilot signal can be determined based on a quantity of actual layers for transmitting the data stream. In this way, an idle pilot resource is released to transmit data, so that more flexible resource configuration is achieved, thereby improving resource usage.

It should be understood that, in various embodiments of this application, sequence numbers of the foregoing processes do not indicate an execution sequence. The execution sequence of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are executed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that, the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit.

It may be understood that, for brevity and clarity of the application document, technical features and description in an embodiment in the foregoing are applicable to other embodiments. For example, technical features in a method embodiment may be applicable to an apparatus embodiment or another method embodiment, and are no longer described in detail one by one in the other embodiments.

The transceiver module or the sending unit or the transmitter in the foregoing embodiments may send information on an air interface, or may not send information on an air interface, but send information to another device, so that the another device sends the information on the air interface. The receiving module or the receiving unit or the receiver in the foregoing embodiments may receive information on an air interface, or may not receive information on an air interface, but receive information by using another device that receives information on an air interface.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for transmitting a pilot signal, comprising:
   determining, by a transmit end device based on prestored N pilot patterns, a target time-frequency resource for transmitting a pilot signal, wherein the target time-frequency resource corresponds to a total quantity of layers of a to-be-transmitted data stream, the N pilot patterns are different from each other, and N is a natural number greater than or equal to 1; and
   sending, by the transmit end device, indication information to a receive end device, wherein the indication information is used to instruct the receive end device to receive the pilot signal from the transmit end device based on the target time-frequency resource,
   wherein the determining, by the transmit end device based on the prestored N pilot patterns, the target time-frequency resource for transmitting the pilot signal, wherein the target time-frequency resource corresponds to the total quantity of layers of the to-be-transmitted data stream comprises:
   determining, by the transmit end device, a target pilot pattern corresponding to the total quantity of layers of the to-be-transmitted data stream in the prestored N pilot patterns, wherein the target pilot pattern is used to indicate the target time-frequency resource for transmitting the pilot signal, N is determined based on a maximum transport layer quantity L supported by the transmit end device, and L is a natural number greater than or equal to 1,

53 wherein the transmit end device prestores a one-to-one mapping relationship between N layer quantity groups and the N pilot patterns, a layer quantity comprised in an $i^{th}$ layer quantity group in the N layer quantity groups is a natural number greater than $(i-1)\times \lceil L/N \rceil$ and less than or equal to $i \times \lceil L/N \rceil$, $i \in [1, N]$, and $N=\lceil L/C \rceil$, wherein $\lceil \ \rceil$ represents roundup, C is a code length of an orthogonal cover code used between transport layers, a value of C is $2^n$, and n is a natural number greater than or equal to 1; and wherein the determining, by the transmit end device, a target pilot pattern corresponding to the total quantity of layers of the to-be-transmitted data stream in the prestored N pilot patterns comprises:

determining, by the transmit end device, a corresponding layer quantity group based on the total quantity of layers of the to-be-transmitted data stream; and determining, by the transmit end device, the target pilot pattern corresponding to the layer quantity group in the preset N pilot patterns based on the one-to-one mapping relationship between the N layer quantity groups and the N pilot patterns.

2. The method according to claim 1, wherein the sending, by the transmit end device, the indication information to the receive end device, wherein the indication information is used to instruct the receive end device to receive the pilot signal from the transmit end device based on the target time-frequency resource comprises:

sending, by the transmit end device, the indication information to the receive end device, wherein the indication information is specifically used to indicate an antenna port number for transmitting the pilot signal, and the antenna port number is determined by the transmit end device based on the total quantity of layers of the to-be-transmitted data stream, so that the receive end device determines the target pilot pattern corresponding to the antenna port number, so as to determine the target time-frequency resource based on the target pilot pattern, and receive the pilot signal from the transmit end device based on the target time-frequency resource, wherein the transmit end device and the receive end device prestore a one-to-one mapping relationship between the N pilot patterns and N antenna port number groups, any antenna port number in an $i^{th}$ port number group is used to uniquely indicate an $i^{th}$ pilot pattern, and $i \in [1, N]$.

3. The method according to claim 1, wherein the transmit end device is a network device and the receive end device is user equipment; or the transmit end device is user equipment and the receive end device is a network device.

4. A method for transmitting a pilot signal, comprising:

receiving, by a receive end device, indication information sent by a transmit end device;

determining, by the receive end device based on the indication information, a target time-frequency resource for transmitting a pilot signal, wherein the target time-frequency resource is determined by the transmit end device based on prestored N pilot patterns, the target time-frequency resource corresponds to a total quantity of layers of a to-be-transmitted data stream, the N pilot patterns are different from each other, and N is a natural number greater than or equal to 1; and receiving, by the receive end device, the pilot signal from the transmit end device based on the target time-frequency resource,

54 wherein the determining, by the receive end device based on the indication information, the target time-frequency resource for transmitting the pilot signal further comprising:

determining, based on an indication bitmap indicated by the indication information and a prestored first mapping relationship diagram, a target resource element RE for transmitting the pilot signal, wherein the target time-frequency resource comprises the target RE, wherein the N pilot patterns comprise a first pilot pattern, the first pilot pattern is used to indicate, when the total quantity of layers of the to-be-transmitted data stream is a maximum transport layer quantity L supported by the transmit end device, pre-configured d×L REs for transmitting L pilot signals, and the first mapping relationship diagram is used to indicate a correspondence between the d×L REs in the first pilot pattern and bits in the indication bitmap, wherein d is a density of a pilot signal that corresponds to each transport layer and that is on each resource block RB pair, d is a natural number greater than or equal to 1, L is a natural number greater than or equal to 1, $L = n_F \times n_T$, $n_F$ is a quantity of REs that are used by the L pilot signals on each RB pair in a frequency domain resource direction, and $n_T$ is a quantity of REs that are used by the L pilot signals on each RB pair in a time domain resource direction.

5. The method according to claim 4, wherein the transmit end device is a network device and the receive end device is user equipment; or the transmit end device is user equipment and the receive end device is a network device.

6. An apparatus for transmitting a pilot signal, comprising:

a processor configured to determine, based on prestored N pilot patterns, a target time-frequency resource for transmitting a pilot signal, wherein the target time-frequency resource corresponds to a total quantity of layers of a to-be-transmitted data stream, the N pilot patterns are different from each other, and N is a natural number greater than or equal to 1; and a transceiver configured to send indication information to a receive end device, wherein the indication information is used to instruct the receive end device to receive the pilot signal from the apparatus based on the target time-frequency resource, wherein when the processor is configured to determine, based on the prestored N pilot patterns, the target time-frequency resource for transmitting the pilot signal, the processor is further configured to:

determine, a target pilot pattern corresponding to the total quantity of layers of the to-be-transmitted data stream in the prestored N pilot patterns, wherein the target pilot pattern is used to indicate the target time-frequency resource for transmitting the pilot signal, N is determined based on a maximum transport layer quantity L supported by the transmit end device, and L is a natural number greater than or equal to 1, wherein the apparatus prestores a one-to-one mapping relationship between N layer quantity groups and the N pilot patterns, a layer quantity comprised in an $i^{th}$ layer quantity group in the N layer quantity groups is a natural number greater than $(i-1) \times \lceil L/N \rceil$ and less than or equal to $i \times \lceil L/N \rceil$, $i \in [1, N]$, and $N = \lceil L/C \rceil$, wherein $\lceil \ \rceil$ represents roundup, C is a code length of an orthogonal cover code used between transport layers, a value of C is $2^n$, and n is a natural number greater than or equal to 1; and wherein when determining, a target pilot pattern corresponding to the total quantity of layers of the to-be-transmitted data stream in the prestored N pilot patterns, the processor is further configured to:
determine, a corresponding layer quantity group based on the total quantity of layers of the to-be-transmitted data stream; and
determine, the target pilot pattern corresponding to the layer quantity group in the preset N pilot patterns based on the one-to-one mapping relationship between the N layer quantity groups and the N pilot patterns.

7. The apparatus according to claim 6, wherein the apparatus is a network device and the receive end device is user equipment; or
the apparatus is user equipment and the receive end device is a network device.

8. An apparatus for transmitting a pilot signal, comprising:
a transceiver configured to receive indication information sent by a transmit end device; and
a processor configured to determine, based on the indication information, a target time-frequency resource for transmitting a pilot signal, wherein the target time-frequency resource is determined by the transmit end device based on prestored N pilot patterns, the target time-frequency resource corresponds to a total quantity of layers of a to-be-transmitted data stream, the N pilot patterns are different from each other, and N is a natural number greater than or equal to 1,
wherein the transceiver is further configured to receive the pilot signal from the transmit end device based on the target time-frequency resource, wherein the processor is further configured to determine, based on an indication bitmap indicated by the indication information and a prestored first mapping relationship diagram, a target resource element RE for transmitting the pilot signal, wherein the target time-frequency resource comprises the target RE, wherein the N pilot patterns comprise a first pilot pattern, the first pilot pattern is used to indicate, when the total quantity of layers of the to-be-transmitted data stream is a maximum transport layer quantity L supported by the transmit end device, pre-configured d×L REs for transmitting L pilot signals, and the first mapping relationship diagram is used to indicate a correspondence between the d×L REs in the first pilot pattern and bits in the indication bitmap, wherein d is a density of a pilot signal that corresponds to each transport layer and that is on each resource block RB pair, d is a natural number greater than or equal to 1, L is a natural number greater than or equal to 1, $L=n_F \times n_T$, $n_F$ is a quantity of REs that are used by the L pilot signals on each RB pair in a frequency domain resource direction, and $n_T$ is a quantity of REs that are used by the L pilot signals on each RB pair in a time domain resource direction.

9. The apparatus according to claim 8, wherein the transmit end device is a network device and the apparatus is user equipment; or
the transmit end device is user equipment and the apparatus is a network device.

* * * * *